(12) United States Patent
Shiga et al.

(10) Patent No.: US 7,334,029 B2
(45) Date of Patent: Feb. 19, 2008

(54) DATA MIGRATION METHOD

(75) Inventors: Kenta Shiga, Yokohama (JP); Daiki Nakatsuka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/980,196

(22) Filed: Nov. 4, 2004

(65) Prior Publication Data

US 2006/0064466 A1    Mar. 23, 2006

(30) Foreign Application Priority Data

Sep. 22, 2004    (JP)    ............................. 2004-274338

(51) Int. Cl.
*G06F 15/173* (2006.01)
*G06F 12/00* (2006.01)

(52) U.S. Cl. ...................... 709/223; 711/200

(58) Field of Classification Search ............ 709/213–6, 709/211, 217, 223, 226, 227, 245; 711/200
See application file for complete search history.

(56) References Cited

U.S. PATENT DOCUMENTS

| | | | |
|---|---|---|---|
| 5,708,812 A | 1/1998 | Van Dyke et al. | |
| 5,734,859 A * | 3/1998 | Yorimitsu et al. | 711/112 |
| 5,832,274 A | 11/1998 | Cutler et al. | |
| 6,108,748 A | 8/2000 | Ofek et al. | |
| 6,240,494 B1 * | 5/2001 | Nagasawa et al. | 711/165 |
| 6,336,172 B1 * | 1/2002 | Day et al. | 711/161 |
| 6,421,711 B1 * | 7/2002 | Blumenau et al. | 709/213 |
| 6,654,830 B1 | 11/2003 | Taylor et al. | |
| 6,715,031 B2 * | 3/2004 | Camble et al. | 711/111 |
| 6,772,306 B2 | 8/2004 | Suzuki et al. | |
| 6,931,410 B2 | 8/2005 | Anderson et al. | |
| 6,950,833 B2 | 9/2005 | Costello et al. | |
| 2001/0047460 A1 | 11/2001 | Kobayashi et al. | |
| 2002/0112008 A1 | 8/2002 | Christenson et al. | |
| 2003/0110237 A1 | 6/2003 | Kitamura et al. | |

(Continued)

FOREIGN PATENT DOCUMENTS

JP    2000-187608    7/2000

OTHER PUBLICATIONS

Leach, et al., "The Architecture of an Integrated Local Network", IEEE Journal on Selected Areas in Communications, vol. SAC-1, No. 5, Nov. 1983, pp. 842-857.

(Continued)

*Primary Examiner*—Saleh Najjar
*Assistant Examiner*—V. Korobov
(74) *Attorney, Agent, or Firm*—Antonelli, Terry, Stout & Kraus, LLP.

(57) ABSTRACT

A system is provided in which a first storage device for managing a target to which a first physical port and a first logical volume are allocated, a second storage device for managing a second logical volume, and a computer for establishing a first communication path with the first physical port and conducting access to the target by using the communication path. The first storage device creates in the second storage devices a target holding an identifier identical to that of the aforementioned target and allocates the second logical volume and a second physical port to the target, and the computer establishes a second communication path with the second physical port and maintains the access to the target by using the second communication path.

4 Claims, 27 Drawing Sheets

U.S. PATENT DOCUMENTS

| | | |
|---|---|---|
| 2003/0115447 A1* | 6/2003 | Pham et al. ................. 713/153 |
| 2003/0135511 A1 | 7/2003 | Anderson et al. |
| 2003/0140193 A1 | 7/2003 | Acharya et al. |
| 2003/0182330 A1 | 9/2003 | Manley et al. |
| 2004/0049553 A1 | 3/2004 | Iwamura et al. |
| 2004/0068629 A1 | 4/2004 | Fujibayashi et al. |
| 2004/0088483 A1 | 5/2004 | Chatterjee et al. |
| 2004/0117546 A1* | 6/2004 | Mizuno ...................... 711/112 |
| 2004/0139237 A1 | 7/2004 | Rangan et al. |
| 2004/0143642 A1* | 7/2004 | Beckmann et al. ......... 709/213 |
| 2004/0172512 A1 | 9/2004 | Nakanishi et al. |
| 2004/0225719 A1 | 11/2004 | Kisley et al. |
| 2005/0005062 A1 | 1/2005 | Liu et al. |
| 2005/0010688 A1 | 1/2005 | Murakami et al. |
| 2005/0033878 A1 | 2/2005 | Pangal et al. |
| 2005/0262102 A1 | 11/2005 | Anderson et al. |

OTHER PUBLICATIONS

Leach, et al., "The File System of an Integrated Local Network", Proceedings of the 1985 ACM Computer Science Conference-Agenda for Computing Research: The Challenge for Creativity, Mar. 12-14, 1985, pp. 324.

Welch, et al., "Prefix Tables: A Simple Mechanism for Locating Files in a Distributed System", Report No. UCB/CSD 86/261, Oct. 1985, Computer Science Division (EECS), University of California, pp. 1-12.

M. Knowles, "Survey of the storage evolution", User Group Conference, 2003. Proceedings Jun. 9-13, 2003, pp. 362-367.

* cited by examiner

FIG.5
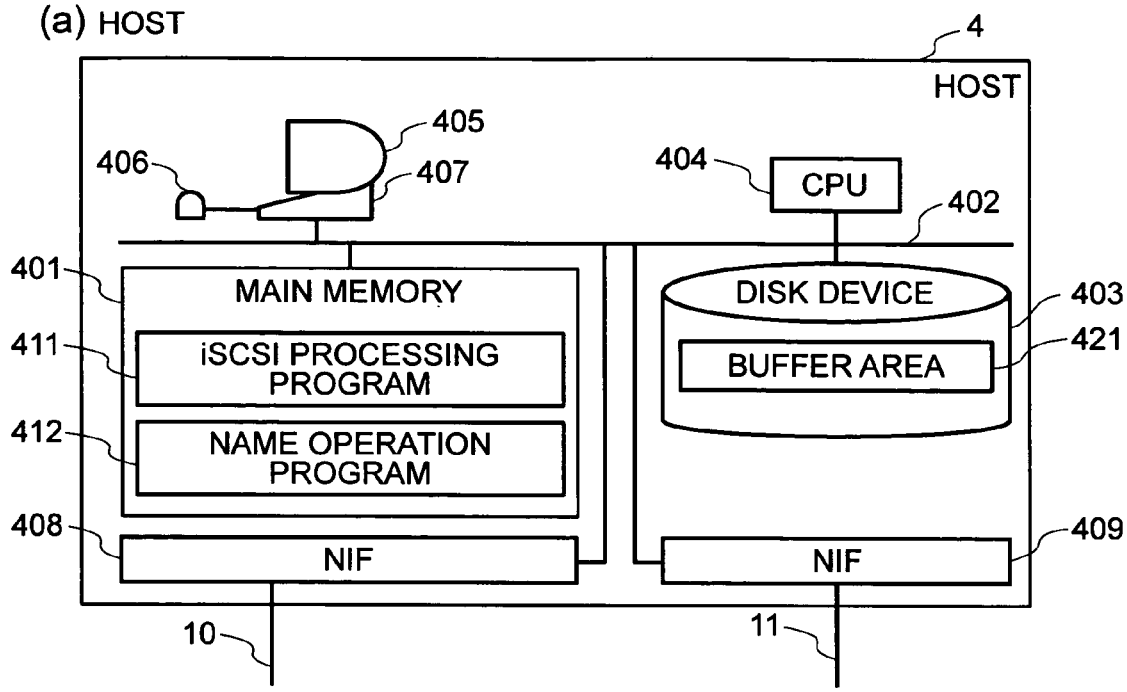
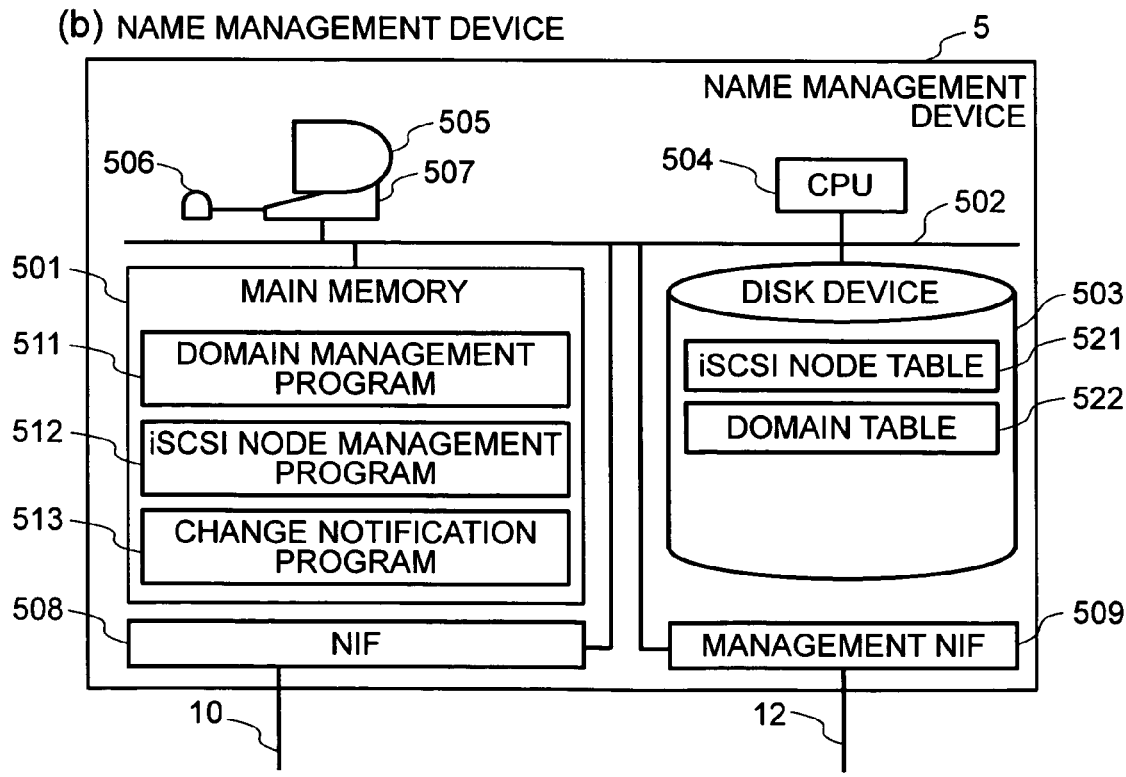

FIG.6

(a) NAME MANAGEMENT DEVICE TABLE 121

| DEVICE ID | IP ADDRESS |
|---|---|
| NM01 | 172.16.0.253 |

(b) PORT TABLE 122

| PORT ID | IP ADDRESS | SUBNET MASK | GATEWAY |
|---|---|---|---|
| 1 | 172.16.0.1 | 255.255.0.0 | 172.16.0.254 |
| 2 | 172.16.0.2 | 255.255.0.0 | 172.16.0.254 |
| ... | ... | ... | ... |

(c) TARGET TABLE 123

| TARGET | PORT ID | PORT NUMBER |
|---|---|---|
| iqn.2004-06.com.hitachi:tar01 | 1 | 3260 |
| iqn.2004-06.com.hitachi:tar02 | 2 | 3260 |
| ... | ... | ... |

(d) LU TABLE 124

| TARGET | LUN |
|---|---|
| iqn.2004-06.com.hitachi:tar01 | 0 |
| iqn.2004-06.com.hitachi:tar02 | 1 |
| ... | ... |

FIG.7

(a) STORAGE DEVICE TABLE 221

| DEVICE ID | MANAGEMENT IP ADDRESS |
|---|---|
| STR01 | 192.168.0.1 |
| STR02 | 192.168.0.2 |
| ... | ... |

(b) NAME MANAGEMENT DEVICE TABLE 222

| DEVICE ID | IP ADDRESS | MANAGEMENT IP ADDRESS |
|---|---|---|
| NM01 | 172.16.0.253 | 192.168.0.253 |

(c) iSCSI NODE TABLE 521

| iSCSI NODE | NODE TYPE | IP ADDRESS | PORT NUMBER | CHANGE NOTIFICATION FLAG |
|---|---|---|---|---|
| iqn.2004-06.com.hitachi:tar01 | target | 172.16.0.1 | 3260 | 0 |
| iqn.1999-08.com.abc:host01 | initiator | 172.16.0.128 | null | 1 |
| ... | ... | ... | ... | ... |

(d) DOMAIN TABLE 522

| DOMAIN ID | iSCSI NODE |
|---|---|
| DD01 | iqn.2004-06.com.hitachi:tar01 |
| DD01 | iqn.1999-08.com.abc:host01 |
| ... | ... |

FIG.8
(a) STORAGE DEVICE MANAGEMENT SCREEN
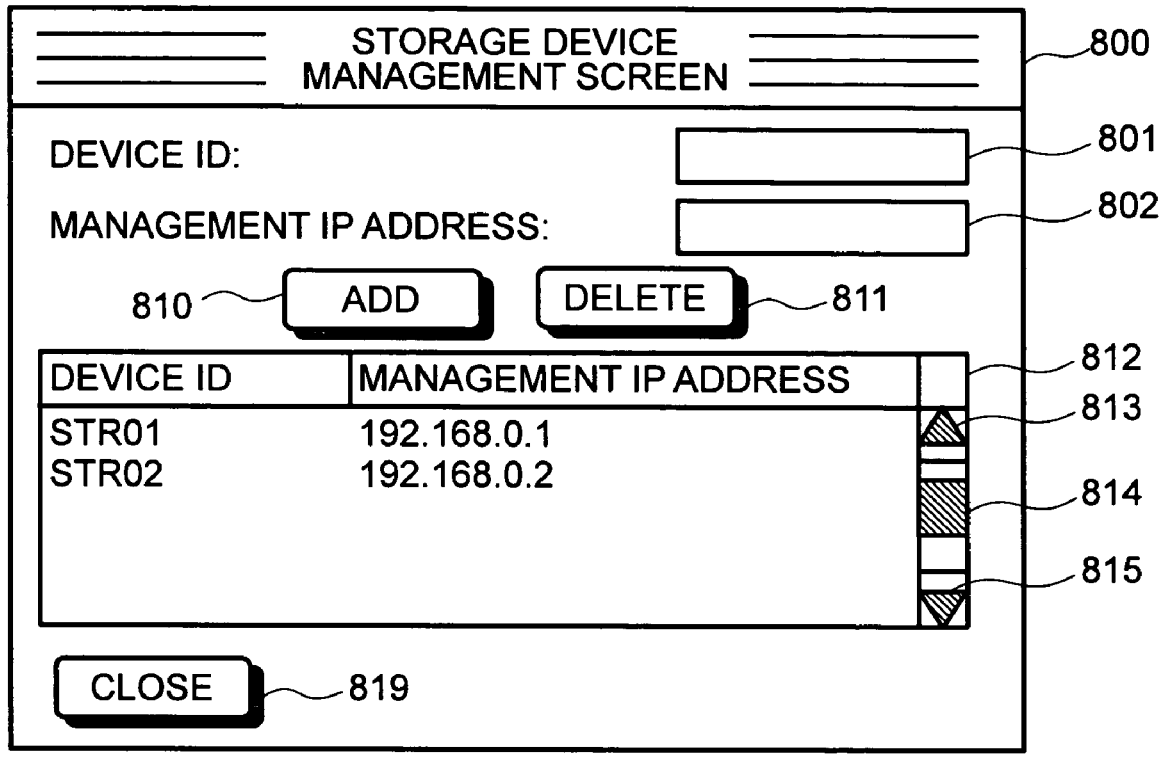
(b) NAME MANAGEMENT DEVICE MANAGEMENT SCREEN
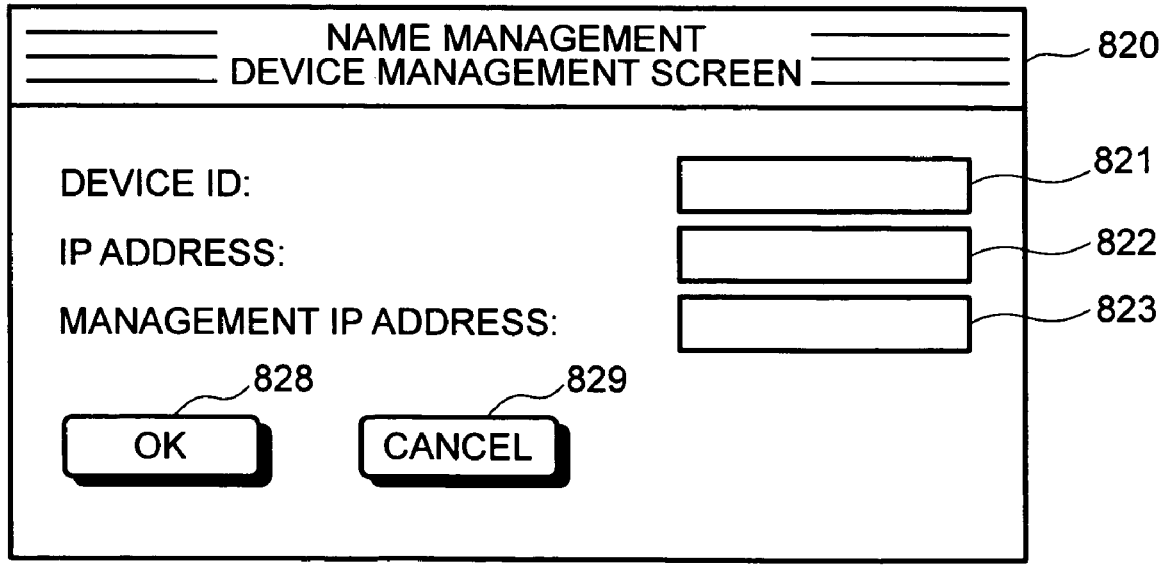

FIG. 9

(a) DOMAIN MANAGEMENT SCREEN

```
┌─────────────────────────────────────────────┐
│  ═══  DOMAIN MANAGEMENT SCREEN  ═══         │── 900
│                                             │
│  DOMAIN ID:        [            ]           │── 901
│  iSCSI NAME:       [            ]           │── 902
│                                             │
│  910 —[ ADD ]    [ DELETE ]— 911            │
│                                             │
│  ┌──────────┬──────────────────────────┐    │── 912
│  │DOMAIN ID │iSCSI NAME                │▲   │── 913
│  ├──────────┼──────────────────────────┤    │
│  │DD01      │iqn.2004-06.com.hitachi:tar01│ │── 914
│  │DD01      │iqn.1999-08.com.abc:host01│    │
│  │          │                          │▼   │── 915
│  └──────────┴──────────────────────────┘    │
│                                             │
│  [ CLOSE ]— 919                             │
└─────────────────────────────────────────────┘
```

(b) PORT MANAGEMENT SCREEN

| DEVICE ID | PORT ID | IP ADDRESS | SUBNET MASK | GATEWAY |
|---|---|---|---|---|
| STR01 | 1 | 172.16.0.1 | 255.255.0.0 | 172.16.0.254 |
| STR01 | 2 | 172.16.0.2 | 255.255.0.0 | 172.16.0.254 |
| STR02 | 1 | 0.0.0.0 | 0.0.0.0 | 0.0.0.0 |
| STR02 | 2 | 0.0.0.0 | 0.0.0.0 | 0.0.0.0 |

Fields: STORAGE DEVICE ID (921/922), PORT ID (923), IP ADDRESS (924), SUBNET MASK (925), GATEWAY (926). Buttons: ADD (930), DELETE (931), CLOSE (939). Screen label 920. Table markers 932, 933, 934, 935.

DOMAIN REPLICATION TABLE 2323

| DOMAIN ID | IP ADDRESS |
|---|---|
| DDD01 | 172.16.0.253 |
| DDD02 | 172.16.0.253 |
| ... | ... |

FIG.28
(a) LU REPLICATION MANAGEMENT SCREEN
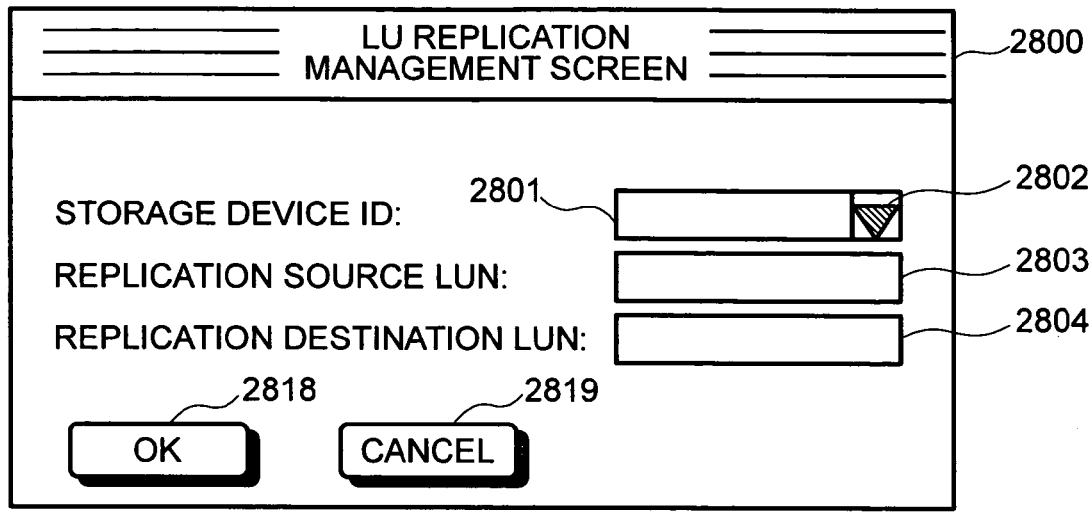
(b) INSIDE-STORAGE MIGRATION MANAGEMENT SCREEN
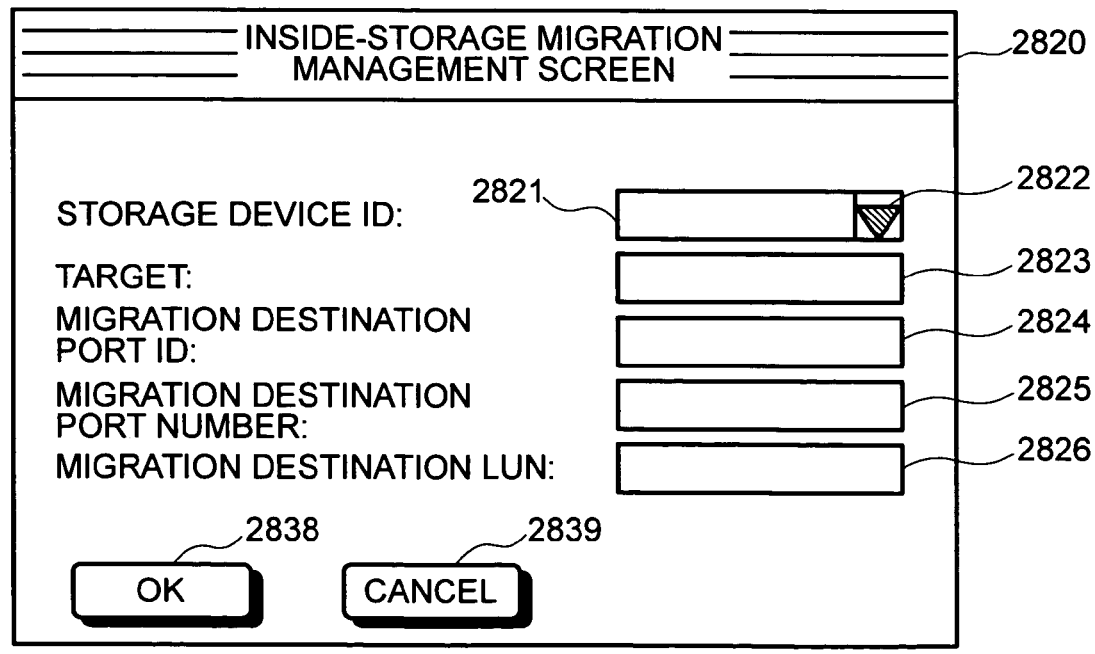

DATA MIGRATION METHOD

BACKGROUND OF THE INVENTION

The present invention relates to a system comprising a storage device and a computer that are connected via a network.

A system in which at least one storage device is connected to a plurality of hosts via a network has come into wide use in recent years in place of a system in which the storage device is directly connected to the computer (also referred to hereinbelow as a "host"). The connection of storage devices using a network is called a storage area network (referred to hereinbelow as a "SAN").

A SAN has heretofore been constructed by using fibre channel (referred to hereinbelow as "FC") technology. A SAN constructed by using FC technology will be referred to hereinbelow as a FC-SAN. A host and a storage device connected to an FC-SAN operate to conduct data write/read operations to/from a storage device by sending and receiving a SCSI (Small Computer System Interface) command or data by means of FCP (Fiber Channel Protocol).

On the other hand, an IP-SAN, which is a SAN constructed by using an IP (Internet Protocol) network has recently attracted much attention. When a host and a storage device communicate via an IP-SAN, the iSCSI protocol, which is a protocol in which SCSI commands or data are capsulated with TCP/IP (Transmission Control Protocol/Internet Protocol), is mainly used.

Among devices conducting communication via the above-mentioned FC-SAN or IP-SAN, those devices that send commands requesting data write/read operation or write data (either physically or logically) are called initiators. On the other hand, devices that receive a write command or data from an initiator and write the data into a storage device, such as a hard disk drive, or that receive a read command from an initiator, read data from a storage device and send this data to the initiator (either physically or logically) are called targets. Further, an initiator and a target are together referred to as a node. Usually, a host serves as an initiator and a storage device serves as a target. However, when data replication is conducted between storage devices, a storage device that stores original data serves as an initiator, and the other storage device that stores a replica of the data serves as a target.

In a FCP, an initiator and a target are distinguished by a WWN (World Wide Name), which is an address assigned to a physical port of an HBA (Host Bus Adapter) or a physical port of a storage device. Here, an HBA is a device attached to the host for conducting communication processing using the FCP. A WWN is an address inherent to a physical port and cannot be changed by a system administrator or the like.

On the other hand, in the iSCSI protocol, an initiator and a target are logically distinguished with an identifier called an iSCSI name. An iSCSI name is a character row which does not exist in the physical port and can be changed by a system administrator or the like. Therefore, for example, an iSCSI name assigned to a certain storage device can be reassigned to another storage device.

A process of replacing a storage device connected to a SAN such as an aforementioned FC-SAN or IP-SAN with another storage device due to insufficient capacity or functionality is called a migration of storage devices. Migration also includes a change of a storage device storing data according to changes in the data read/write frequency or importance.

For example, a method is described in Japanese Patent Application No. 2003-108315 as a technology for rapidly conducting migration using an FC-SAN.

SUMMARY OF THE INVENTION

As described hereinabove, in the FCP, a target is distinguished by a WWN assigned to a physical port of a storage device. The WWN cannot be changed by a system administrator or the like. Therefore, when the system administrator conducts migration of a storage device, a configuration change, such as a change of a WWN of an access destination target has to be conducted with respect to a host. Generally, host reboot is necessary to conduct this configuration change effectively. For this reason, applications running in the host have to be temporarily interrupted.

However, in systems based on uninterruptible operations, such as online shopping systems, interruption of application leads to significant damage. Therefore, a technology is required for implementing migration of storage devices, without interrupting the applications.

Furthermore, in systems in which data stored in a storage device is replicated into another storage device disposed at the same site or at a remote location, as a measure against large-scale disasters or equipment failure, a configuration change, such as a change of a WWN of a replication destination target, has to be conducted with respect to the storage device where the original data is stored, in order to conduct migration of the storage device where the replica of the data is stored. The operation load on a system administrator or the like conducting this configuration change increases with an increase in the number of targets storing the data, which constitutes the object of replication. Therefore, a technology is required, which allows the migration of the storage device where the replica of the data is stored to be conducted without changing the configuration of the storage device where the original data is stored. The "site" as referred to hereinbelow is a location or building where the devices are disposed.

Furthermore, in systems in which data stored in a logical unit (referred to hereinbelow as "LU") of a storage device is replicated to another LU of the same storage device, as a measure against data destruction caused by operation errors of end users, a configuration change, such as a change of a WWN of an access destination target, has to be conducted with respect to a host in order to change the host access destination from the LU where the original data is stored to the LU where the replicated data is stored, when the original data is destroyed. In order to conduct this configuration change effectively, applications running on the host have to be temporarily interrupted, similar to the case of storage device migration. Therefore, a technology is required for changing the LU accessed by the host, without interrupting the applications. Further, the LU is a logical storage area composed of the physical storage areas of a storage device.

In order to satisfy the above-described requirement, the following embodiment is suggested as an aspect of the present invention. More specifically, in a system comprising an initiator and a target, a device (referred to hereinbelow as "first device") having the target designates the creation of a target, having an identifier identical to the identifier assigned to its own target, to another device (referred to hereinbelow as "second device"). Then, the initiator establishes a communication path to the target created in the second device by using the identifier identical to that used in the communication path established with the first device. Then, the first device disconnects the communication path used for communication between its own target and the initiator. Then, the initiator maintains the communication with the target with the same identifier by using the communication path established with the second device.

Here, the initiator may be a computer or a storage device. Furthermore, the first device and second device may be the same or different storage devices.

Furthermore, a configuration may be also considered in which, prior to designating the creation of the target to the second device, the first device replicates data stored in its own target to the second device, and the second device creates a target so as to correspond to the replicated data.

Further, a configuration may be also employed in which a name management device is added to the system, and association of the identifier assigned to the initiator or the target with a physical port or a storage area owned by each device is managed by the name management device. In this case, a configuration is assumed in which the second device registers information of the newly created target in the name management device, and the initiator receives the information of the newly created target from the name management device.

The identifier assigned to the target may be an iSCSI name and the iSCSI name may be associated with the physical port and the storage area of each device. Other configurations will be made clear from the following disclosure of various embodiments.

BRIEF DESCRIPTION OF THE DRAWINGS

FIG. 5(a) is a diagram which shows an example of a host and FIG. 5(b) is a diagram which shows a name management device;

FIGS. 6(a) to 6(d) are diagrams which show an example of the data structure of a name management device table, a port table, a target table, and an LU table, respectively;

FIGS. 7(a) to 7(d) are diagrams which show an example of the shows a data structure of a storage device table, a name management device table, an iSCSI node table, and a domain table, respectively;

FIG. 8(a) is a diagram which shows an example of a display of a storage management screen and FIG. 8(b) is a diagram which shows an example of a name management device management screen;

FIG. 9(a) is a diagram which shows an example of a display of a domain management screen and FIG. 9(b) is a diagram which shows an example of a port management screen;

FIG. 28(a) is a diagram which shows an example of a display of an LU replication management screen and FIG. 28(b) is a diagram which shows an example of an inside-storage migration management screen.

DESCRIPTION OF THE PREFERRED EMBODIMENTS

Figure 1:
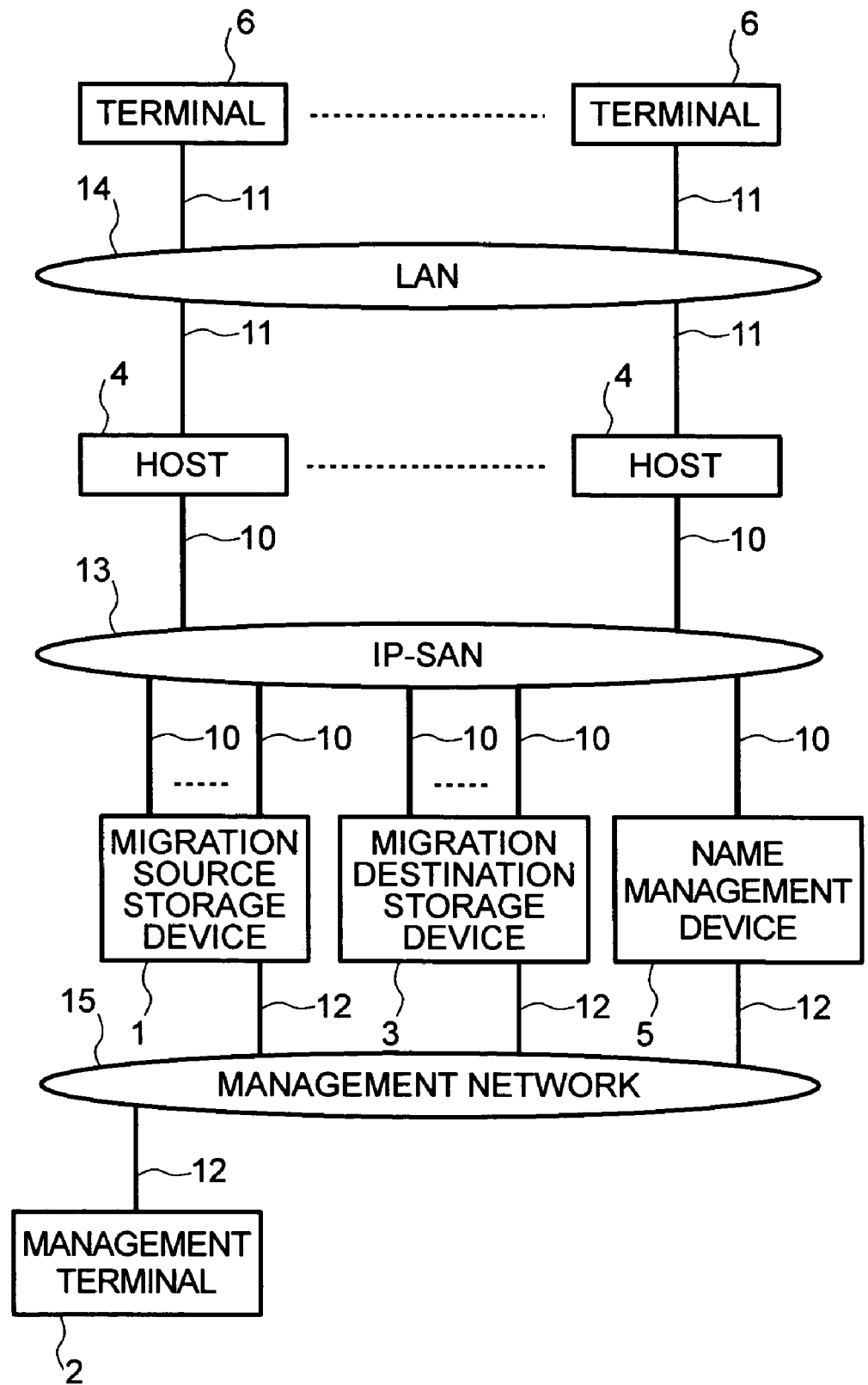
FIG. 1 is a block diagram which shows an example of the system configuration of the first embodiment of the present invention.

Various embodiments will be described below with reference to the appended drawings. In the drawings, identical components are identified by identical reference symbols. However, the present invention is not limited to the disclosed embodiments, and various application examples agreeing with the idea of the present invention correspond to the present invention. Further, each structural element may be used as a single element or as a plurality of elements.

The first embodiment relates to a system in which first and second storage devices and a host accessing the first storage device are connected to a network. In the present embodiment, migration is executed from the first storage device to the second storage device. The first and second storage devices will be referred to hereinbelow as a migration source storage device and a migration destination storage device, respectively.

FIG. 1 shows an example of the system configuration of the present embodiment. The system of the present embodiment, as described hereinabove, has a migration source storage device 1, a migration destination storage device 3, a management terminal 2 to be used by a system administrator or the like to control the configuration of the migration source storage device 1 and the migration destination storage device 3, hosts 4 connected to the migration source and migration destination storage devices via a network, terminals 6 connected to the hosts 4, and a name management device 5. In order to facilitate an explanation of this embodiment, the migration source storage device 1 and the migration destination storage device 3 will be collectively called storage devices.

The storage devices communicate with the hosts 4 by using the iSCSI protocol. Furthermore, the storage devices are storage device systems having at least one storage device (for example, a hard disk drive or the like). The storage devices have a plurality of LUs.

The terminals 6 are computers used by end users or the like for using services provided by the hosts 4. The name management device 5 is a computer for unified management of combinations of an iSCSI name, an IP address, and a TCP port number of each of the hosts 4 and the storage devices. The name management device 5, the hosts 4, and the storage devices are connected to each other via an IP-SAN 13, which is an IP network. Further, the terminals 6 are connected to the hosts 4 via a LAN 14, which is an IP network. Furthermore, the management terminal 2 is connected to the storage devices and the name management device 5 via a management network 15.

The storage devices, the hosts 4, and the name management device 5 are connected to the IP-SAN 13 using communication lines 10, such as UTP (Unshielded Twisted Pair) cables or optical fibre cables. Furthermore, the hosts 4 and the terminals 6 are connected to the LAN 14 using communication lines 11. Moreover, the storage devices, the management terminal 2, and the name management device 5 are connected to the management network 15 using communication lines 12.

When devices, such as the storage devices, and the IP network, such as the IP-SAN 13 and the LAN 14, are connected by using wireless communication technology, the communication lines 10, 11, and 12 are unnecessary. Further, in the present embodiment, an example is shown in which the IP-SAN 13 and the LAN 14 are separate from each other, but a configuration is possible in which the IP-SAN 13 also serves as the LAN 14. In this case, the system construction cost is reduced, but an inherent problem is that packets used for communication between the storage devices and the hosts 4 and packets used for communication between the hosts 4 and the terminals 6 are mixed in one network and the network becomes congested. The configuration of the present embodiment is preferred from the standpoint of resolving this problem.

Furthermore, in the present embodiment, an example is shown in which the IP-SAN 13 and the management network 15 are separate from each other, but a configuration is possible in which the IP-SAN 13 also serves as the management network 15. In this case, the system construction cost is reduced, but when a network apparatus constituting the IP-SAN 13 fails, operations for management of the storage devices from the management terminal 2 become impossible. As a result, the range of impact during failure is large. The configuration of the present embodiment is preferred from the standpoint of resolving this problem.

An overview of the operation of the present embodiment will be described below briefly. In the present embodiment, first, a first storage device (migration source storage device 1) for managing a target (a first target; an allocated identifier (iSCSI name) is assumed to be a "first-target") with an allocated first physical port and first logical volume and a second storage device (migration destination storage device 3) comprising a second physical port and managing a second logical volume are prepared. Then, a computer (host 4) to use the first target establishes a first communication path with the first physical port and effects access to the first target by using this communication path.

In this state, the system administrator conducts a migration of the storage devices, that is, replicates data of the migration source storage device 1 to the migration destination storage device 3 and starts the operation of the migration destination storage device 3. At this time, the migration source storage device 1, after the data replication has been completed, designates, to the migration destination storage device 3, the creation of a target (the second logical volume having the replica of the data stored therein and the second physical port are allocated to this target), which has been assigned thereto, an identifier identical to the identifier "first-target" assigned to the first target.

Upon completion of the creation of a target, the host 4 establishes a second communication path with the second physical port allocated to the created target (because the iSCSI name is the same as that of the first target, this target is recognized as a target identical to the first target by the host 4). Then, the migration source storage device 1 notifies the host 4 of the deletion of the first physical port.

The host 4, which has received this notification, stops using the first communication path using the first physical port and then accesses the target (the target configured in the migration destination storage device 3) by using the second communication path using the second physical port.

As a result, the storage device used in the system can be migrated, while the host 4 accesses the same target (because the target identifier is not changed; as a result, it is not necessary to reboot the host 4).

In another embodiment, a case will be explained in which a target that is a migration destination is in another site or the same storage device.

Figure 2:
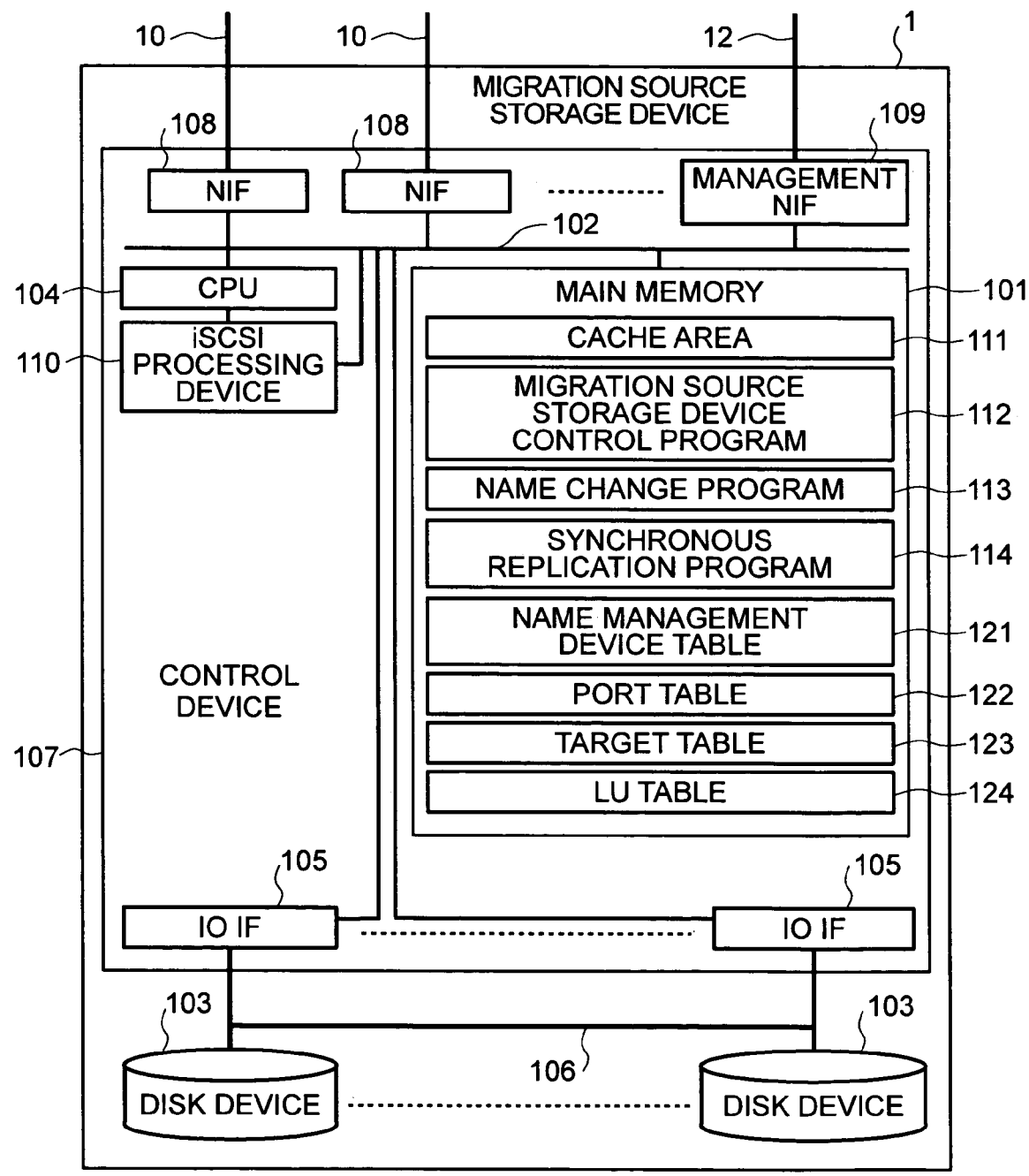
FIG. 2 is a diagram which shows an example of a migration source storage device.

FIG. 2 shows the configuration of the migration source storage device 1. The migration source storage device 1 is a storage device system having at least one storage device. The storage device includes a device using nonvolatile storage media, such as a hard disk drive or DVD. In a storage device system, a RAID (Redundant Array of Independent Disks) configuration may be employed. The migration source storage device 1 comprises a storage device (referred to hereinbelow as a "disk device") 103, a control device 107 for controlling data write or read operation to/from the disk device 103, and a communication line 106 connecting the control device 107 and disk device 103.

The control device 107 comprises a volatile memory (referred to hereinbelow as a "main memory") 101; a communication line 102, such as a bus; a central processing unit (referred to hereinbelow as a "CPU") 104; an IO interface (referred to hereinbelow as a "IO IF") 105, which constitutes an interface for connecting the control device 107 and the communication line 106; a network interface (referred to hereinbelow as a "NIF") 108 for connecting the control device 107 and the communication line 10; a management NIF 109 for connecting the control device 107 and the communication line 12; and an iSCSI processing device 110 for disassembling and assembling iSCSI packets. The NIF 108 and the management NIF 109 have one or more physical ports.

The main memory 101 has a cache area 111 for storing data read out from the disk device 103 or data received from the host 4 or the like; a migration source storage device control program 112 that is executed by the CPU 104 when migration from the migration source storage device 1 to the migration destination storage device 3 is executed; a name change program 113 that is executed by the CPU 104 when iSCSI names, IP addresses, and TCP port numbers of targets are registered or deregistered in the name management device 5; and a synchronous replication program 114 that is executed by the CPU 104 when synchronous replication is executed.

The main memory 101 also stores a name management device table 121 for storing information relating to the name management device 5 that is connected to the IP-SAN 13; a port table 122 for storing information relating to the physical ports of the migration source storage device 1; a target table 123 for storing information relating to targets managed by the migration source storage device 1; and an LU table 124 for storing information relating to the LUs managed by the migration source storage device 1. Further, as will be described hereinabove, an LU is a logical storage area composed of physical storage areas of the disk device 103. The LU may be composed of storage areas of one disk device 103, or it may be defined as an assembly of individual storage areas of a plurality of disk devices 103.

Figure 3:
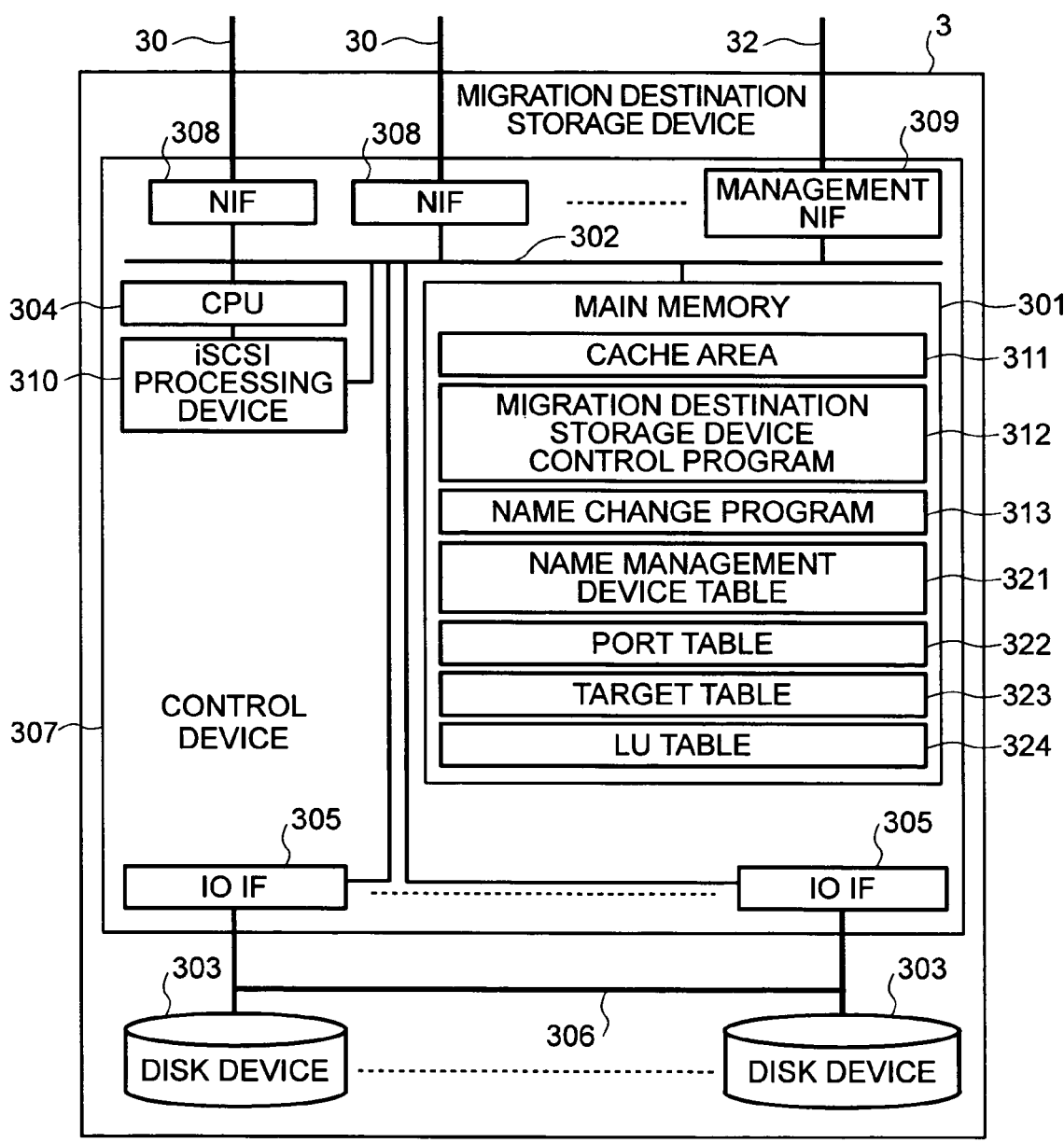
FIG. 3 is a diagram which shows an example of a migration destination storage device.

FIG. 3 shows the configuration of the migration destination storage device 3. The migration destination storage device 3 is also a storage device system having at least one storage device. The migration destination storage device 3, similar to the migration source storage device 1, has a disk device 303, a control device 307, and a communication line 306. Further, the control device 307, similar to the control device 107 of the migration source storage device 1, has a main memory 301, a communication line 302, a CPU 304, an IO IF 305, a NIF 308, a management NIF 309, and an iSCSI processing device 310. The NIF 308 and the management NIF 309 have one or more physical ports.

The main memory 301 has a cache area 311 for storing data read out from the disk device 303 or data received from the host 4 or the like; a migration destination storage device control program 312 that is executed by the CPU 304 when migration from the migration source storage device 1 to the migration destination storage device 3 is executed; and a name change program 313 that is executed by the CPU 304 when iSCSI names, IP addresses, and TCP port numbers of the targets are registered or deregistered in the name management device 5.

Further, the main memory 301, similar to the main memory 101 of the migration source storage device 1, also stores a name management device table 321, a port table 322, a target table 323, and a LU table 324.

Further, in the present embodiment, each table is assumed to be stored in the main memory of the storage devices, but in order to prevent the information stored in each table to be lost, even in the case of a failure of the storage devices, the information stored in each table may be copied to the disk device 103 or 303 periodically, or each time the contents of each table changes.

Further, in the present embodiment, it is assumed that disassembling or assembling of iSCSI packets is conducted by hardware, such as the iSCSI processing device 110 or 310, but, in order to reduce the production cost of the storage devices, disassembling or assembling of iSCSI packets may be conducted by the CPU 104 or the CPU 304 according to the contents of the iSCSI processing program. However, because the storage devices have to process large-capacity iSCSI packets, the configuration of the present embodiment, which has a higher processing capacity, is preferred.

Figure 4:
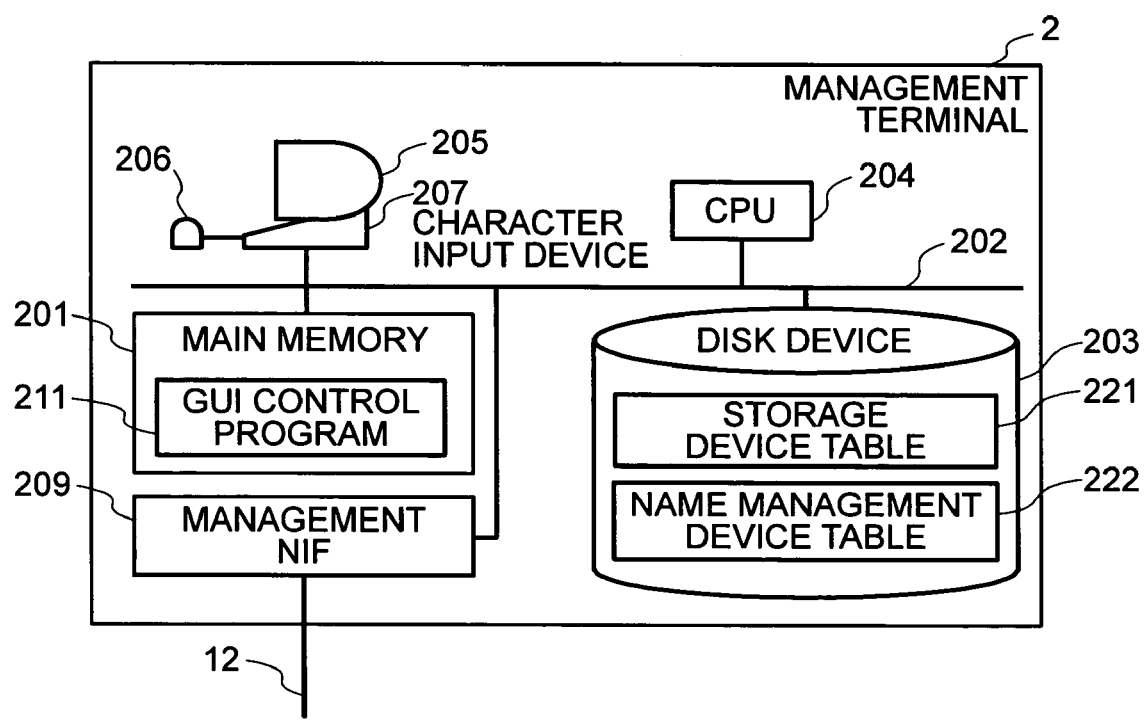
FIG. 4 is a diagram which shows an example of a management terminal.

FIG. 4 shows an example of the management terminal 2. The management terminal 2 is a computer having a main memory 201; a communication line 202; a disk device 203; a CPU 204; an output device (referred to hereinbelow as a "display") 205, such as a display device; a pointing device 206, such as a mouse; a character input device 207, such as a keyboard; and a management NIF 209. The main memory 201 stores a GUI control program 211 that is executed by the CPU 204 when a graphical user interface is provided to the system administrator. Further, the main memory 201 also stores a storage device table 221 for storing information of the storage devices connected to the IP-SAN 13 and a name management device table 222 for storing information relating to the name management device 5.

FIG. 5(a) shows an example of the host 4. The host 4 is a computer having a main memory 401, a communication line 402, a disk device 403, a CPU 404, a display 405, a pointing device 406, a character input device 407, a NIF 408, and a NIF 409. The main memory 401 stores an iSCSI processing program 411 that is executed by the CPU 404 when disassembling or assembling of iSCSI packets is conducted and a name operation program 412 executed by the CPU 404 when an initiator iSCSI name, an IP address, and a TCP port number are registered in the name management device 5 or deregistered therefrom, and when sending an inquiry to the name management device 5 or receiving an inquiry response or change notification from the name management device 5. Further, the main memory 401 stores a buffer area 421 to which the contents of disk accesses are temporarily saved.

Further, in the present embodiment, the CPU 404 is assumed to execute disassembling or assembling of iSCSI packets according to the contents of the iSCSI processing program 411, but, in order to increase the processing speed, disassembling or assembling of iSCSI packets may be processed by hardware, similar to the migration source storage device 1 and the like.

FIG. 5(b) shows an example of the name management device 5. The name management device 5 is a computer having a main memory 501, a communication line 502, a disk device 503, a CPU 504, a display 505, a pointing device 506, a character input device 507, a NIF 508, and a management NIF 509. The main memory 501 stores a domain management program 511 that is executed by the CPU 504 when a request is received from another device, such as the storage devices, and a domain table 522 is changed; an iSCSI node management program 512 that is executed by the CPU 504 when a request is received from another device, such as the storage devices and an iSCSI node table 521 is changed or read; and a change notification program 513 for notifying the other device, such as the host 4, that the iSCSI node table 521 was changed. Furthermore, the main memory 501 also stores the iSCSI node table 521 which stores the association relationship of iSCSI nodes with IP addresses and TCP port numbers and the domain table 522, which stores an association relationship of the iSCSI nodes and discovery domains.

Further, the above-described programs are stored in advance in disk devices of each device or main memory by reading from a portable storage media or by downloading via a network from another computer. When necessary, those programs are transferred into the main memory and executed by the CPU.

The role of the name management device 5 will be explained below.

An initiator has to perform login to a target prior to starting an exchange of SCSI commands or data with the target via the IP-SAN 13. When the initiator performs login to the target by using iSCSI, information consisting of an iSCSI name, an IP address, and a TCP port number of the target is required. The process of acquiring the target information by the initiator is called a discovery. However, the operations of configuring iSCSI names, IP addresses, and TCP port numbers for all targets in each host 4 operating as an initiator places a very heavy burden on the system administrator. For this reason, the iSCSI protocol stipulates methods by which an initiator conducts discovery, without configuring the target information in advance for each initiator. One of such methods is a method comprising connecting the name management device 5 to the IP-SAN 13.

The name management device 5 is a device for managing combinations of an iSCSI name, an IP address, and a TCP port number of each node in the iSCSI (referred to hereinbelow as an "iSCSI node"). Thus, in each node, a logical iSCSI name is associated with an IP address and a TCP port number of a physical port. The iSNSP (Internet Storage Name Service Protocol) or SLP (Service Location Protocol) is used as a communication protocol between the name management device 5 and iSCSI nodes. Further, in the present embodiment, it is assured that the name management device 5 uses iSNSP for communication with other devices, but a system in which the name management device 5 uses another protocol, such as SLP, is also possible.

Further, the name management device 5 also manages information called a discovery domain to limit targets that can be objects of discovery by an initiator. A discovery domain is information indicating an association of an initiator and a target to which the initiator can perform login.

Furthermore, the name management device 5 notifies iSCSI nodes belonging to the same discovery domain that there was a change when information relating to the iSCSI nodes has been registered or deregistered. An SCN (State Change Notification) is used for this notification.

The operation procedure relating to a discovery using the name management device 5 will be explained below. First, one of the storage devices or the host 4, after being activated, transmits information of an iSCSI name, an IP address, and a TCP port number of a node that is managed, thereby to the name management device 5 via the IP-SAN 13, and registers this information in the name management device 5. Then, the host 4 inquires from the name management device 5 via the IP-SAN 13 concerning information of iSCSI names, IP addresses, and TCP port numbers of targets to which the host 4 itself can perform login and acquires this information. Thus, the name management device 5 can substantially reduce configuration operations by the system administrator to the host 4 by unified management of the combinations of an iSCSI name, an IP address, and a TCP port number.

Further, the terminal 6 is a computer for general applications and has a CPU, a main memory, an I/O device, and a network interface, which is an interface for connecting to other devices via a communication line 11.

The data structure of each table stored in the main memory 101 of the migration source storage device 1 will be described below. The name management device table 121, the port table 122, the target table 123, and the LU table 124 form an array structure and can store at least one record. However, the data structure is not limited to the array structure.

FIG. 6(a) shows an example of the data structure of the name management device table 121. The name management device table 121 has the same number of records as the name management devices 5 connected to the IP-SAN 13. Each record of the name management device table 121 has an entry 1211 in which a device ID is registered, which is an identifier for identifying the name management device 5 corresponding to the record, and an entry 1212 in which an IP address allocated to the NIF 508 of the aforementioned name management device 5 is registered. In the present embodiment, one name management device 5 is assumed to be connected to the IP-SAN 13. Therefore, one record is stored in the name management device table 121. However, in the case of a system where a plurality of name management devices 5 are connected to the IP-SAN 13 in order to, for example, provide redundancy of the name management device 5, the name management device table 121 stores a plurality of records.

FIG. 6(b) shows an example of the data structure of the port table 122. The port table 122 has the same number of records as the physical ports of the migration source storage device 1. Each record of the port table 122 has an entry 1221 in which a port ID is registered, which is an identifier for identifying the physical port corresponding to the record, an entry 1222 in which an IP address allocated to the physical port corresponding to the record is registered, an entry 1223 in which a subnet mask of a subnet to which the IP address belongs is registered, and an entry 1224 in which an IP address of a default gateway of the subnet is registered. In the present embodiment, when "0. 0. 0. 0" is registered in each of an entry 1222, an entry 1223, and an entry 1224 of a record of the port table 122, it shows that an IP address, a subnet mask, and an IP address of a default gateway have not been registered in the physical ports corresponding to the record.

FIG. 6(c) shows an example of the data structure of the target table 123. The target table 123 has the same number of records as combinations of a target managed by the migration source storage device 1 and a physical port allocated to the target. Each record of the target table 123 has an entry 1231 in which an iSCSI name of a target is registered, an entry 1232 in which a port ID of a physical port allocated to the target is registered, and an entry 1233 in which a TCP port number used by the target is registered.

FIG. 6(d) shows an example of a data structure of the LU table 124. The LU table 124 has the same number of records as the LUs managed by the migration source storage device 1. Each record of the LU table 124 has an entry 1241 in which an iSCSI name of a target is registered and an entry 1242 in which an LUN is registered, which is an identifier for identifying the LU allocated to the target. In the present embodiment, when "null" is registered in an entry 1241 of a record of the LU table 124, it shows that the LU corresponding to the record is not allocated to any target.

Further, the data structures of the name management device table 321, the port table 322, the target table 323, and the LU table 324, which are stored in the main memory 301 of the migration destination storage device 3, are identical to the data structures of the name management device table 121, the port table 122, the target table 123, and the LU table 124, respectively.

The data structure of each table stored in the disk device 203 of the management terminal 2 will be explained below. The storage device table 221 and the name management device table 222 form an array structure and can store at least one record. However, the data structure is not limited to the array structure.

FIG. 7(a) shows an example of the data structure of the storage device table 221. The storage device table 221 has the same number of records as the storage devices connected to the IP-SAN 13. Each record of the storage device table 221 has an entry 2211 in which a device ID is registered, which is an identifier for identifying the storage device corresponding to the record, and an entry 2212 in which an IP address allocated to a management NIF of the storage device corresponding to the record is registered. An IP address allocated to a management NIF will be called hereinbelow a management IP address.

FIG. 7(b) shows an example of the data structure of the name management device table 222. The name management device table 222 has the same number of records as the name management devices 5 connected to the IP-SAN 13. Each record of the name management device table 222 has an entry 2221 in which a device ID of the name management device 5 corresponding to the record is registered, an entry 2222 in which an IP address allocated to a NIF 508 of the name management device 5 corresponding to the record is registered, and an entry 2223 in which a management IP address allocated to a management NIF 509 of the name management device 5 corresponding to the record is registered. As described hereinabove, in the present embodiment, one name management device 5 is assumed to be connected to the IP-SAN 13. Therefore, one record is stored in the name management device table 222.

The data structure of each table stored in the disk device 503 of the name management device 5 will be described below. The iSCSI node table 521 and the domain table 522 have an array structure and can store at least one record. However, the data structure is not limited to the array structure.

FIG. 7(c) shows an example of the data structure of the iSCSI node table 521. The iSCSI node table 521 has the same number of records as combinations of an iSCSI node managed by the migration source storage device 1, the migration destination storage device 3 or the host 4, an IP address and a TCP port number allocated to the iSCSI node. Each record of the iSCSI node table 521 has an entry 5211 in which an iSCSI name of the iSCSI node corresponding to the record is registered; an entry 5212 in which a node type is registered, which is a character row for discriminating as to whether the iSCSI node corresponding to the record is an initiator or a target; an entry 5213 and an entry 5214 in which, respectively, an IP address and a TCP port number allocated to the iSCSI node corresponding to the record are registered; and an entry 5215 in which a change notification flag showing whether or not the iSCSI node corresponding to the record requested change notification is registered.

In the present embodiment, when the designation "initiator" is registered in an entry 5212 of a record of the iSCSI node table 521, it shows that the iSCSI node corresponding to the record is an initiator; and, when the designation "target" is registered in the entry 5212, it shows that the iSCSI node corresponding to the record is a target. Furthermore, in the present embodiment, when the designation "null" is registered in an entry 5214 of a record of the iSCSI node table 521, it shows that a TCP port number that will be used by the iSCSI node corresponding to the record is not determined. Further, in the present embodiment, when "0" is registered in an entry 5215 of a record of the iSCSI node table 521, it shows that the iSCSI node corresponding to the record has not requested a change notification, and, when "1" is registered in the entry 5215, it shows that the iSCSI node has requested a change notification.

FIG. 7(d) shows an example of the data structure of the domain table 522. The domain table 522 has the same number of records as combinations of a discovery domain registered in the name management device 5 and iSCSI nodes belonging to the discovery domain. Each record of the domain table 522 has an entry 5221 in which a domain ID, which is an identifier for identifying a discover domain, is registered and an entry 5222 in which an iSCSI name of an iSCSI node belonging to the discovery domain is registered.

The graphical user interfaces (referred to hereinbelow as "GUI"s) of the present embodiment will be explained below. The GUIs are displayed on the display 205 when the CPU 204 of the management terminal 2 executes the GUI control program 211. The system administrator configures each parameter of the displayed GUIs by using the character input device 207 and the pointing device 206. Further, the management terminal 2 may provide the system administrator with command line interfaces having functions identical to those of the GUIs, instead of the GUIs designated in connection with the present embodiment.

FIG. 8(a) shows a display example of a storage management screen 800 used by the system administrator or the like to register in or delete from the management terminal 2 information of the storage device connected to the IP-SAN 13. The storage management screen 800 has an area 801 to which the device ID of the storage device is inputted; an area 802 to which a management IP address of the storage device is inputted; a button 810 that is used when the information inputted into the area 801 and the area 802 is registered in the management terminal 2; a button 811 that is used when the information of the storage device specified by using an area 812 is deleted from the management terminal 2; the area 812 for displaying information of all of the storage devices that have already been registered in the management terminal 2; a button 813 and a button 815 that is used when the display range of the area 812 is moved up and down, respectively, by one line; a button 814 that is used when the display range of the area 812 is moved to any position; and a button 819 that is used when the storage management screen 800 is closed.

FIG. 8(b) shows an example of a name management device management screen 820 used by the system administrator or the like to register in the management terminal 2 information of the name management device 5 that is connected to the IP-SAN 13. The name management device management screen 820 has an area 821 to which the device ID of the name management device 5 is inputted; an area 822 to which the IP address allocated to the NIF 508 of the name management device 5 is inputted; an area 823 to which the management IP address of the name management device 5 is inputted; a button 828 that is used when the information inputted into the areas from the area 821 to the area 823 is registered in the management terminal 2; and a button 829 that is used when registration of the information relating to the name management device 5 is canceled.

FIG. 9(a) shows an example of a domain management screen 900 used by the system administrator or the like to register in or delete from the name management device 5 information of a discovery domain. The domain management screen 900 has an area 901 to which the domain ID of the discovery domain is inputted; an area 902 to which an iSCSI name of an iSCSI node, which belongs to the discovery domain, is inputted; a button 910 that is used when the information inputted into the area 901 and the area 902 is registered in the name management device 5; a button 911 that is used when the information of the discovery domain specified by using an area 912 is deleted from the name management device 5; the area 912 for displaying the information of all the discovery domains that have already been registered in the name management device 5; a button 913 and a button 915 that are used when the display range of the area 912 is moved up and down, respectively, by one line; a button 914 that is used when the display range of the area 912 is moved to any position; and a button 919 that is used when the domain management screen 900 is closed.

FIG. 9(*b*) shows a display example of a port management screen 920 used by the system administrator or the like to register in or delete from one of the storage devices information of a physical port owned by the storage device. The port management screen 920 has a button 922 that is used when the device ID of the storage device having the physical port that will be registered is selected from a list; an area 921 for displaying the device ID selected by using the button 922; an area 923 to which the port ID of the physical port is inputted; an area 924 to which an IP address allocated to the physical port is inputted; an area 925 to which a subnet mask of a subnet, to which the physical port is connected, is inputted; an area 926 to which an IP address of a default gateway of the subnet is inputted; a button 930 that is used when the information inputted into the areas from the area 923 to the area 926 is registered in the storage device having the device ID selected by using the button 922; a button 931 that is used when the information of the physical port specified by using the area 932 is deleted from the storage device; an area 932 for displaying the information of all of the physical ports of all of the storage devices connected to the IP-SAN 13; a button 933 and a button 935 that is used when the display range of the area 932 is moved up and down, respectively, by one line; a button 934 that is used when the display range of the area 932 is moved to any position; and a button 939 that is used when the port management screen 920 is closed.

Figure 10:
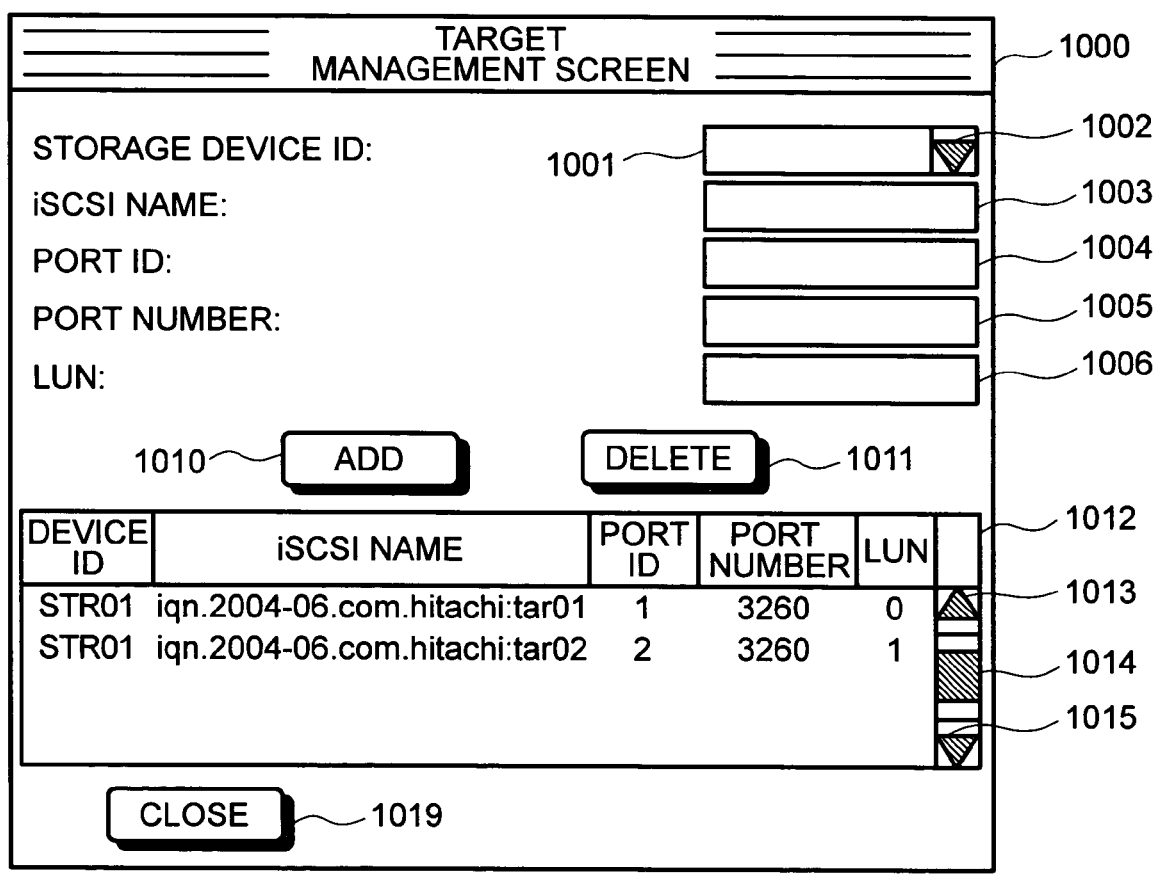
FIG. 10 is a diagram which shows an example of a display of a target management screen.

FIG. 10 shows an example of a target management screen 1000 used by the system administrator or the like for registering in or deleting from one of the storage devices information of a target operating in the storage device. The target management screen 1000 has a button 1002 that is used when the device ID of the storage device managing target to be registered is selected from a list; an area 1001 for displaying the device ID selected by using the button 1002; an area 1003 to which an iSCSI name of the target is inputted; an area 1004 to which a port ID of a physical port allocated to the target is inputted; an area 1005 to which a TCP port number that is used by the target is inputted; an area 1006 to which an LUN of an LU allocated to the target is inputted; a button 1010 that is used when the information inputted into the areas from the area 1003 to the area 1006 is registered in the storage device having the device ID selected by the button 1002; a button 1011 that is used when the information of the target specified by using the area 1012 is deleted from the storage device; an area 1012 for displaying the information of all of the targets that have already been registered in all of the storage devices connected to the IP-SAN 13; a button 1013 and a button 1015 that is used when the display range of the area 1012 is moved up and down, respectively, by one line; a button 1014 that is used when the display range of the area 1012 is moved to any position; and a button 1019 that is used when the target management screen 1000 is closed.

Figure 11:
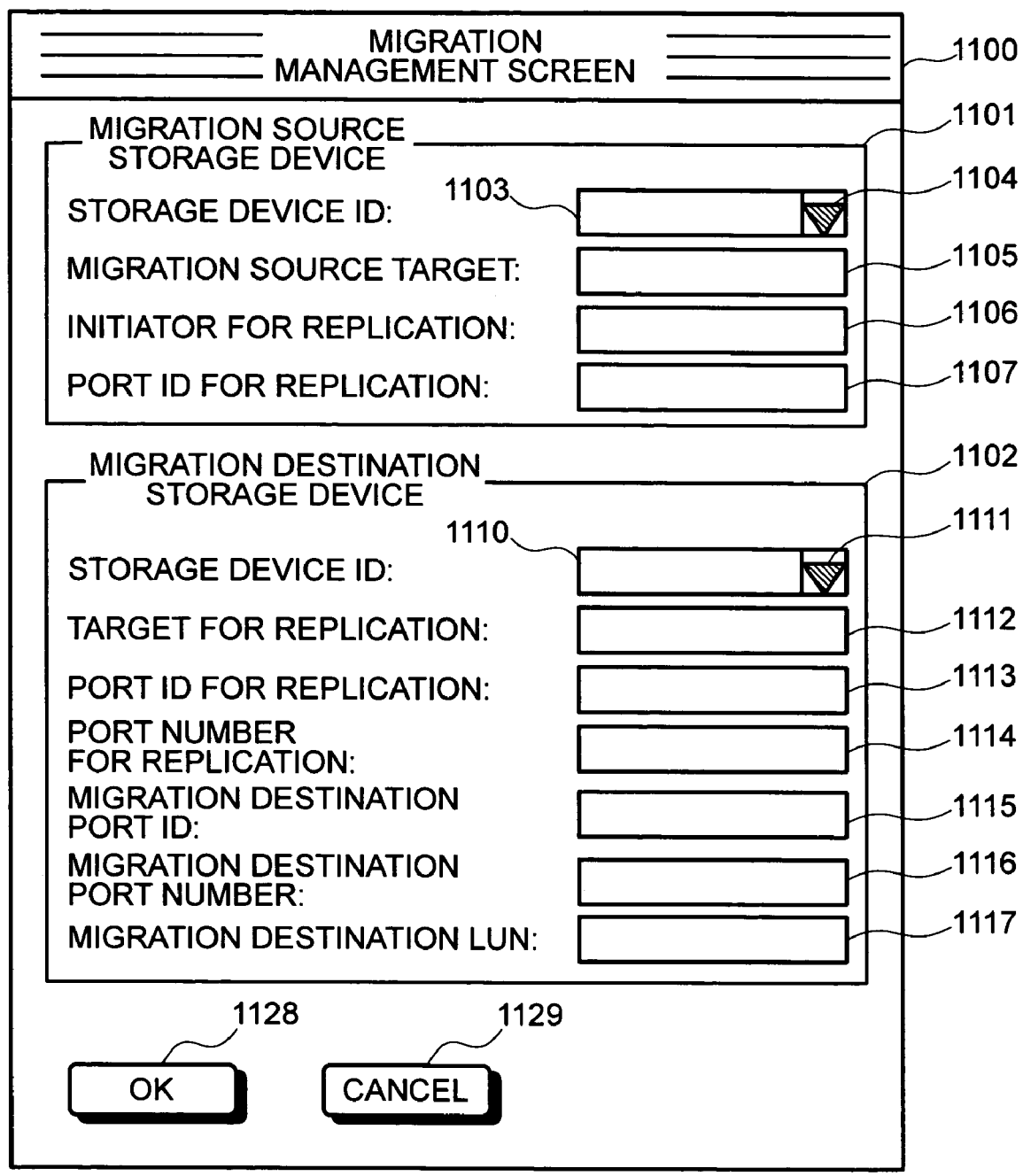
FIG. 11 is a diagram which shows an example of a display of a migration management screen.

FIG. 11 shows an example of a migration management screen 1100 used by the system administrator or the like when migration of storage devices is conducted for each target. The migration management screen 1100 has an area 1101 to which information relating to the migration source storage device 1 is inputted; an area 1102 to which information relating to the migration destination storage device 3 is inputted; a button 1128 that is used when the start of the migration processing is designated to the migration source storage device 1 according to the information inputted into the area 1101 and the area 1102; and a button 1129 that is used when the migration processing is canceled. Further, the area 1101 is composed of a button 1104 that is used when the device ID of the migration source storage device 1 is selected from a list; an area 1103 for displaying the device ID selected by using the button 1004; an area 1105 to which an iSCSI name of a target, which is the migration object, is inputted; an area 1106 to which an iSCSI name of an initiator is inputted, which is used by the migration source storage device 1 when migration of data into the migration destination storage device 3 is conducted by using synchronous replication; and an area 1107 to which a port ID of a physical port is inputted, which is used by the migration source storage device 1 for the data migration using synchronous replication. Furthermore, the area 1102 is composed of a button 1111 that is used when the device ID of the migration destination storage device 3 is selected from a list; an area 1110 for displaying the device ID selected by using the button 1111; an area 1112 to which an iSCSI name of a target is inputted, which is used by the migration destination storage device 3 during the data migration using synchronous replication; an area 1113 to which a port ID of a physical port allocated to the target is inputted; an area 1114 to which a TCP port number used by the target is inputted; an area 1115 to which a port ID of a physical port allocated to the target is inputted, which will be migrated from the migration source storage device 1 to the migration destination storage device 3; an area 1116 to which a TCP port number that is used by the target is inputted, which will be migrated from the migration source storage device 1 to the migration destination storage device 3; and an area 1117 to which an LUN of an LU allocated to the target is inputted, which will be migrated from the migration source storage device 1 to the migration destination storage device 3.

The communication sequence and the operation procedure in the present embodiment will be explained hereinbelow.

In the present embodiment, the system administrator or the like conducts operations according to the following sequence. First, the system administrator or the like designates the table initialization processing to the management terminal 2. Then, the system administrator or the like registers the information relating to the name management device 5 and the migration source storage device 1 in the management terminal 2 by using the name management device management screen 820 and the storage device management screen 800 (the above-mentioned communication sequence will be explained with reference to FIG. 12).

The system administrator or the like then uses the domain management screen 900 and registers, in the name management device 5, the information of a discovery domain to which an initiator managed by the host 4 and a target managed by the migration source storage device 1 belong. Then, the system administrator or the like uses the port management screen 920 and the target management screen 1000 and registers, in the migration source storage device 1, the information relating to physical ports and targets, respectively, of the migration source storage device 1 (the above-described communication sequence will be explained with reference to FIG. 13). Then, the system administrator or the like performs configuration for accessing the target managed by the migration source storage device 1 in the host 4 and activates the initiator (the above-described communication sequence will be explained with reference to FIG. 14).

Then, the system administrator or the like conducts operations necessary for migrating the target managed by the migration source storage device 1 to the migration destination storage device 3. First, the system administrator or the like uses the storage device management screen 800 and registers the information relating to the migration destination storage device 3 in the management terminal 2, and then the system administrator or the like uses the port management screen 920 and registers the information relating to physical ports of the migration destination storage device 3 in the migration destination storage device 3 (the above-described communication sequence will be explained with reference to FIG. 15). Further, the system administrator or the like uses the migration management screen 1100 and designates the start of the migration processing to the migration source storage device 1 (the above-described communication sequence will be explained with reference to FIG. 16 to FIG. 18).

In the explanation of the communication sequence and the operation procedure provided hereinbelow, the following examples of parameters will be used.

First, in the present embodiment, the IP-SAN 13 is assumed to be composed of one subnet, and the network address, the subnet mask, and the IP address of the default gateway of this subnet will be "172. 16. 0. 0", "255. 255. 0. 0", and "172. 16. 0. 254", respectively. On the other hand, the management network is assumed to be composed of one subnet, and the network address and the subnet mask of this subnet will be "192. 168. 0. 0" and "255. 255. 255. 0", respectively.

Furthermore, in the present embodiment, the device ID and the management IP address of the migration source storage device 1 are assumed to be "STR01" and "192. 168. 0. 1", respectively. The migration source storage device 1 is assumed to have two physical ports. The respective physical ports will be referred to hereinbelow as the first physical port and the second physical port. The IP addresses "172. 16. 0. 1" and "172. 16. 0. 2" will be allocated to the first physical port and the second physical port, respectively. Further, the migration source storage device 1 is assumed to manage two LUs. Those LUs will be referred to hereinbelow as the first LU and the second LU. Further, the migration source storage device 1 is assumed to manage two targets. The first target is assumed to have an iSCSI name "iqn. 2004-06. com. hitachi: tar01" and to be allocated with the first physical port and the first LU. The second target is assumed to have an iSCSI name "iqn. 2004-06. com. hitachi: tar02" and to be allocated with the second physical port and the second LU. Both targets are assumed to use "3260", which is the well-known port, as the TCP port number.

On the other hand, the device ID and the management IP address of the migration destination storage device 3 are assumed to be "STR02" and "192. 168. 0. 2", respectively. The migration destination storage device 3 is assumed to have two physical ports. The respective physical ports will be referred to hereinbelow as the third physical port and the fourth physical port. The IP addresses "172. 16. 0. 3" and "172. 16. 0. 4" are assumed to be allocated to the third physical port and the fourth physical port, respectively. Further, the migration destination storage device 3 is assumed to manage two LUs. Those LUs will be referred to hereinbelow as the third LU and the fourth LU, respectively. The capacity of the third LU and the fourth LU will be assumed to be identical to that of the first LU and the second LU, respectively.

Further, in the present embodiment, the device ID, the IP address of the NIF 508, and the management IP address of the name management device 5 are assumed to be "NM01", "172. 16. 0. 253", and "192. 168. 0. 253", respectively.

Further, in the present embodiment, the IP address of the NIF 408 of the host 4 is assumed to be "172. 16. 0. 128". The initiator managed by the host 4 will be called the first initiator, and it is assumed to have an iSCSI name "iqn. 1999-08. com. abc: host01" and to communicate by the iSCSI protocol with the first target managed by the migration source storage device 1. A discovery domain, which has a domain ID "DD01" and to which the first initiator and the first target belong, is assumed to be registered in the name management device 5 so that the first initiator will be capable of discovery of the first target.

Figure 12:
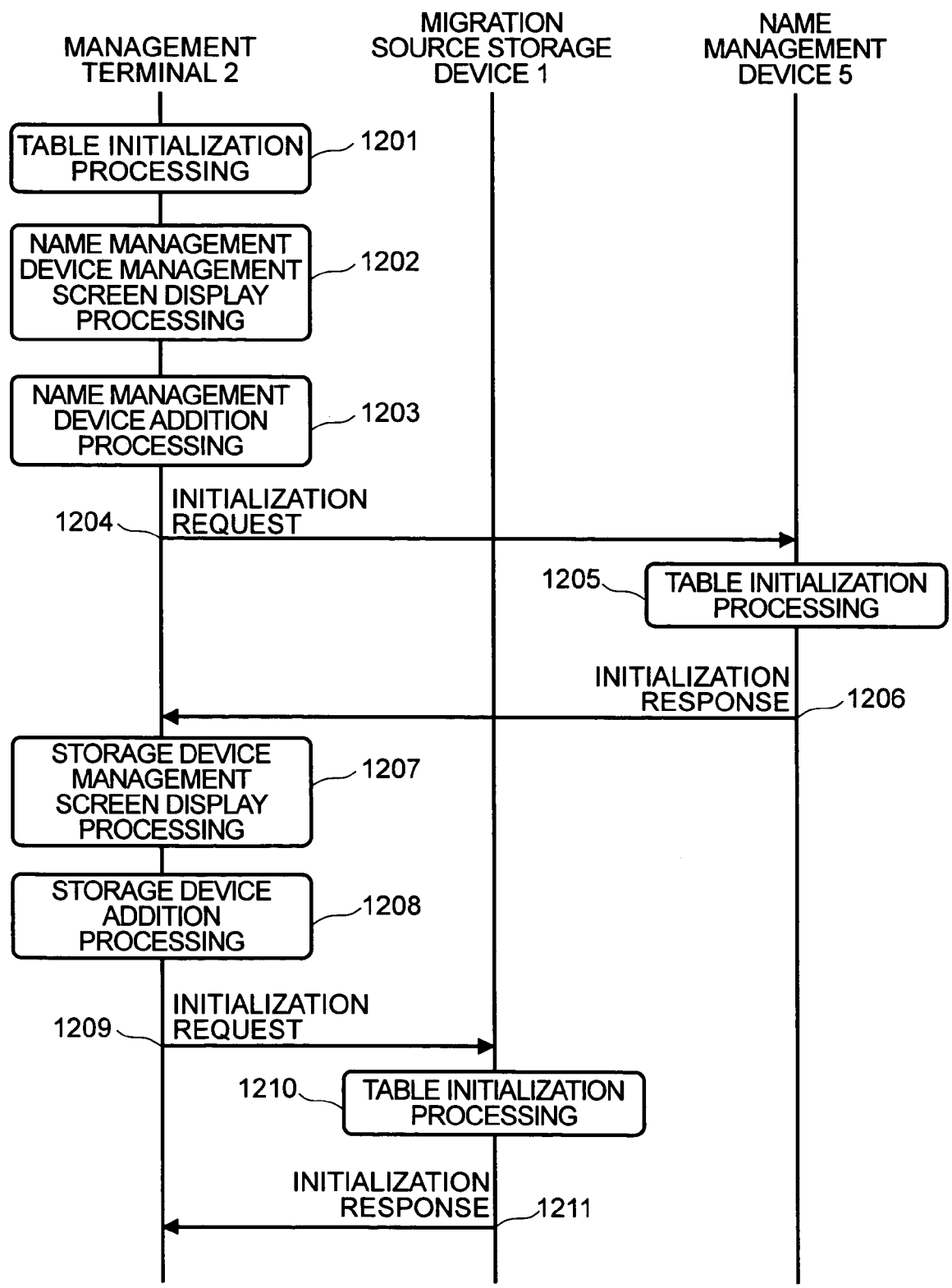
FIG. 12 is a sequence diagram which shows a communication sequence relating to table initialization processing of the management terminal and registration processing of information, relating to the name management device and the migration source storage device, as applied to the management terminal in the first embodiment.

FIG. 12 shows an example of a communication sequence relating to a case where the system administrator or the like designates the table initialization processing to the management terminal 2 and registers the information relating to the name management device 5 and the migration source storage device 1 in the management terminal 2.

First, the system administrator or the like uses the pointing device 206 or the character input device 207 and designates table initialization to the management terminal 2. The CPU 204 of the management terminal 2, which has received the designation, executes the GUI control program 211 and conducts the table initialization processing (1201). In this table initialization processing, the CPU 204 of the management terminal 2 sets the storage device table 221 and the name management device table 222 into a state in which no records are present. After the table initialization processing has been completed, the CPU 204 of the management terminal 2 displays, on the display 205, a screen showing the completion of the table initialization.

If the system administrator or the like then uses the pointing device 206 or the character input device 207 and designates display of the name management device management screen 820 to the management terminal 2, the CPU 204 of the management terminal 2 executes the GUI control program 211 and carries out the name management device management screen display processing (1202). In this name management device management screen display processing, the CPU 204 of the management terminal 2 displays the name management device management screen 820 on the display 205.

Then, the system administrator or the like inputs the information relating to the name management device 5 into the areas from the area 821 to the area 823 of the name management device management screen 820. In the present embodiment, "NM01", which is the device ID of the name management device 5, "172. 16. 0. 253", which is the IP address of the NIF 508 of the name management device 5, and "192. 168. 0. 253", which is the management IP address of the name management device 5" are inputted into the area 821, the area 822, and the area 823, respectively.

If the system administrator or the like then actuates the button 828, the CPU 204 of the management terminal 2 executes the GUI control program 211 and conducts the name management device addition processing (1203). In the name management device addition processing, first, the CPU 204 of the management terminal 2 adds a record to the name management device table 222. Here, the contents inputted into the area 821, the area 822, and the area 823 are respectively registered in the entry 2221 (device ID), the entry 2222 (IP address), and the entry 2233 (management IP address) of the record which is added.

Then, the CPU 204 of the management terminal 2 sends an initialization request to the name management device 5 via the management NIF 209 (1204). The destination IP address of the initialization request is assumed to be the contents inputted into the area 823.

If the initialization request is received, the CPU 504 of the name management device 5 executes the domain management program 511 and the iSCSI node management program 512 and conducts the table initialization processing (1205). In this table initialization processing, first, the CPU 504 of the name management device 5 executes the domain management program 511 and sets the domain table 522 into a state in which no records are present. Then, the CPU 504 of the name management device 5 executes the iSCSI node management program 512 and sets the iSCSI node table 521 into a state in which no records are present.

If the above-described table initialization processing is completed, the CPU 504 of the name management device 5 composes an initialization response indicating that the initialization was completed successfully and sends the response to the management terminal 2 via the management NIF 509 (1206). If the initialization response is received, the CPU 204 of the management terminal 2, displays on the display 205, the screen showing that the registration of the name management device has been completed.

Then, the system administrator or the like uses the pointing device 206 or the character input device 207 and designates the display of the storage device management screen 800 to the management terminal 2. The CPU 204 of the management terminal 2, which has received the designation, executes the GUI control program 211 and carries out the storage device management screen display processing (1207). In the storage device management screen display processing, the CPU 204 of the management terminal 2 displays the storage device management screen 800 on the display 205, reads all of the records from the storage device table 221, and displays the contents of each record in the area 812.

Then, the system administrator or the like inputs the information relating to the migration source storage device 1 into the area 801 and the area 802 of the storage device management screen 800. In the present embodiment, "STR01", which is the device ID of the migration source storage device 1, and "192. 168. 0. 1", which is the management IP address of the migration source storage device 1, are inputted into the area 801 and the area 802, respectively.

If the system administrator or the like then specifies the button 810, the CPU 204 of the management terminal 2 executes the GUI control program 211 and carries out the storage device addition processing (1208). In the storage device addition processing, first, the CPU 204 of the management terminal 2 adds a record to the storage device table 221. Here, the contents inputted into the area 801 and the area 802 are respectively registered in the entry 2211 (device ID) and the entry 2212 (management IP address) of the record which is added.

Then, the CPU 204 of the management terminal 2 composes an initialization request, including the contents of the entry 2221 (device ID) and the entry 2222 (IP address) of the first record of the name management device table 222, and sends this request to the migration source storage device 1 via the management NIF 209 (1209). The destination IP address of the initialization request is assumed to be the contents inputted into the area 802.

If the initialization request is received, the CPU 104 of the migration source storage device 1 executes the migration source storage device control program 112 and conducts the table initialization processing (1210). In this table initialization processing, first, the CPU 104 of the migration source storage device 1 sets the name management device table 121, the port table 122, the domain table 123, and the LU table 124 into a state in which no records are present. Then, the CPU 104 of the migration source storage device 1 fetches the contents of the entry 2221 (device ID) and the entry 2222 (IP address) from the initialization request and adds a record to the name management device table 121. The contents of the entry 2221 (device ID) and the entry 2222 (IP address) fetched from the initialization request are registered respectively in the entry 1211 (device ID) and the entry 1212 (IP address) of the record which is added.

Then, the CPU 104 of the migration source storage device 1 allocates port IDs to all of the physical ports of the migration source storage device 1 and adds, to the port table 122, records, in each of which each of the port IDs allocated is registered, in the entry 1221 (port ID) and "0. 0. 0. 0." is registered in the entry 1222 (IP address), the entry 1223 (subnet mask), and the entry 1224 (gateway). In the present embodiment, the CPU 104 of the migration source storage device 1 is assumed to sequentially allocate integers, starting from "1", as a port ID, to each physical port. In the present embodiment, port IDs "1" and "2" are allocated to the first physical port and the second physical port, respectively, of the migration source storage device 1.

Furthermore, the CPU 104 of the migration source storage device 1 allocates LUNs to all the LUs managed by the migration source storage device 1 and adds, to the LU table 124, records, in each of which the entry 1241 (target) is "null" and the entry 1242 (LUN) is each allocated LUN. In the present embodiment, the CPU 104 of the migration source storage device 1 is assumed to sequentially allocate integers, starting from "0", as an LUN to each LU. In the present embodiment, the LUNs "0" and "1" are allocated, respectively, to the first and the second LU of the migration source storage device 1.

After the above-described table initialization processing has been completed, the CPU 104 of the migration source storage device 1 composes an initialization response showing that the initialization was completed successfully and sends the response to the management terminal 2 via the management NIF 109 (1211). If the initialization response is received from the migration source storage device 1, the CPU 204 of the management terminal 2 adds to the area 812 a line composed of the contents inputted into the area 801 and the area 802.

Figure 13:
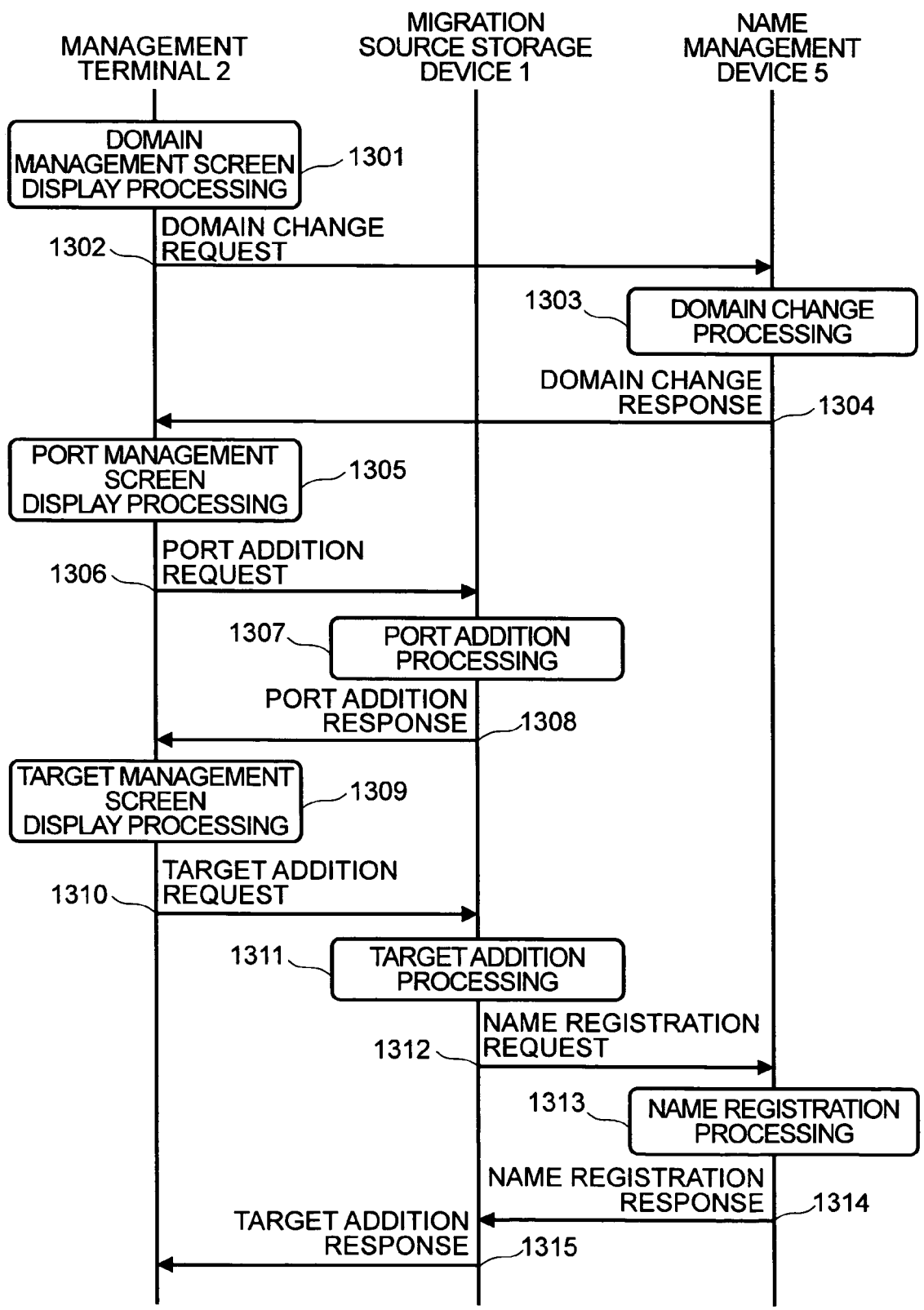
FIG. 13 is a sequence diagram which shows a communication sequence relating to registration processing of information of a discovery domain applied to the name management device and registration processing of information relating to a physical port and a target as applied to the migration source storage device in the first embodiment.

FIG. 13 shows an example of a communication sequence relating to the case where the system administrator or the like registers, in the name management device 5, the information of the discovery domain to which the first initiator and the first target belong and registers, in the migration source storage device 1, the information relating to the physical ports and the targets. Further, in the present embodiment, the system administrator or the like carries out the discovery domain registration in the order of the first target and the first initiator, but the registration may be conducted in a reverse order. Further, in the present embodiment, the system administrator registers the information relating to physical ports in the order of the first physical port and the second physical port and registers the information relating to targets in the order of the first target and the second target, but the registration also may be conducted in a reverse order.

First, the system administrator or the like uses the pointing device 206 or the character input device 207 and designates display of the domain management screen 900 to the management terminal 2. The CPU 204 of the management terminal 2, which has received the designation, executes the GUI control program 211 and conducts the domain management screen display processing (1301). In the domain management screen display processing, first, the CPU 204 of the management terminal 2 displays the domain management screen 900 on the display 205. Then, the CPU 204 of the management terminal 2 reads all of the records of the domain table 522 from the name management device 5 corresponding to the first record of the name management device table 222 and displays the contents of the records in the area 912.

Then, the system administrator or the like inputs the information relating to the discovery domain into the area 901 and the area 902 of the domain management screen 900. In the present embodiment, "DD01" and "iqn. 2004-06. com. hitachi: tar01", which is the iSCSI name of the first target, are inputted into the area 901 and the area 902, respectively.

If the system administrator or the like then specifies the button 910, the CPU 204 of the management terminal 2 composes a domain change request including the contents of the area 901 and the area 902 and sends the request via the management NIF 209 to the name management device 5 corresponding to the first record of the name management device table 222 (1302). The destination IP address of the domain change request is assumed to be the contents of the entry 2223 (management IP address) of the first record of the name management device table 222.

If the domain change request is received, the CPU 504 of the name management device 5 executes the domain control program 511 and carries out the domain change processing (1303). In this domain change processing, the CPU 504 of the name management device 5 fetches the contents of the area 901 and the area 902 from the received domain change request and adds a record to the domain table 522. The contents of the area 901 are registered in the entry 5221 (domain ID) of the record which is added, and the contents of the area 902 are registered in the entry 5222 (iSCSI node) of the record.

If the above-described domain change processing is completed, the CPU 504 of the name management device 5 composes a domain change response indicating that the addition of the iSCSI node to the discovery domain was completed successfully and sends this response to the management terminal 2 via the management NIF 509 (1304). If the domain change response is received, the CPU 204 of the management terminal 2 adds, to the area 912, one line composed of the contents inputted into the area 901 and the area 902.

Then, the system administrator or the like again executes the operations from 1301 to 1304. However, in the operation 1301, "DD01" and "iqn. 1999-08. com. abc: host01", which is the iSCSI name of the first initiator, are inputted into the area 901 and the area 902, respectively. The discovery domain "DD01" to which the first initiator and the first target belong has been thereby registered in the name management device 5.

Then, the system administrator or the like uses the pointing device 206 or the character input device 207 and designates display of the port management screen 920 to the management terminal 2. The CPU 204 of the management terminal 2, which has received the designation, executes the GUI control program 211 and conducts the port management screen display processing (1305). In the port management screen display processing, the CPU 204 of the management terminal 2 displays the port management screen 920 on the display 205. Furthermore, the CPU 204 of the management terminal 2 reads the entries 2211 (device ID) of all of the records of the storage device table 221, creates a list of device IDs of the storage devices according to the results, and makes it possible to display the list of device IDs of the storage devices when the button 922 is specified by the system administrator or the like. Duplication of a device ID in the list of the device IDs of the storage devices is avoided. Further, the CPU 204 of the management terminal 2 reads the port table 122 from the storage devices corresponding to all of the records of the storage device table 221, merges the contents thereof, and displays it in the area 932.

Then, the system administrator or the like selects the device ID of the migration source storage device 1 by using the button 922 of the port management screen 920 and inputs the information relating to the physical ports of the migration source storage device 1 into the areas from the area 923 to the area 926. In the present embodiment, "STR01", which is the device ID of the migration source storage device 1, is selected by using the button 922, and "1", which is the port ID of the first physical port, "172. 16. 0. 1", "255. 255. 0. 0", and "172. 16. 0. 254" are inputted into the area 923, the area 924, the area 925, and the area 926, respectively.

If the system administrator or the like then specifies the button 930, the CPU 204 of the management terminal 2 composes a port addition request including the contents of areas from the area 923 to the area 926 and sends the request via the management NIF 209 to the storage device having the device ID selected by using the button 922 (1306). The destination IP address of the port addition request is obtained by searching the storage device table 221 on condition that the device ID selected by using the button 922 matches the contents of the entry 2211 (device ID), and fetching the contents of the entry 2212 (management IP address) of the record that agrees with this condition.

If the port addition request is received, the CPU 104 of the migration source storage device 1 executes the migration source storage device control program 112 and conducts the port addition processing (1307). In the port addition processing, the CPU 104 of the migration source storage device 1 fetches the contents of the areas from the area 923 to the area 926 from the port addition request and changes the record of the port table 122. The contents of the area 923 are registered in the entry 1221 (port ID) of the changed record. The contents of the area 924 are registered in the entry 1222 (IP address), the contents of the area 925 are registered in the entry 1223 (subnet mask), and the contents of the area 926 are registered in the entry 1224 (gateway).

If the above-described port addition processing is completed, the CPU 104 of the migration source storage device 1 composes a port addition response indicating that the registration of information relating to the physical port was completed successfully and sends the response to the management terminal 2 via the management NIF 109 (1308). If the port addition response is received, the CPU 204 of the management terminal 2 adds to the area 932 one line composed of the device ID selected by using the button 922 and the contents inputted into the areas from the area 923 to the area 926.

Furthermore, the system administrator or the like then again executes the operations from 1305 to 1308. However, in the operation 1305, "STR01", which is the device ID of the migration source storage device 1, is selected by using the button 922, and "2", which is the port ID of the second physical port, "172. 16. 0. 2", "255. 255. 0. 0", and "172. 16. 0. 254" are inputted into the area 923, the area 924, the area 925, and the area 926, respectively. In other words, the system administrator or the like repeats the above-described processing until off of the port information is registered.

The system administrator or the like then designates display of the target management screen 1000 to the management terminal 2. Based on this designation, the CPU 204 of the management terminal 2 executes the GUI control program 211 and carries out the target management screen display processing (1309). In the target management screen display processing, the CPU 204 of the management terminal 2 displays the target management screen 1000 on the display 205. Furthermore, the CPU 204 of the management terminal 2 reads the entries 2211 (device ID) of all of the records of the storage device table 221, creates a list of device IDs of the storage devices according to the results, and makes it possible to display the list of device IDs of the storage devices when the button 1002 is specified by the system administrator or the like. Duplication of a device ID in the list of the device IDs of the storage devices is avoided.

Further, the CPU 204 of the management terminal 2 reads the target table 123 and the LU table 124 from the storage devices corresponding to all of the records of the storage device table 221, merges the contents thereof, and displays it in the area 1012. Then, the system administrator or the like selects the device ID of the migration source storage device 1 by using the button 1002 of the target management screen 100 and inputs the information relating to one of the targets operating in the migration source storage device 1 into the areas from the area 1003 to the area 1006. In the present embodiment, "STR01", which is the device ID of the migration source storage device 1, is selected by using the button 1002, and "iqn. 2004-06. com. hitachi: tar01", which is the iSCSI name of the first target, "1", which is the port ID of the first physical port, "3260", which is the well-known port, and "0", which is the LUN of the first LU, are inputted into the area 1003, the area 1004, the area 1005, and the area 1006, respectively.

If the system administrator or the like then specifies the button 1010, the CPU 204 of the management terminal 2 composes a target addition request including the contents of the areas from the area 1003 to the area 1006 and sends the request via the management NIF 209 to the storage device having the device ID selected by using the button 1002 (1310). The destination IP address of the target addition request is obtained by searching the storage device table 221 on condition that the device ID selected by using the button 1002 matches the contents of the entry 2211 (device ID) and by fetching the contents of the entry 2212 (management IP address) of the record that agrees with this condition.

If the target addition request is received, the CPU 104 of the migration source storage device 1 executes the migration source storage device control program 112 and carries out the target addition processing (1311). In the target addition processing, the CPU 104 of the migration source storage device 1 fetches the contents of the areas from the area 1003 to the area 1006 from the target addition request and adds a record to the target table 123. The contents of the area 1003 are registered in the entry 1231 (target) of the record added to the target table 123, the contents of the area 1004 are registered in the entry 1232 (port ID), and the contents of the area 1005 are registered in the entry 1233 (port number). Then, the CPU 104 of the migration source storage device 1 searches the LU table 124 on condition that the contents of the entry 1242 (LUN) match the contents of the area 1006 and registers the contents of the area 1003 in the entry 1241 (target) of the record that agrees with this condition.

If the above-described target addition processing is completed, the CPU 104 of the migration source storage device 1 searches the port table 122 on condition that the contents of the area 1004 match the contents of the entry 1221 (port ID) and reads the contents of the entry 1222 (IP address) of the record that agrees with this condition. Then, the CPU 104 of the migration source storage device 1 composes a name registration request, including the contents of the area 1003, information showing than the node type is a target, contents of the entry 1222 (IP address), which was read, and the contents of the area 1005, and sends the request to the name management device 5 via the NIF 108 (1312). The destination IP address of the name registration request is assumed to be the contents of the entry 1212 (IP address) of the first record of the name management device table 121.

If the name registration request is received, the CPU 504 of the name management device 5 executes the iSCSI node management program 512 and carries out the name management processing (1313). In the name management processing, the CPU 504 of the name management device 5 fetches the contents of the area 1003, information showing that the node type is a target, the contents of the entry 1222 (ID address), and the contents of the area 1005 from the received name registration request, and adds a record to the iSCSI node table 521. The contents of the area 1003 is registered in the entry 5211 (iSCSI node) of the record which is added, "target" is registered in the entry 5212 (node type), the contents of entry 1222 (IP address) are registered in the entry 5213 (IP address), the contents of area 1005 are registered in the entry 5214 (port number), and "0" is registered in the entry 5215 (change notification flag).

If the above-described name registration processing is completed, the CPU 504 of the name management device 5 composes a name registration response indicating that the registration of the name was completed successfully and sends the response to the migration source storage device 1 via the NIF 508 (1314).

If the name registration response is received, the CPU 104 of the migration source storage device 1 composes a target addition response indicating that the registration of the information relating to the target was completed successfully and sends this response to the management terminal 2 via the management NIF 109 (1315). If the target addition response is received, the CPU 204 of the management terminal 2 adds to the area 1012 one line composed of the device ID selected by using the button 1002 and the contents inputted into the areas from the area 1003 to the area 1006.

The system administrator or the like then again executes the operations from 1309 to 1315. However, in the operation 1309, "STR01", which is the device ID of the migration source storage device 1, is selected by using the button 1002, and "iqn. 2004-06. com. hitachi: tar02", which is the iSCSI name of the second target, "2", which is the port ID of the second physical port, "3260", and "1", which is the LUN of the second LU, are inputted into the area 1003, the area 1004, the area 1005, and the area 1006, respectively. In other words, the system administrator or the like repeats the above-described processing until all of the targets are configured.

Figure 14:
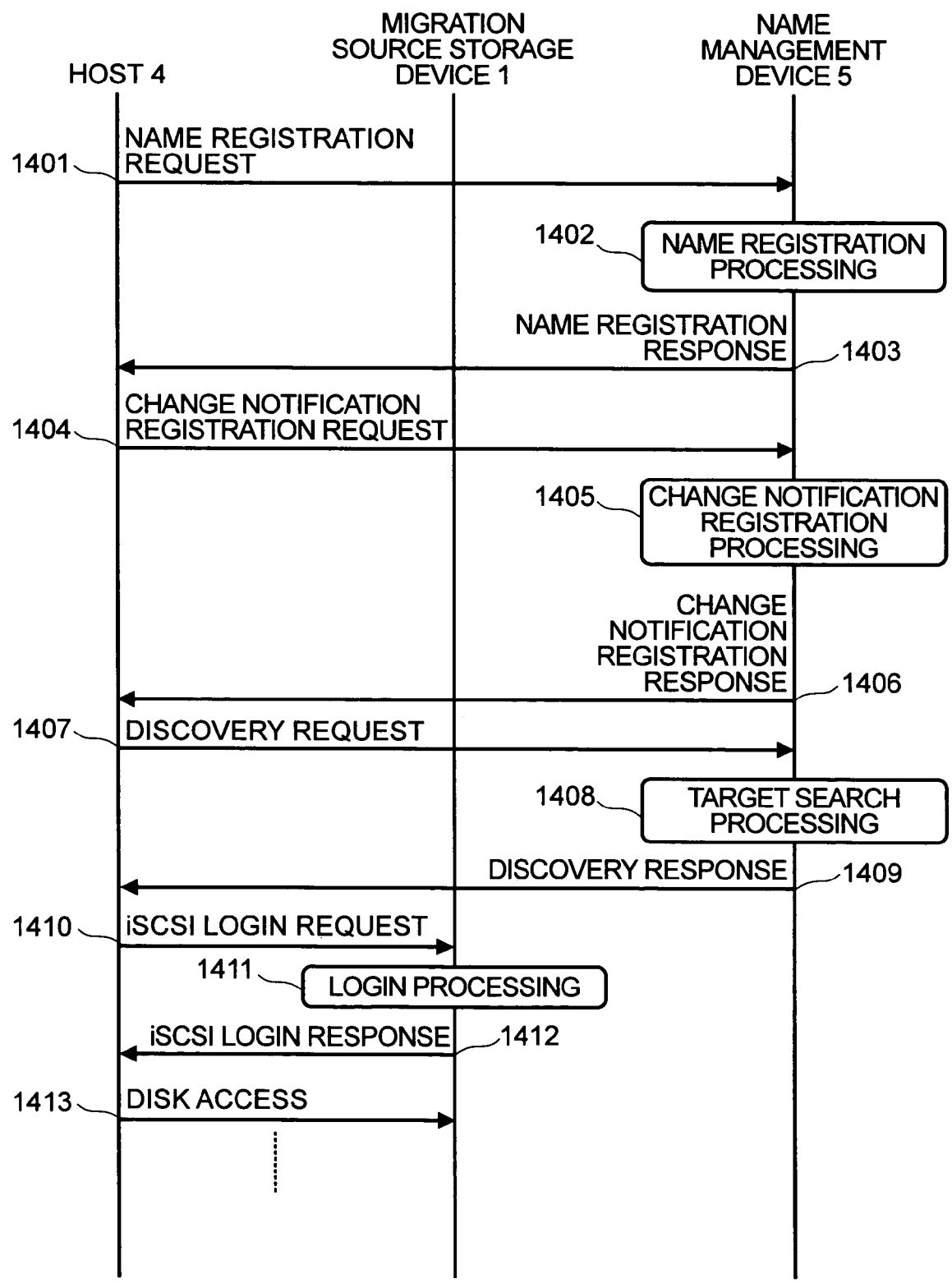
FIG. 14 is a sequence diagram which shows a communication sequence relating to initiator activation on the host in the first embodiment.

FIG. 14 shows an example of a communication sequence relating to the case where the initiator is activated on the host 4. In the present embodiment, the system administrator in advance configures "iqn. 1999-08. com. abc: host01", "172. 16.0. 128", "255. 255. 0. 0", "172. 16. 0. 254", and "172. 16. 0. 253" in the host 4 as the iSCSI name of the first initiator, the IP address of the NIF 408, the subnet mask, the IP address of the default gateway, and the IP address allocated to the NIF 508 of the name management device 5, respectively.

After the above-described configuration has been conducted in the host 4, the system administrator or the like uses the pointing device 406 or the character input device 407 and designates the activation of the first initiator. The CPU 404 of the host 4, to which the activation was designated, executes the name operation program 412, composes a name registration request including the iSCSI name of the first initiator, information showing that the node type is an initiator, the IP address of the NIF 408, and information indicating that the TCP port number is undetermined, and sends the request to the name management device 5 via the NIF 408 (1401). The destination IP address of the name registration request is assumed to be the IP address allocated to the NIF 508.

If the name registration request from the host 4 is received, the CPU 504 of the name management device 5 executes the iSCSI node management program 512 and conducts the name registration processing (1402). In the name registration processing, the CPU 504 of the name management device 5 fetches, from the name registration request, the iSCSI name of the first initiator, the information showing that the node type is an initiator, the IP address of the NIF 408, and the information showing that the TCP port number is undetermined, and adds a record to the iSCSI node table 521. Here, the iSCSI name of the first initiator is registered in the entry 5211 (iSCSI node) of the record which is added, "initiator" is registered in the entry 5212 (node type), the IP address of the NIF 408 is registered in the entry 5213 (IP address), "null" is registered in the entry 5214 (port number), and "0" is registered in entry 5215 (change notification flag).

If the above-described name registration processing is completed, the CPU 504 of the name management device 5 composes a name registration response indicating that the name registration was completed successfully and sends this response to the host 4 via the NIF 508 (1403).

If the name registration response is received, the CPU 404 of the host 4 executes the name operation program 412, composes a change notification registration request including the iSCSI name of the first initiator, and sends this, request to the name management device 5 via the NIF 408 (1404). The destination IP address of the change notification registration request is the same as the destination IP address of the name registration request of 1401.

If the change notification registration request is received, the CPU 504 of the name management device 5 executes the change notification program 513 and conducts the change notification registration processing (1405). In the change notification registration processing, the CPU 504 of the name management device 5 fetches the iSCSI name of the first initiator from the change notification registration request, searches the iSCSI node table 521 on condition that the iSCSI name matches the contents of the entry 5211 (iSCSI node) and registers "1" in the entry 5215 (change notification flag) of the record that agrees with this condition.

If the above-described change notification registration processing is completed, the CPU 504 of the name management device 5 composes a change notification registration response indicating that change notification registration was completed successfully and sends this response to the host 4 via the NIF 508 (1406).

If the change notification registration response is received, the CPU 404 of the host 4 executes the name operation program 412, composes a discovery request including the iSCSI name of the first initiator, and sends the request to the name management device 5 via the NIF 408 (1407). The destination IP address of the discovery request, is identical to the destination IP address of the name registration request of 1401.

If the discovery request is received, the CPU 504 of the name management device 5 executes the iSCSI node management program 512 and conducts the target search processing (1408). In the target search processing, the CPU 504 of the name management device 5 sends, to the initiator, information on iSCSI names, IP addresses and TCP port numbers of all of the targets belonging to the same discovery domain as the initiator which the discovery request sent.

Initially, the CPU 504 of the name management device 5 fetches the iSCSI name of the first initiator from the received discovery request. Then, the CPU 504 of the name management device searches the domain table 522 on condition that the iSCSI name matches the contents of the entry 5222 (iSCSI node) and fetches the contents of the entry 5221 (domain ID) of the record that agrees with this condition. Then, the CPU 504 of the name management device 5 again searches the domain table 522 on condition that the contents of the fetched entry 5221 (domain ID) match the contents of the entry 5221 (domain ID) and fetches the contents of the entry 5222 (iSCSI node) of all of the records that agree with this condition.

Then, the CPU 504 of the name management device 5 searches the iSCSI node table 521 on condition that the contents of the entry 5222 (iSCSI node) match the contents of the entry 5211 (iSCSI node) for the contents of all of the fetched entries 5222 (iSCSI node) and that the contents of the entry 5212 (node type) is "target" and fetches the contents of the entry 5211 (iSCSI node), the contents of the entry 5213 (IP address), and the contents of the entry 5214 (port number) of the record that agrees with this condition.

Finally, the CPU 504 of the name management device 5 composes a discovery response, including all of the combinations of the contents of the fetched entry 5211 (iSCSI node), the contents of the entry 5213 (IP address), and the contents of the entry 5214 (port number), and sends the response to the host 4 via the NIF 508 (1409). In the present embodiment, the first initiator belongs to the same discovery domain as the first target. Therefore, the discovery response comprises "iqn. 2004-06. com. hitachi: tar01", which is the iSCSI name of the first target, "172. 16. 0. 1", which is the IP address used by the first target, and "3260", which is the TCP port number used by the first target.

If the discovery response is received, the CPU 404 of the host 4 fetches a combination of the contents of the entry 5211 (iSCSI node), the contents of the entry 5213 (IP address), and the contents 5214 (port number) from the received discovery response. Then, the CPU 404 of the host 4 executes the iSCSI processing program 411 and establishes a TCP connection with an end point whose IP address and TCP port number are the contents of the entry 5213 (IP address) and the contents 5214 (port number), respectively, which are fetched from the received discovery response.

Then, the CPU 404 of the host 4 composes an iSCSI login request, including the iSCSI name of the first initiator, as the iSCSI name of the initiator performing login, and the contents of the entry 5211 (iSCSI node) as the iSCSI name of the target serving as a login object, and sends this request by using the TCP connection established heretofore (1410).

If the iSCSI login request is received, the iSCSI processing device 110 of the migration source storage device 1 conducts the login processing (1411). In the login processing, the iSCSI processing device 110 fetches the iSCSI name of the first initiator and the contents of the entry 5211 (iSCSI node) from the received iSCSI login request, confirms that the combination of the iSCSI name of the initiator and the iSCSI name of the target is correct, authenticates the initiator, and conducts the negotiation of various parameters.

If the login processing is completed successfully, the iSCSI processing device 110 composes an iSCSI login response showing that the login was completed successfully and sends the response to the host 4 via the NIF 108 (1412).

If the host 4 receives the iSCSI login response, a new iSCSI session is established between the first initiator managed by the host 4 and the first target managed by the migration source storage device 1. Then, the host 4 uses this iSCSI session and conducts the read/write of data from/to the first LU of the migration source storage device 1 (1413).

Figure 15:
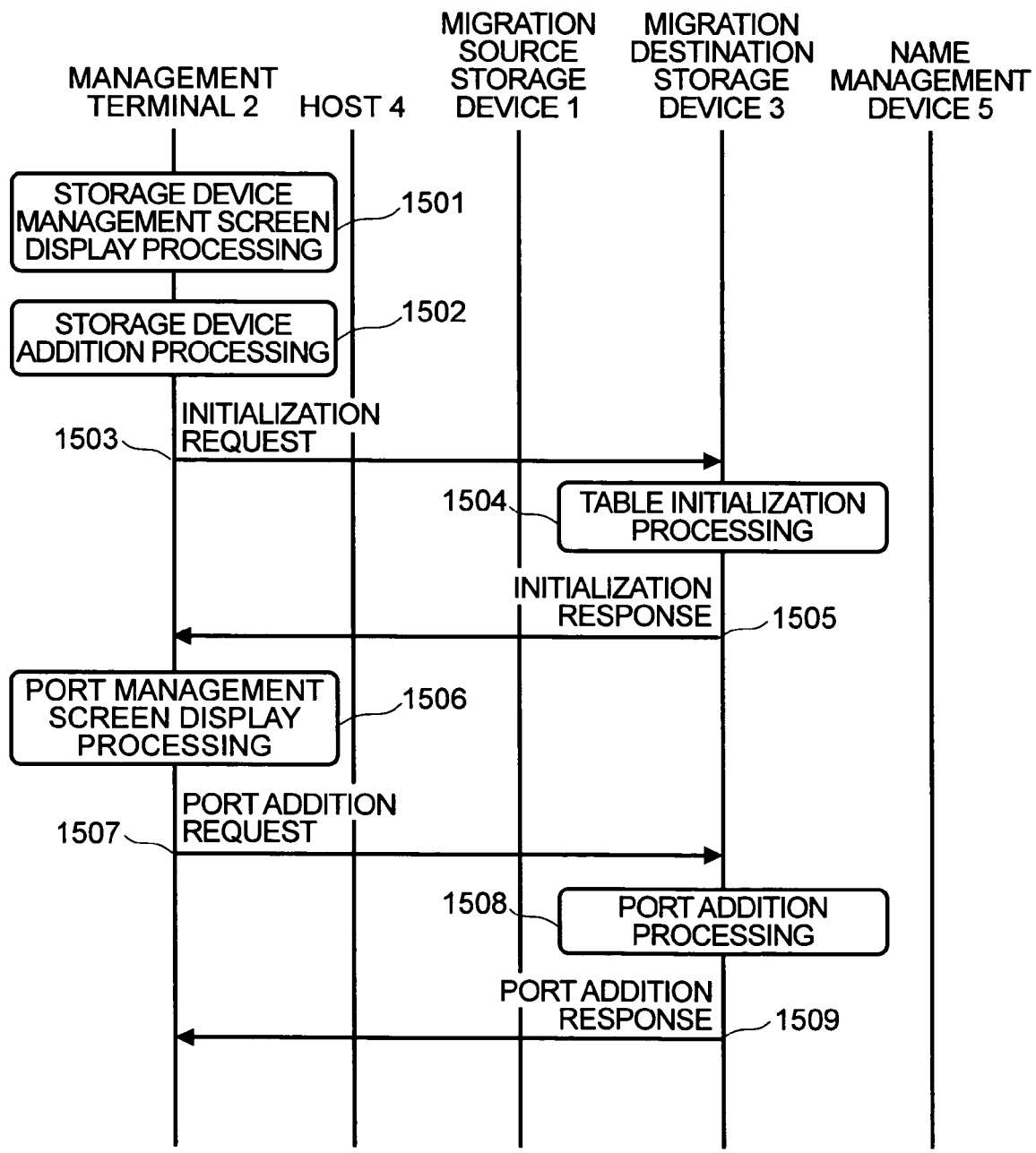
FIG. 15 is a sequence diagram which shows a communication sequence example relating to registration processing of information relating to the migration destination storage device applied to the management terminal and the registration processing of information relating to a physical port owned by the migration destination storage device to the migration destination storage device in the first embodiment.

FIG. 15 shows an example of a communication sequence relating to the case where the system administrator or the like registers the information relating to the migration destination storage device 3 in the management terminal 2, as processing prior to migration, and then registers the information relating to the physical ports of the migration destination storage device 3 in the migration destination storage device 3. In the present embodiment, the system administrator will register the information relating to the physical ports in the order of the third physical port and the fourth physical port, but the registration may be conducted in a reverse order.

Initially, the system administrator or the like designates display of the storage device management screen 800 to the management terminal 2. The CPU 204 of the management terminal 2, which has received this designation, executes the GUI control program 211 and, similarly to operation 1207, carries out the storage device management screen display processing (1501). After the storage device management screen display processing has been completed, the system administrator or the like inputs the information relating to the migration destination storage device 3 to the area 801 and the area 802 of the storage device management screen 800. In the present embodiment, "STR02", which is the device ID of the migration destination storage device 3, and "192. 168. 0. 2", which is the management IP address of the migration destination storage device 3, are inputted into the area 801 and the area 802, respectively.

If the system administrator or the like then specifies the button 810, the CPU 204 of the management terminal 2 executes the GUI control program 211 and, similar to operation 1208, conducts the storage device addition processing (1502).

Then, the CPU 204 of the management terminal 2 composes an initialization request similar to operation 1209 and sends the request to the migration destination storage device 3 via the management NIF 209 (1503). The destination IP address of this initialization request is assumed to be the contents inputted into the area 802.

If the initialization request is received, the CPU 304 of the migration destination storage device 3 executes the migration destination storage device control program 312 and conducts the table initialization processing (1504). In the table initialization processing, first, the CPU 304 of the migration destination storage device 3 sets the name management device table 321, the port table 322, the target table 323, and the LU table in a state where no records are present. Then, the CPU 304 of the migration destination storage device 3 fetches the contents of the entry 2221 (device ID) and the entry 2222 (IP address) from the initialization request and adds a record to the name management device table 321. Here, the contents of the entry 2221 (device ID) and the entry 2222 (IP address), which were fetched from the received initialization request, are respectively registered in the entry 3211 (device ID) and the entry 3212 (IP address) of the record that will be added.

Then, the CPU 304 of the migration destination storage device 3 allocates port IDs to all of the physical ports of the migration destination storage device 3 and adds, to the port table 322, records, in each of which the port ID allocated is registered in the entry 3221 (port ID) and "0. 0. 0. 0" is registered in the entry 3222 (IP address), the entry 3223 (subnet mask), and the entry 3224 (gateway). Then, the CPU 304 of the migration destination storage device 3 allocates LUNs to all of the LUs managed by the migration destination storage device 3 and adds, to the LU table 324, records in each of which "null" is registered in the entry 3241 (target) and the allocated LUN is registered in the entry 3242 (LUN).

In the present embodiment, the port ID allocation method and the LUN allocation method of the migration destination storage device 3 are identical to those of the migration source storage device 1. In the present embodiment, the port ID of "1" and "2" are allocated to the third physical port and the fourth physical port, respectively. Furthermore, the LUN of "0" and "1" are allocated to the third LU and the fourth LU, respectively.

After the above-described table initialization processing has been completed, the CPU 304 of the migration destination storage device 3, similar to operation 1211, composes an initialization response showing that the initialization was completed successfully and sends the response to the management terminal 2 via the management NIF 309 (1505). If the initialization response is received, then, similar to operation 1211, the CPU 204 of the management terminal 2 adds, to the area 812, a line composed of the contents inputted into the area 801 and the area 802.

Then, the system administrator or the like uses the pointing device 206 or the character input device 207 and designates display of the port management screen 920 to the management terminal 2. The CPU 204 of the management terminal 2, which has received this designation, executes the GUI control program 211 and, similar to operation 1305, conducts the port management screen display processing (1506). After completion of the port management screen display processing, the system administrator or the like selects the device ID of the migration destination storage device 3 by using the button 922 of the port management screen 920 and inputs the information relating to one of the physical ports of the migration destination storage device 3 into the areas from the area 923 to the area 926.

In the present embodiment, "STR02", which is the name ID of the migration destination storage device 3, is selected by using the button 922, and "1", which is the port ID of the third physical port, "172. 16. 0. 3", "255. 255. 0. 0", and "172. 16. 0. 254" are inputted into the area 923, the area 924, the area 925, and the area 926, respectively.

If the system administrator or the like then specifies the button 930, the CPU 204 of the management terminal 2, similar to the operation 1306, composes a port addition request and sends it to the migration destination storage device 3 via the management NIF 209 (1507).

If the port addition request is received, the CPU 304 of the migration destination storage device 3 executes the migration destination storage device control program 312 and, similar to the operation 1307, conducts the port addition processing (1508).

If the port addition processing is completed, the CPU 304 of the migration destination storage device 3, similar to the operation 1308, composes a port addition response showing that the registration of information relating to the physical port was completed successfully and sends this response to the management terminal 2 via the management NIF 109 (1509). If the port addition response is received, the CPU 204 of the management terminal 2, similar to the operation 1308, adds to the area 932 a line composed of the device ID selected by using the button 922 and the contents inputted into the areas from the area 923 to the area 926.

Then, the system administrator or the like again executes the operations from 1506 to 1509. However, in the operation 1506, "STR02", which is the device ID of the migration destination storage device 3, is selected by using the button 922 and "2", which is the port ID of the fourth physical port, "172. 16. 0. 4", "255. 255. 0. 0", and "172. 16. 0. 254" are inputted into the area 923, the area 924, the area 925, and the area 926, respectively. Therefore, the system administrator or the like repeats the above-described processing as many times as there are physical ports of the migration destination storage device 3.

The communication sequence and the operation procedure relating to the case where the first target managed by the migration source storage device 1 is migrated to the migration destination storage device 3 will be explained below.

In the present embodiment, the system administrator or the like uses the migration management screen 1100 that is displayed by the management terminal 2 and designates the start of the migration processing of the first target to the migration source storage device 1. The migration source storage device 1, which has received the designation, creates a third target in the migration destination storage device 3 and allocates the third physical port and the third LU of the migration destination storage device 3 to the third target.

Then, the migration source storage device 1 executes an initial copy by which data stored in the first LU is copied into the third LU of the migration destination storage device 3. After the initial copy of the data has been completed, the migration source storage device 1 executes synchronous replication (in the case where changes have occurred in the data that is stored in one LU, the identical data stored in the other LU is also changed), and maintains the consistency of the data stored in the first LU and the data stored in the third LU (the above-described communication sequence will be explained with reference to FIG. 16).

Then, the migration source storage device 1 creates, in the migration destination storage device 3, a target (referred to hereinbelow as "virtual first target ") having the iSCSI name identical to that of the first target and allocates the third physical port and the third LU of the migration destination storage device 3 to the created target. The migration destination storage device 3 notifies the host 4 via the name management device 5 that the third physical port has been allocated to the first target (that is, the virtual first target). If the notification that the third physical port has been allocated to the first target is received, the host 4 establishes a TCP connection with the third physical port of the migration destination storage device 3. Then, the TCP connection is added to the iSCSI session between the first initiator and the first target when the initiator managed by the host 4 performs login to the target having the iSCSI name identical to that of the first target managed by the migration destination storage device 3.

However, at this point of time, the host 4 does not carry out the disk access using the TCP connection with the migration destination storage device 3 (the above-described communication sequence will be described with reference to FIG. 17).

Then, the migration source storage device 1 notifies the host 4 via the name management device 5 that the allocation of the first physical port to the first target is deleted. If this notification is received, the initiator managed by the host 4 performs logout from the first target managed by the migration source storage device 1 and the host 4 disconnects the TCP connection with the first physical port of the migration source storage device 1. Further, the host 4 temporarily saves, to the buffer area 421, the disk access that was generated after the deletion notification was received and before the TCP connection was disconnected.

After the TCP connection disconnection, the host 4 uses the TCP connection with the migration destination storage device 3 and starts the disk access with the virtual first target. On the other hand, the migration source storage device 1, after the TCP connection with the host 4 has been disconnected, stops the synchronous replication with the migration destination storage device 3 and deletes the first target (the above-described communication sequence will be explained with reference to FIG. 18).

In the explanation of the communication sequence and the operation procedure provided hereinbelow the following examples of parameters will be used.

First, in the present embodiment, the initial copy and the synchronous replication are assumed to be conducted by using the iSCSI protocol. For the initial copy and the synchronous replication, the migration source storage device 1 will use a second initiator having an iSCSI name of "iqn. 2004-06. com. hitachi: replication-ini02". The second physical port will be allocated to the second initiator. On the other hand, for the initial copy and the synchronous replication, the migration destination storage device 3 will use a third target having an iSCSI name of "iqn. 2004-06. com. hitachi: replication-tar03". The third physical port is assumed to be allocated to the third target. Further, the target is assumed to use "3260", which is the well-known port, as the TCP port number.

Figure 16:
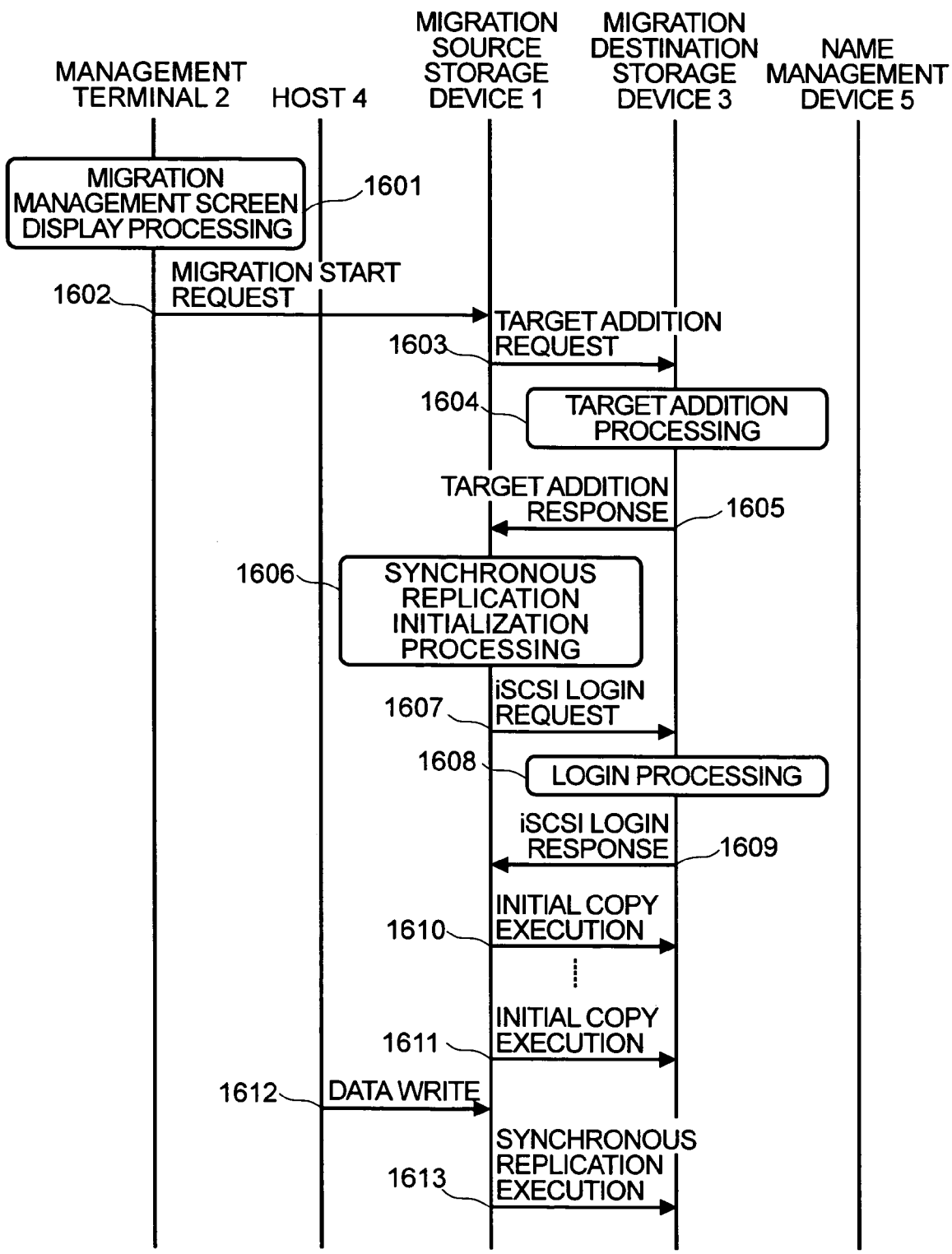
FIG. 16 is a sequence diagram which shows a first communication sequence relating to migration processing in the first embodiment.

FIG. 16 shows an example of the first communication sequence relating to the case where the migration source storage device 1 conducts migration of a target to the migration destination storage device 3.

First, the system administrator uses the character input device 207 and the pointing device 206 and designates the management terminal 2 to display the migration management screen 1100. The CPU 204 of the management terminal 2 that received this designation executes the GUI control program 211 and conducts the migration management screen display processing (1601). In this migration management screen display processing, first, the CPU 204 of the management terminal 2 reads the entries 2211 (device ID) of all of the records of the storage device table 221, creates a list of device IDs of the storage devices according to the results obtained and makes it possible to display the list of device IDs of the storage devices when the button 1104 or the button 1111 is specified by the system administrator or the like. Duplication of a device ID in the list of device IDs of the storage devices is avoided.

Then, the system administrator or the like selects the device ID of the migration source storage device 1 by using the button 1104 of the migration management screen 1100 and inputs the information relating to the migration source storage device 1 into the areas from the area 1105 to the area 1107. In addition to that, the system administrator or the like selects the device ID of the migration destination storage device 3 by using the button 1111 and inputs the information relating to the migration destination storage device 3 to the areas from the area 1112 to the area 1117. In the present embodiment, "STR01", which is the device ID of the migration source storage device 1, is selected by using the button 1104, and "iqn. 2004-06. com. hitachi: tar01", which is the iSCSI name of the first target, "iqn. 2004-06. com. hitachi: replication-ini02", which is the iSCSI name of the second initiator, and "1", which is the port ID of the second physical port, are inputted into the area 1105, the area 1106, and the area 1107, respectively.

Further, "STR02", which is the device ID of the migration destination storage device 3, is selected by using the button 1111 and "iqn. 2004-06. com. hitachi: replication-tar03", which is the iSCSI name of the third target, "1", which is the port ID of the third physical port, "3260", which is the well-known port, "1", which is the port ID of the third physical port, "3260", which is the well-known port, and "0", which is the LUN of the third LU, are inputted into the area 1112, the area 1113, the area 1114, the area 1115, the area 1116, and the area 1107, respectively.

If the system administrator or the like then specifies the button 1128, the CPU 204 of the management terminal 2 searches the storage device table 221 on condition that the device ID selected by using the button 1111 matches the contents of the entry 2211 (device ID) and fetches the contents of the entry 2212 (management IP address) of the record that agree with this condition. Then, the CPU 204 of the management terminal 2 composes a migration start request including the fetched contents of the entry 2212 (management IP address), the contents of the areas from the area 1105 to the area 1107, and the contents of the areas from the area 1112 to the area 1117 and sends the request via the management NIF 209 to the migration source storage device 1 having the device ID selected by using the button 1104 (1602). The destination IP address of this migration start request is obtained by searching the storage device table 221 on condition that the device ID selected by using the button 1104 matches the contents of the entry 2211 (device ID) and fetching the contents of the entry 2212 (management IP address) of the record that agree with this condition.

If the migration start request is received, first, the CPU 104 of the migration source storage device 1 executes the migration source storage device control program 112 and fetches the contents of the entry 221 (management IP address), the contents of the areas from the area 1112 to the area 1114, and the contents of the area 1117 from the received migration start request. Then, the CPU 104 of the migration source storage device 1 composes a target addition request, including the contents of the areas from the area 1112 to the area 1114 and the contents of the area 1117, and sends the request to the migration destination storage device 3 via the management NIF 109 (1603). The destination IP address of the target addition request is the contents of the entry 2212 (management IP address).

If the target addition request is received, the CPU 304 of the migration destination storage device 3 executes the migration destination storage device control program 312 and carries out the target addition processing in which the migration destination storage device 3 creates a third target and allocates the third physical port and the third LU to the third target (1604). In the target addition processing, the CPU 304 of the migration destination storage device 3 fetches the contents of the areas from the area 1112 to the area 1114 and the contents of the area 1117 from the received target addition request and adds a record to the target table 323. Here, the contents of the area 1112 are registered in the entry 3231 (target) of the record added to the target table 323, the contents of the area 1113 are registered in the entry 3232 (port ID), and the contents of the area 1114 are registered in the entry 3233 (port number).

Then, the CPU 304 of the migration destination storage device 3 searches the LU table 324 on the condition that the contents of the entry 3242 (LUN) matches the contents of the area 1117 and registers the contents of the area 1112 in the entry 3241 (target) of the record that agrees with this condition.

Then, the CPU 304 of the migration destination storage device 3 searches the port table 322 on the condition that the contents of the area 1113 matches the contents of the entry 3221 (port ID) and fetches the entry 3222 (IP address) of the record that agrees with this condition. Then, the CPU 304 of the migration destination storage device 3 composes a target addition response, including the contents of the entry 3222 (IP address) that was fetched, and sends the response to the migration source storage device 1 via the management NIF 309 (1605).

If the target addition response is received, the CPU 104 of the migration source storage device 1 executes the synchronous replication program 114 and conducts the synchronous replication initialization processing (1606). In this synchronous replication initialization processing, the CPU 104 of the migration source storage device 1 fetches the contents of the areas from the area 1105 to the area 1107 from the received migration start request. Then, the CPU 104 of the migration source storage device 1 conducts the destage processing of writing, to the first LU, the wait data for writing to the first LU, out of all the wait data for writing stored in the cache area 111.

It is assumed that after this point of time, the migration source storage device 1 does not temporarily store the write data, from the host 4 to the first LU, in the cache area 111. Then, the CPU 104 of the migration source storage device 1 fetches the contents of the entry 3222 (IP address) from the received target addition response. The CPU 104 of the migration source storage device 1 then searches the port table 122 on condition that the contents of the area 1107 match the contents of the entry 1221 (port ID) and fetches the contents of the entry 1222 (IP address) of the record that agrees with this condition.

Then, the iSCSI processing device 110 of the migration source storage device 1 establishes a TCP connection in which the contents of the entry 1222 (IP address) are the sending source IP address and the contents of the entry 3222 (IP address) and the contents of the area 1114 are the destination IP address and TCP port number, respectively. The iSCSI processing device 110 of the migration source storage device 1 then composes an iSCSI login request, including the contents of the area 1106 and the area 1112, and sends it by using the established TCP connection (1607).

If the iSCSI login request is received, the iSCSI processing device 310 of the migration destination storage device 3 conducts a login processing (1608). In the login processing, the iSCSI processing device 310 fetches the contents of the area 1106 and the area 1112 from the received iSCSI login request, confirms that the combination of the iSCSI name of the initiator and the iSCSI name of the target is correct, authenticates the initiator and conducts the negotiation of various parameters.

If the login processing is completed successfully, the iSCSI processing device 310 composes an iSCSI login response showing that login was completed successfully and sends it to the migration source storage device 1 via the NIF 108 (1609).

If the migration source storage device 1 receives the iSCSI login response, an iSCSI session is established between the second initiator and the third target. Then, the migration source storage device 1 uses this iSCSI session and executes the initial copy operation by copying the data stored in the first LU into the third LU (1610, 1611).

After the initial copy of data has been completed, when the migration source storage device 1 receives the data write from the host 4 to the first LU (1612), it executes the synchronous replication into the third LU and maintains the consistency of data stored in the first LU and the data stored in the third LU (1613).

Figure 17:
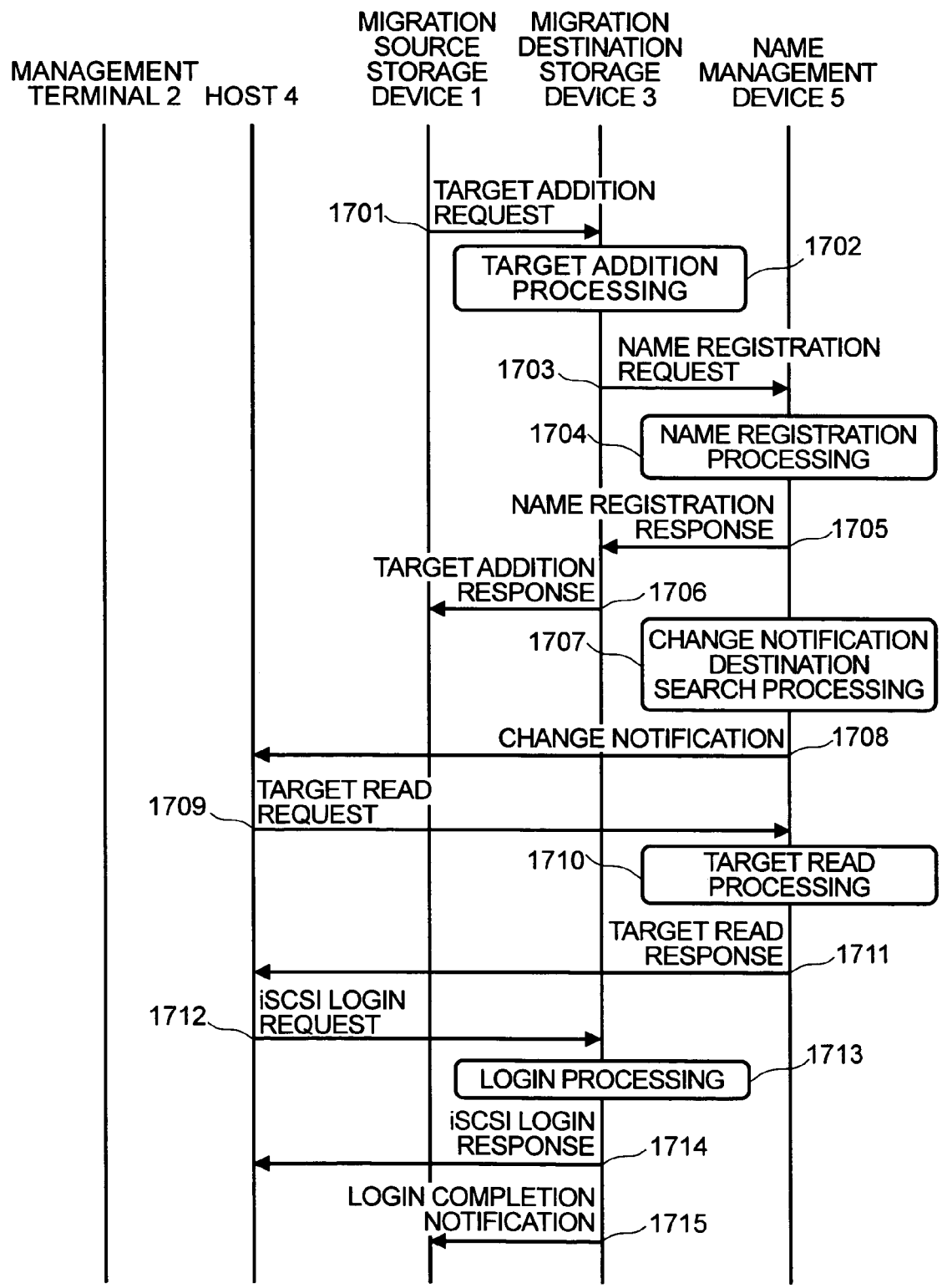
FIG. 17 is a sequence diagram which shows a second communication sequence relating to the migration processing in the first embodiment.

FIG. 17 illustrates an example of the second communication sequence in which the migration source storage device 1 conducts the migration of a target to the migration destination storage device 3.

After the initial copy of 1610 and 1611 has been completed, the CPU 104 of the migration source storage device 1 executes the migration source storage device control program 112, composes a target addition request including the contents of the area 1105, the contents of the areas from the area 1115 to the area 1117, and the iSCSI name of the initiator (in the present embodiment, the first initiator) that has performed login into the target which is to be added and sends the request to the migration destination storage device 3 via the management NIF 109 (1710). The destination IP address of the target addition request is the contents of the entry 2212 (management IP address) fetched from the migration start request in 1603.

If the target addition request is received, the CPU 304 of the migration destination storage device 3 executes the migration destination storage device control program 312 and creates a target (virtual first target) having the iSCSI name identical to that of the first target. Then, the CPU 304 of the migration destination storage device 3 conducts the target addition processing in which the third physical port and the third LU are allocated to the created target (1702).

In the target addition processing, the CPU 304 of the migration destination storage device 3, first, fetches the contents of the area 1105, the contents of the areas from the area 1115 to the area 1117, and the iSCSI name of the initiator that has performed login into the target which is to be added from the received target addition request and adds a record to the target table 323. Here, the contents of the area 1105 are registered in the entry 3231 (target) of the record which is added to the target table 323, the contents of the area 1115 are registered in the entry 3232 (port ID), and the contents of the area 1116 are registered in the entry 3233 (port number).

Then, the CPU 304 of the migration destination storage device 3 searches the LU table 324 on condition that the contents of the entry 3242 (LUN) match the contents of the area 1117 and registers the contents of the area 1105 in the entry 3241 (target) of the record that agrees with this condition.

Then, the CPU 304 of the migration destination storage device 3 executes the name change program 313, first, searches the port table 322 on condition that the contents of the area 1115 match the contents of the entry 3221 (port ID) and fetches the entry 3222 (IP address) of the record that agrees with this condition. Then, the CPU 304 of the migration destination storage device 3 composes a name registration request including the contents of the area 1105, information showing that the node type is a target, the fetched contents of the entry 3222 (IP address), and the contents of the area 1116 and sends the request to the name management device 5 via the NIF 308 (1703). The destination IP address of the name registration request is the contents of the entry 3212 (IP address) of the first record of the name management device table 321.

If the name registration request is received, the CPU 504 of the name management device 5 executes the iSCSI node management program 512 and conducts the name registration processing, in the same manner as in the operation 1313 (1704).

If the name registration processing is completed, the CPU 504 of the name management device 5 composes a name registration response showing that the name registration was completed successfully and sends the response to the migration destination storage device 3 via the NIF 508, similar to the operation 1304 (1705).

If the name registration response is received, the CPU 304 of the migration destination storage device 3 composes a target addition response showing that the addition of the information relating to the target was completed successfully and sends the response to the migration source storage device 1 via the management NIF 309 (1706).

On the other hand, because a record was added to the iSCSI node table 521 in the operation 1704, the CPU 504 of the name management device 5 executes the change notification program 513 and conducts the change notification destination search processing (1707). In the change notification destination search processing, the CPU 504 of the name management device 5, first, searches the domain table 522 on condition that the iSCSI name of the iSCSI node (that is, the first target) corresponding to the record that was added matches the contents of the entry 5222 (iSCSI node) and fetches the contents of the entry 5221 (domain ID) of the record that agrees with this conditions.

Then, the CPU 504 of the name management device 5 searches again the domain table 522 on condition that the fetched contents of the entry 5221 (domain ID) matches the contents of the entry 5221 (domain ID) and fetches the contents of the entry 5222 (iSCSI node) of all of the records that agree with this condition. Then, the CPU 504 of the name management table 5 searches the iSCSI node table 521 with respect to the fetched contents of each entry 5222 (iSCSI node) on condition that the contents of this entry 5222 (iSCSI node) match the contents of the entry 5211 (iSCSI node) and the contents of the entry 5215 (change notification flag) is "1", and fetches the contents of the entry 5213 (IP address) of the record that agrees with this condition. In the present embodiment, the record corresponding to the first initiator managed by the host 4 matches this condition. As a result, "172. 16. 0. 128" is fetched as the contents of the entry 521 (IP address).

After the above-described change notification destination search processing has been completed, the CPU 504 of the name management device 5 composes a change notification, including the iSCSI name of the first target and information showing that a new physical port (that is, the third physical port) has been allocated to this target, and sends this notification to the host 4 (1708). The destination IP address of this change notification is the contents of the entry 5213 (IP address) fetched in the operation 1707. Further, in the present embodiment, the use of SCN of iSNSP was assumed for this change notification, but a method other than SCN may be used.

If the change notification is received, the CPU 404 of the host 4 executes the name operation program 412, fetches from the change notification the iSCSI name of the first target and the information showing that a new physical port has been allocated to this target, composes a target read request including the iSCSI name of the first target and sends this request to the name management device 5 via the NIF 408 (1709).

If the target read request is received, the CPU 504 of the name management device 5 executes the iSCSI node management program 512 and executes the target read processing (1710). In the target read processing, the CPU 504 of the name management device 5, first, fetches the iSCSI name of the first target from the received target read request. Then, the CPU 504 of the name management device 5 searches the iSCSI node table 521 on condition that the iSCSI name of the first target matches the contents of the entry 5211 (iSCSI node) and fetches the contents of the entry 5213 (IP address) and the contents of the entry 5214 (port number) of all of the records that agree with this condition.

Then, the CPU 504 of the name management device 5 composes a target read response including the contents of all of the entries 5213 (IP address) and 5214 (port ID) that were fetched in the operation 1710, and sends the response to the host 4 via the NIF 508 (1711).

If the target read response is received, the CPU 404 of the host 4 fetches the contents of all of the entries 5213 (IP address) and 5214 (port number) from the received target read response. Then, the CPU 404 of the host 4 checks as to determine whether a TCP connection, with the end point whose IP address and TCP port number each correspond to the fetched contents of the entry 5213 (ID address) and the fetched contents of the entry 5214 (port number), respectively, has already been established.

If the TCP connection has not been established yet, the CPU 404 of the host 4 executes the iSCSI processing program 411, establishes the TCP connection with this end point, composes an iSCSI login request including the iSCSI name of the first initiator and the iSCSI name of the first target, and sends the request by using the established TCP connection (1712). The host 4 thus establishes the TCP connection with the migration destination storage device 3 via the third physical port.

If the iSCSI login request is received by the migration destination storage device 3, the iSCSI processing device 310 of the migration destination storage device 3 conducts the login processing (1713). In this login processing, the iSCSI processing device 310 fetches the iSCSI name of the first initiator and the iSCSI name of the first target from the received iSCSI login request, verifies whether the combination of the iSCSI name of the initiator and the iSCSI name of the target is correct, authenticates the initiator, and conducts the negotiation of various parameters.

If the login processing is successfully completed, the iSCSI processing device 310 of the migration destination storage device 3 composes an iSCSI login response including information indicating that the login was completed successfully and the TCP connection use reservation information and sends the response to the host 4 via the NIF 308 (1714). This TCP connection use reservation information is information indicating that the host 4 reserves the use of the newly established TCP connection until the present TCP connection is disconnected. The migration destination storage device 3 includes the TCP connection use reservation information in the iSCSI login response only when the iSCSI name of the initiator, that is a transmission source of the login request received in the operation 1712, matches the iSCSI name of the initiator fetched from the target addition request in the operation 1702. In the present embodiment, it is assumed that vendor-specific login parameters contained in the iSCSI login response are used as the TCP connection use reservation information. If the iSCSI login response is received by the host 4, the TCP connection established via the third physical port between the host 4 and the migration destination storage device 3 is added to the iSCSI session between the first initiator and the first target. However, because the TCP connection use reservation information is contained in the iSCSI login response, at this point of time, the CPU 404 of the host 4 does not carry out the disk access using the TCP connection with the migration destination storage device 3. The control, such as reserving the use of the TCP connection, is conducted by the CPU 404 of the host 4 executing the iSCSI processing program 411.

After the iSCSI processing device 310 has sent the iSCSI login response, the CPU 304 of the migration destination storage device 3 executes the migration destination storage device control program 312, composes a login completion notification showing that the login from the host 4 has been completed, and sends this notification to the migration source storage device 1 via the management NIF 309 (1715).

Figure 18:
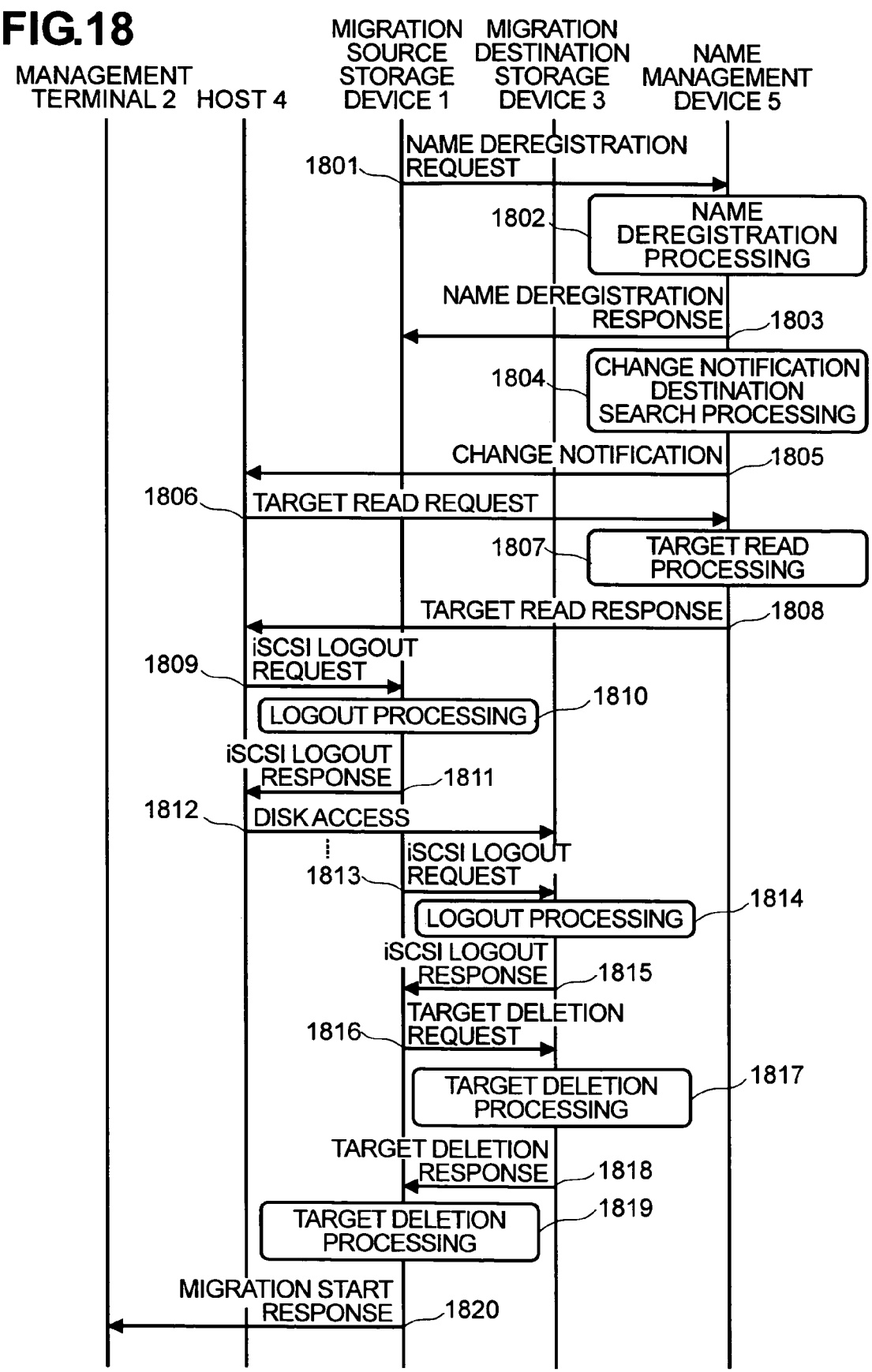
FIG. 18 is a sequence diagram which shows a third communication sequence relating to the migration processing in the first embodiment.

FIG. 18 shows an example of the third communication sequence in which the migration source storage device 1 conducts the migration of a target to the migration destination storage device 3.

If the login completion notification is received, the CPU 104 of the migration source storage device 1 executes the name change program 113 and notifies the name management device 5 that the allocation of the first physical port to the first target has been deleted.

First, the CPU 104 of the migration source storage device 1 searches the target table 123 on condition that the contents of the area 1105 match the contents of the entry 1231 (target) and fetches the contents of the entry 1232 (port ID) and the entry 1233 (port number) of the record that agrees with the condition. Then, the CPU 104 of the migration source storage device 1 searches the port table 122 on condition that the fetched contents of the entry 1232 (port ID) match the contents of the entry 1221 (port ID) and fetches the contents of the entry 1222 (IP address) of the record that agrees with the condition.

Further, the CPU 104 of the migration source storage device 1 composes a name deregistration request, including the contents of the area 1105, the fetched contents of the entry 1222 (IP address) and the fetched contents of the entry 1233 (port number), and sends the request to the name management device 5 via the NIF 108 (1801). The destination IP address of the name deregistration request is assumed to be the contents of the entry 1212 (IP address) of the first record of the name management device table 121.

If the name deregistration request is received, the CPU 504 of the name management device 5 executes the iSCSI node management program 512 and conducts the name deregistration processing (1802). In this name deregistration processing, the CPU 504 of the name management device 5, first, fetches the contents of the area 1105 and the contents of the entry 1222 (IP address) and the entry 1233 (port number) from the received name deregistration request. Then, the CPU 504 of the name management device 5 searches the iSCSI node table 521 on condition that the contents of the area 1105, the contents of the entry 1222 (IP address) and the contents of the entry 1233 (port number) match the contents of the entry 5211 (iSCSI node), the contents of the entry 5213 (IP address), and the contents of the entry 5214 (port number), respectively, and deletes the record that agrees with this condition.

If the above-described name deregistration processing is completed, the CPU 504 of the name management device 5 composes a name deregistration response indicating that the name deregistration was completed successfully and sends the response to the migration source storage device 1 via the NIF 508 (1803).

On the other hand, because the record has been deleted from the iSCSI node table 521 in the operation 1802, the CPU 504 of the name management device 5 executes the change notification program 513 and carries out the change notification destination search processing similar to the operation 1707 (1804).

After the change notification destination search processing has been completed, the CPU 504 of the name management device 5 composes a change notification similar to the operation 1708 and sends it to the host 4 (1805). However, this change notification comprises information showing that the allocation of the iSCSI name of the iSCSI node (that is, the first target) corresponding to the deleted record and the physical port (that is, the first physical port) corresponding to this iSCSI node was deleted.

If the change notification containing the information of the cancellation of the first physical port allocation is received, the CPU 404 of the host 4 executes the name operation program 412, fetches from the received change notification the information showing that the allocation of the iSCSI name of the first target and the physical port corresponding to this target has been deleted, composes a target read request containing the iSCSI name of the first target, and sends this request to the name management device 5 via the NIF 408 (1806).

If the target read request is received, the CPU 504 of the name management device 5 executes the iSCSI node management program 512 and carries out the target read processing similar to the operation 1710 (1807). Then, the CPU 504 of the name management device 5 composes a target read response, similar to the operation 1711, and sends this response to the host 4 via the NIF 508 (1808).

If the target read response is received, then, in the case where there is an executed disk access with respect to the first LU of the migration source storage device 1, the host 4 waits until this access is completed. When the disk access request is newly generated in the host 4 while the completion of the disk access is being waited for, the host 4 saves the contents of this request in the buffer area 421. After the executed disk access has been completed, the CPU 404 of the host 4 fetches the contents of all of the entries 5213 (IP address) and the contents of all of the entries 5214 (port number) from the received target read response.

Then, the CPU 404 of the host 4 investigates as to whether the TCP connection has been established with any end point other than the end point whose IP address and TCP port number correspond to the contents of the entry 5213 (IP address) and the entry 5214 (port number), respectively. When such a TCP connection is present, the CPU 404 of the host 4 executes the iSCSI processing program 411, composes an iSCSI logout request, including the iSCSI name of the first initiator and the iSCSI name of the first target, and sends this request by using the above-described discovered TCP connection (1809).

If the iSCSI logout request is received, the iSCSI processing device 110 of the migration source storage device 1 carries out the logout processing (1810). In this logout processing, the iSCSI processing device 110 fetches the iSCSI name of the first initiator and the iSCSI name of the first target from the received iSCSI logout request and releases resources relating to the iSCSI session between the initiator managed by the host 4 and the first target.

If the logout processing is successfully completed, the iSCSI processing device 110 composes an iSCSI logout response indicating that the logout was completed successfully and sends the response to the host 4 via the NIF 108 (1811).

If the host 4 receives the iSCSI logout response, the TCP connection established via the first physical port between the host 4 and the migration source storage device 1 is deleted from the iSCSI session established between the first initiator and the first target. Then, the first initiator conducts the iSCSI communication with the first target by using the TCP connection with the migration destination storage device 3. The switching control of this TCP connection is conducted by the CPU 404 of the host 4 executing the iSCSI processing program 411 (1812). In the case a disk access request has been saved in the buffer area 421, the host 4 executes this disk access by using the TCP connection with the migration destination storage device 3.

On the other hand, the CPU 104 of the migration source storage device 1, after sending the iSCSI logout response, disconnects the iSCSI session with the third target used for the synchronous replication and deletes the third target from the migration destination storage device 3. First, the iSCSI processing device 110 of the migration source storage device 1 composes an iSCSI logout request, including the contents of the area 1106 and the contents of the area 1112, and sends this request to the migration destination storage device 3 via the NIF 108 (1813).

The iSCSI processing device 310 of the migration destination storage device 3, which received the above-described iSCSI logout request, conducts the logout processing (1814). In this logout processing, the iSCSI processing device 310 fetches the contents of the area 1106 and the contents of the area 1112 from the received iSCSI logout request and releases resources relating to the iSCSI session between the initiator corresponding to the contents of the area 1106 and the target (that is, the third target) corresponding to the contents of the area 1112.

If the logout processing is completed successfully, the iSCSI processing device 310 composes an iSCSI logout response showing that the logout was completed successfully and sends this response to the migration source storage device 1 via the NIF 308 (1815).

The iSCSI processing device 110 of the migration source storage device 1, which has received the iSCSI logout response, disconnects the TCP connection with the migration destination storage device 3. Then, the CPU 104 of the migration source storage device 1 executes the migration source storage device control program 112 and deletes the third target from the migration destination storage device 3. For this purpose, the CPU 104 of the migration source storage device 1 composes a target deletion request including the contents of the area 1112 and sends it to the migration destination storage device 3 via the NIF 108 (1816).

The CPU 304 of the migration destination storage device 3, which has received the target deletion request, executes the migration destination storage device control program 312 and carries out the target deletion processing (1817). In this target deletion processing, the CPU 304 of the migration destination storage device 3, first, fetches the contents of the area 1112 from the received target deletion request. Then, the CPU 304 of the migration destination storage device 3 searches the target table 323 on condition that the contents of the entry 3231 (target) match the contents of the area 1112 and deletes the record that agrees with this condition.

The CPU 304 of the migration destination storage device 3 then searches the LU table 324 on condition that the contents of the entry 3241 (target) match the contents of the area 1112 and registers "null" in the entry 3241 (target) of the record that agrees with this condition.

After the above-described target deletion processing has been completed, the CPU 304 of the migration destination storage device 3 composes a target deletion response indicating that the target deletion was completed successfully and sends it to the migration source storage device 1 via the NIF 308 (1818).

If the target deletion response is received, the CPU 104 of the migration source storage device 1 executes the migration source storage device control program 112 and carries out the target deletion processing for deleting the first target (1819). In this target deletion processing, the CPU 104 of the migration source storage device 1, first, searches the target table 123 on condition that the contents of the entry 1231 (target) match the contents of the area 1105 and deletes the record that agrees with this condition.

Then, the CPU 104 of the migration source storage device 1 searches the LU table 124 on condition that the contents of the entry 1241 (target) match the contents of the area 1105 and registers "null" in the entry 1241 (target) of the record that agrees with this condition.

After the above-described target deletion processing has been completed, the CPU 104 of the migration source storage device 1 composes a migration start response indicating that the target migration has been completed and sends this response to the management terminal 2 via the management NIF 109 (1820). If the migration start response is received, the CPU 204 of the management terminal 2 displays, on the display 205, a screen showing the completion of the migration.

Then, the system administrator or the like repeats the operations from 1601 to 1820 with respect to the remaining targets that are required to migrate from the migration source storage device 1 to the migration destination storage device 3.

The first embodiment has been explained hereinabove. According to the first embodiment, the target for which an initiator conducts iSCSI communication can be migrated from the migration source storage device 1 to the migration destination storage device 3, without disconnecting the iSCSI session of this initiator managed by the host 4. As a result, the migration of storage devices is possible without stopping applications operating in the host 4.

As for the second embodiment, only the portion thereof which differs from the first embodiment will be explained. The second embodiment relates to a system in which the migration source storage device and migration destination storage device of the first embodiment and a third storage device for replicating the data stored therein to the migration source storage device are connected to a network. The third storage device will be referred to hereinbelow as a master storage device. In the present embodiment, the migration source storage device, the migration destination storage device, and the master storage device will be assumed to be disposed at the same site.

Figure 19:
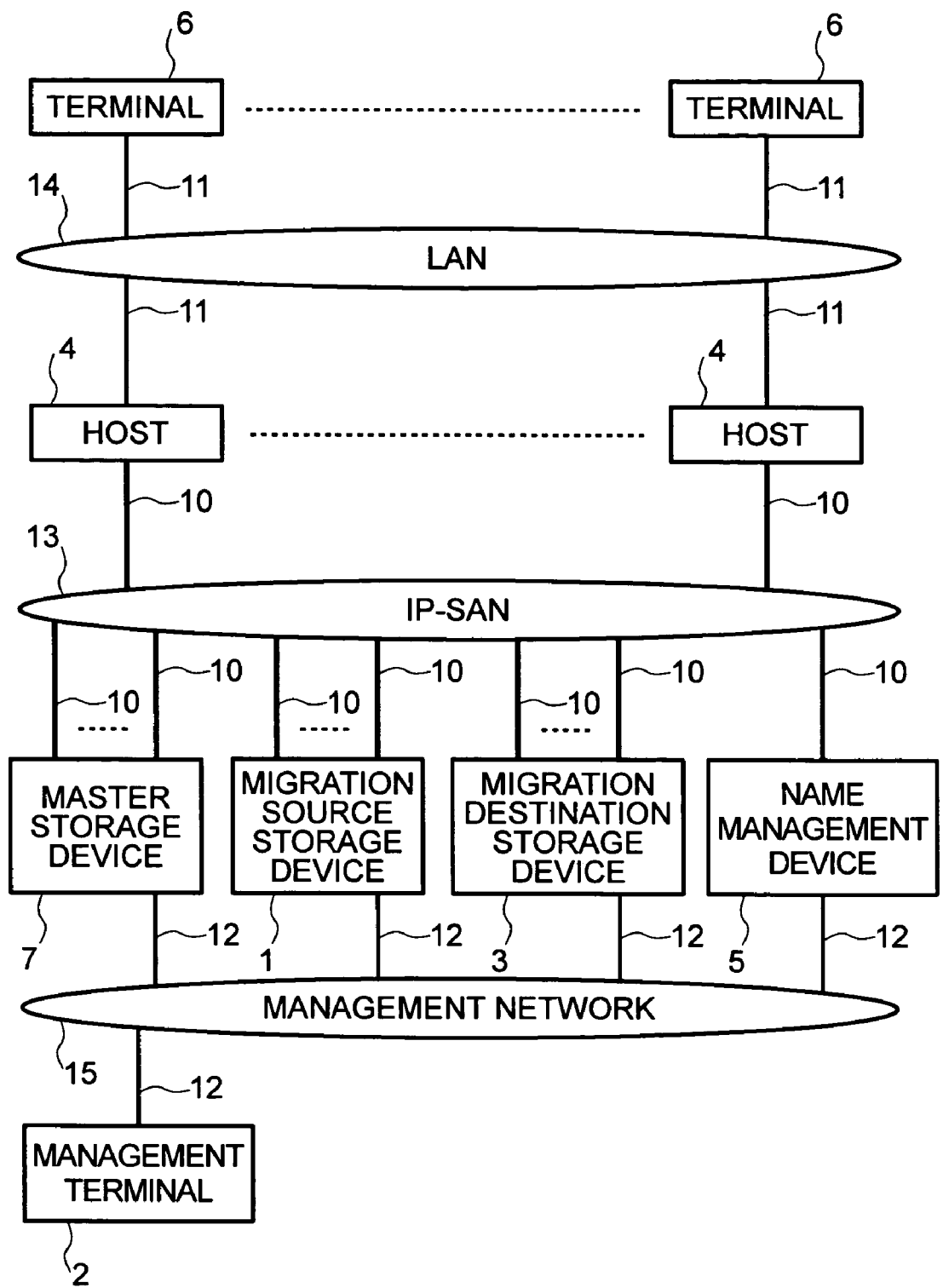
FIG. 19 is a block diagram which shows an example of the system configuration of a second embodiment of the present invention.

FIG. 19 illustrates an example of the system configuration of the present embodiment. In the system of the present embodiment, in addition to the first embodiment, a master storage device 7 is connected to the IP-SAN 13 and the management network 15 by a communication line 10 and a communication line 12, respectively. Further, in the present embodiment, the master storage device 7, the migration source storage device 1, and the migration destination storage device 3 are collectively called storage devices. The master storage device 7 carries out data transmission and reception by using the iSCSI protocol between the host 4, the migration source storage device 1, and the migration destination storage device 3. Further, the name management device 5 also carries out management of iSCSI names of the master storage device 7.

Figure 20:
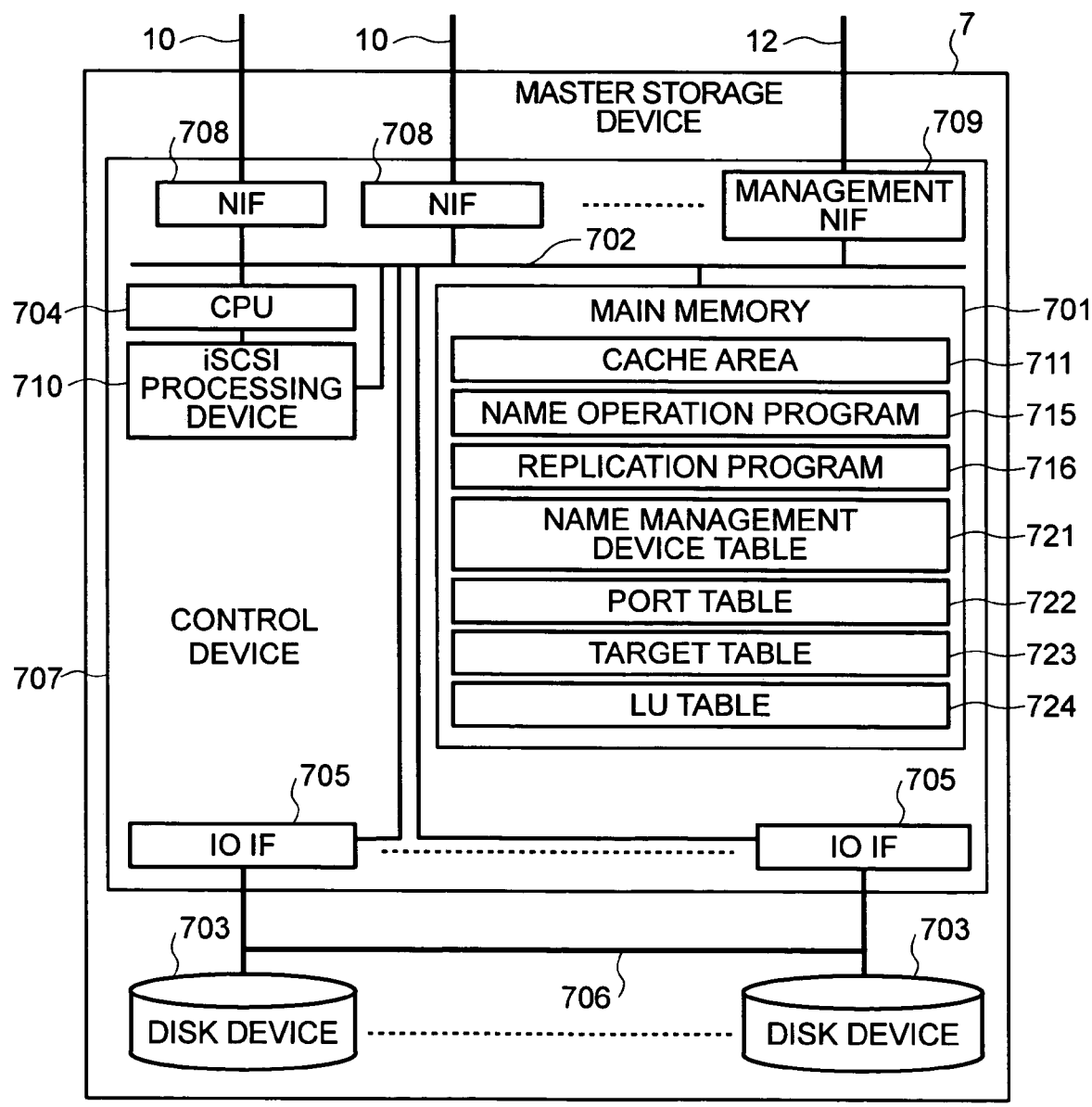
FIG. 20 is a diagram which shows an example of a master storage device.

FIG. 20 shows an example of the configuration of the master storage device 7. The master storage device 7 is a storage device system having at least one storage device. The master storage device 7, similar to the migration source storage device 1, has a disk device 703, a control device 707, and a communication line 706. Further, the control device 707, similar to the control device 107 of the migration source storage device 1, has a main memory 701, a communication line 702, a CPU 704, an IO IF 705, a NIF 708, a management NIF 709, and an iSCSI processing device 710. The NIF 708 and the management NIF 709 have one or more physical ports.

The main memory 701 stores a cache area 711 for storing data read out from the disk device 703 or data received from the host 4; a name operation program 715 that is executed by the CPU 704 when conducting the registration or deregistration of an iSCSI name of an initiator, an IP address, and a TCP port number in the name management device 5, sending an inquiry to the name management device 5, and receiving an inquiry response or change notification from the name management device 5; and a replication program 716 that is executed by the CPU 704 when data stored in the disk device 703 is replicated into other storage devices.

Further, similar to the main memory 101 of the migration source storage device 1, the main memory 701 stores a name management device table 721, a port table 722, a target table 723, and an LU table 724.

The configuration of the migration source storage device 1, the migration destination storage device 3, the management terminal 2, the host 4, the terminal 6, and the name management device 5 are identical to that of the first embodiment.

The data structure of each table in the present embodiment is identical to that of the first embodiment.

The GUI in the present embodiment will be explained below. In the present embodiment, in addition to the GUIs of the first embodiment, a target replication management screen 2100 is provided by the management terminal 2.

Figure 21:
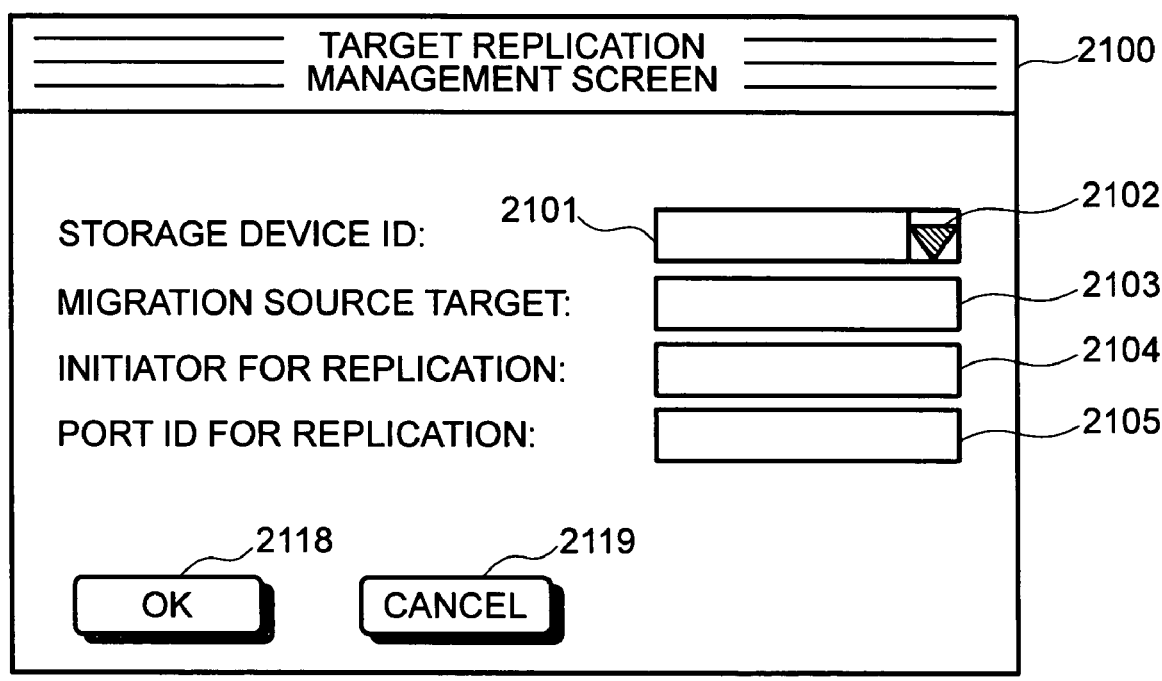
FIG. 21 is a diagram which shows an example of a display of a target replication management screen.

FIG. 21 shows an example of the target replication management screen 2100 used when the system administrator or the like designates, to one of the storage devices, replication of data stored in an LU allocated to a target of the storage device into another storage device. The target replication management screen 2100 has a button 2102 that is used when the device ID of the storage device managing the target, which is the object of the replication, is selected from a list; an area 2101 for displaying the device ID selected by using the button 2102; an area 2103 to which an iSCSI name of the target is inputted, which is the object of the replication; an area 2104 to which an iSCSI name of an initiator is inputted, which is used by the storage device when the replication is conducted; an area 2105 to which a port ID of a physical port is inputted, which is used by the storage device when the replication is conducted; a button 2128 that is used when the storage device having the device ID selected by using the button 2102 is designated, so as to start the replication processing according to the information inputted into the areas from the area 2103 to the area 2105; and a button 2129 that is used when the replication processing is canceled.

The communication sequence and the operation procedure of the present embodiment will be described below. In the present embodiment, the master storage device 7 replicates the data stored therein into the first target of the migration source storage device 1. Then, the first target of the migration source storage device 1 is migrated into the migration destination storage device 3, and then the master storage device 7 continues the replication of the data into the target (has the same iSCSI name as the first target) created in the migration destination storage device 3.

Initially, the system administrator or the like, as was described with reference to FIG. 12, designates the table initialization processing to the management terminal 2 and then registers the device ID, the IP address, and the management IP address of the name management device 5 and the device ID and the management IP address of the migration source storage device 1 in the management terminal 2.

The system administrator or the like then registers the device ID and the management IP address of the master storage device 7 in the management terminal 2. The communication sequence and the operation procedure, at the time the registration work is conducted, are identical to those of the steps from 1208 to 1211 in FIG. 12. In the present embodiment, the device ID and the management IP address of the master storage device 7 are assumed to be "STR03" and "192. 168. 0. 3", respectively. Furthermore, the master storage device 7 is assumed to have two physical ports. Those physical ports will be called the fifth physical port and the sixth physical. In registration processing, a port ID of "1" and "2" will be allocated to the fifth physical port and the sixth physical port, respectively. Furthermore, the master storage device 7 is assumed to have two LUs. The respective LUs will be called the fifth LU and sixth LU. In this registration work, the LUN of "0" and "1" will be allocated to the fifth LU and the sixth LU, respectively.

Then, the system administrator or the like, as was described with reference to FIG. 13, registers the discovery domain information in the name management device 5 and registers the information relating to the physical ports and targets of the migration source storage device 1 in the migration source storage device 1. However, in the present embodiment, the system administrator or the like conducts the registration work of the discovery domain so that the first target "iqn. 2004-06. com. hitachi: tar01" and the third initiator used by the master storage device 7 for data replication into the migration source storage device 1 belong to the discovery domain "DD01". In the present embodiment, the iSCSI name of the third initiator is assumed to be "iqn. 2004-06. com. hitachi: replication-ini03".

Then, the system administrator or the like registers, in the name management device 5, the information of the discovery domain to which the first initiator managed by the host 4 and the fourth target managed by the master storage device 7 belong, this target being the target with which the first initiator conducts iSCSI communication. The communication sequence and the operation procedure, at the time the registration work is conducted, are identical to those of operations 1301 to 1304 of FIG. 13. In the present embodiment, the domain ID of the discovery domain registered herein is assumed to be "DD02" and the iSCSI name of the fourth target is assumed to be "iqn. 2004-06. com. hitachi: tar04".

Then, the system administrator or the like registers, in the master storage device 7, the information relating to the physical ports and the targets of the master storage device 7. The communication sequence and the operation procedure, at the time the registration work is conducted, are identical to those of the steps from 1305 to 1315 in FIG. 13. In the present embodiment, the IP addresses of "172. 16. 0. 5" and "172. 168. 0. 6" are assumed to be allocated to the fifth physical port and the sixth physical port, respectively, in this registration work. Furthermore, the fourth target is assumed to be registered in the master storage device 7 and the fifth physical port and the fifth LU are assumed to be respectively allocated in this registration work.

Then, the system administrator or the like uses the character input device 207 and the pointing device 206 and designates display of the target replication management screen 2100 to the management terminal 2. The CPU 204 of the management terminal 2, which has received the designation, executes the GUI control program 211 and conducts the target replication management screen display processing. In the target replication management screen display processing, first, the CPU 204 of the management terminal 2 displays the target replication management screen 2100 on the display 205.

Further, the CPU 204 of the management terminal 2 reads the entries 2211 (device ID) of all of the records of the storage device table 221, creates a list of device IDs of the storage devices according to the results obtained, and makes it possible to display a list of device IDs of the storage devices when the button 2102 is specified by the system administrator or the like. Duplication of a device ID in the list of device IDs of the storage devices is avoided. Then, the system administrator or the like selects the device ID of the master storage device 7 by using the button 2102 of the target replication management screen 2100 and inputs the iSCSI name of the target which is the object of replication, the iSCSI name of the initiator used by the master storage device 7, and the port ID of the physical port used by this initiator in the area 2103, the area 2104, and the area 2105, respectively.

In the present embodiment, "STR03", which is the device ID of the master storage device 7, is selected by using the button 2102, and "iqn. 2004-06. com. hitachi: tar04", which is the iSCSI name of the fourth target, "iqn. 2004-06. com. hitachi: replication-ini03", which is the iSCSI name of the third initiator, and "2', which is the port ID of the sixth physical port, are inputted into the area 2103, 2104, and 2105, respectively.

If the system administrator or the like then specifies the button 2128, the CPU 204 of the management terminal 2 searches the storage device table 221 on condition that the device ID selected by using the button 2102 matches the contents of the entry 2211 (device ID) and fetches the contents of the entry 2212 (management IP address) of the record that agrees with this condition. Then, the CPU 204 of the management terminal 2 composes a target replication start request including the contents of the areas from the area 2103 to the area 2105 and sends the request via the management NIF 209 to the master storage device 7 having the device ID selected by using the button 2102. The destination IP address of the target replication start request is the contents of the aforementioned entry 2212 (management IP address).

If the target replication start request is received, the CPU 704 of the master storage device 7 executes the replication program 716 and starts the target replication. First, the CPU 704 of the master storage device 7 fetches the contents of the areas from the area 2103 to area 2105 from the received target replication start request. Then, the CPU 707 of the master storage device 7 searches the port table 722 on condition that the contents of the entry 7221 (port ID) match the contents of the area 2105 and fetches the contents of the entry 7222 (IP address) of the record that agrees with this condition.

Then, the CPU 704 of the master storage device 7 registers the iSCSI name of the third initiator and the IP address of the physical port used by the third initiator in the name management device 6 according to the contents of the area 2104 and the contents of the entry 7222 (IP address). The communication sequence and the operation procedure, at the time the name registration work is conducted, are identical to those of the operations 1401 to 1403 shown in FIG. 14, except that the host 4 is replaced with the master storage device 7 and the first initiator is replaced with the third initiator.

Then, the CPU 704 of the master storage device 7 sends a request for the change notification registration to the name management device 5. The communication sequence and the operation procedure at the time the change notification registration work is conducted are identical to those of the operations 1404 to 1406 shown in FIG. 14, except that the host 4 is replaced with the master storage device 7 and the first initiator is replaced with the third initiator.

Then, the CPU 704 of the master storage device 7 sends the discovery request to the name management device 5. The communication sequence and the operation procedure at the time the discovery operation is conducted are identical to those of the operations 1407 to 1409 shown in FIG. 14, except that the host 4 is replaced with the master storage device 7 and the first initiator is replaced with the third initiator. In the present embodiment, the iSCSI name, the IP address, and the TCP port number of the target contained in the discovery response received by the master storage device 7 are "iqn. 2004-06. com. hitachi: tar01", which is the iSCSI name of the first target that belongs to the discovery domain identical to third initiator, "172. 16. 0. 1", which is the IP address allocated to the first physical port, and "3260", which is the well-known port.

Then, the CPU 704 of the master storage device 7 performs login to the first target by using the third initiator and establishes an iSCSI session between the third initiator and the first target. The communication sequence and the operation procedure at the time the login operation is conducted are identical to those of the operations 1410 to 1412 shown in FIG. 14, except that the host 4 is replaced with the master storage device 7 and the first initiator is replaced with the third initiator.

Each time the data of the LU (that is, the fifth LU) allocated to the target (that is, the fourth target), whose iSCSI name is identical to the contents of the area 2103, is changed by the host 4, the CPU 704 of the master storage device 7 uses the established iSCSI session and carries out an identical data change with respect to the LU, that is, the first LU allocated to the first target. As a result, a consistency is maintained between the data of the fifth LU and the data of the first LU.

Then, the system administrator or the like carries out configuration relating to the fourth target as the target of access destination in the host 4 and then activates the first initiator. The communication sequence and the operation procedure at the time the initiator activation is conducted are identical to those shown in FIG. 14, except that the migration source storage device 1 is replaced with the master storage device 7, the first target is replaced with the fourth target, the first LU is replaced with the fifth LU, and the processing of the steps from 1404 to 1406 is not carried out.

Then, the system administrator or the like, as was described with reference to FIG. 15, registers the device ID and the management IP address of the migration destination storage device 3 in the management terminal 2 and then registers the information relating to the physical ports of the migration destination storage device 3 in the migration destination storage device 3.

Further, the system administrator or the like, as was described with reference to FIG. 16, designates the migration source storage device 1 to start the migration processing of the first target. The communication sequence and the operation procedure relating to the subsequent migration processing are identical to those shown in FIG. 16 to FIG. 18, except that the host 4 is replaced with the master storage device 7 and the first initiator is replaced with the third initiator.

The second embodiment has been explained hereinabove. According to the second embodiment, the target for which an initiator conducts iSCSI communication can be migrated from the migration source storage device 1 to the migration destination storage device 3, without disconnecting the iSCSI session of this initiator used by the master storage device 7 for replication. As a result, the migration of storage devices where a replica of data is stored is possible without changing the configuration of the master storage device 7 where the original data is stored.

As for the third embodiment, only the portion thereof which differs from the second embodiment will be explained. The third embodiment has a configuration similar to that of the second embodiment. However, in the second embodiment, all of the storage devices were assumed to be disposed at the same site, whereas in the present embodiment, the migration source storage device and the migration destination storage device are disposed in one site and the master storage device is disposed in another site.

Figure 22:
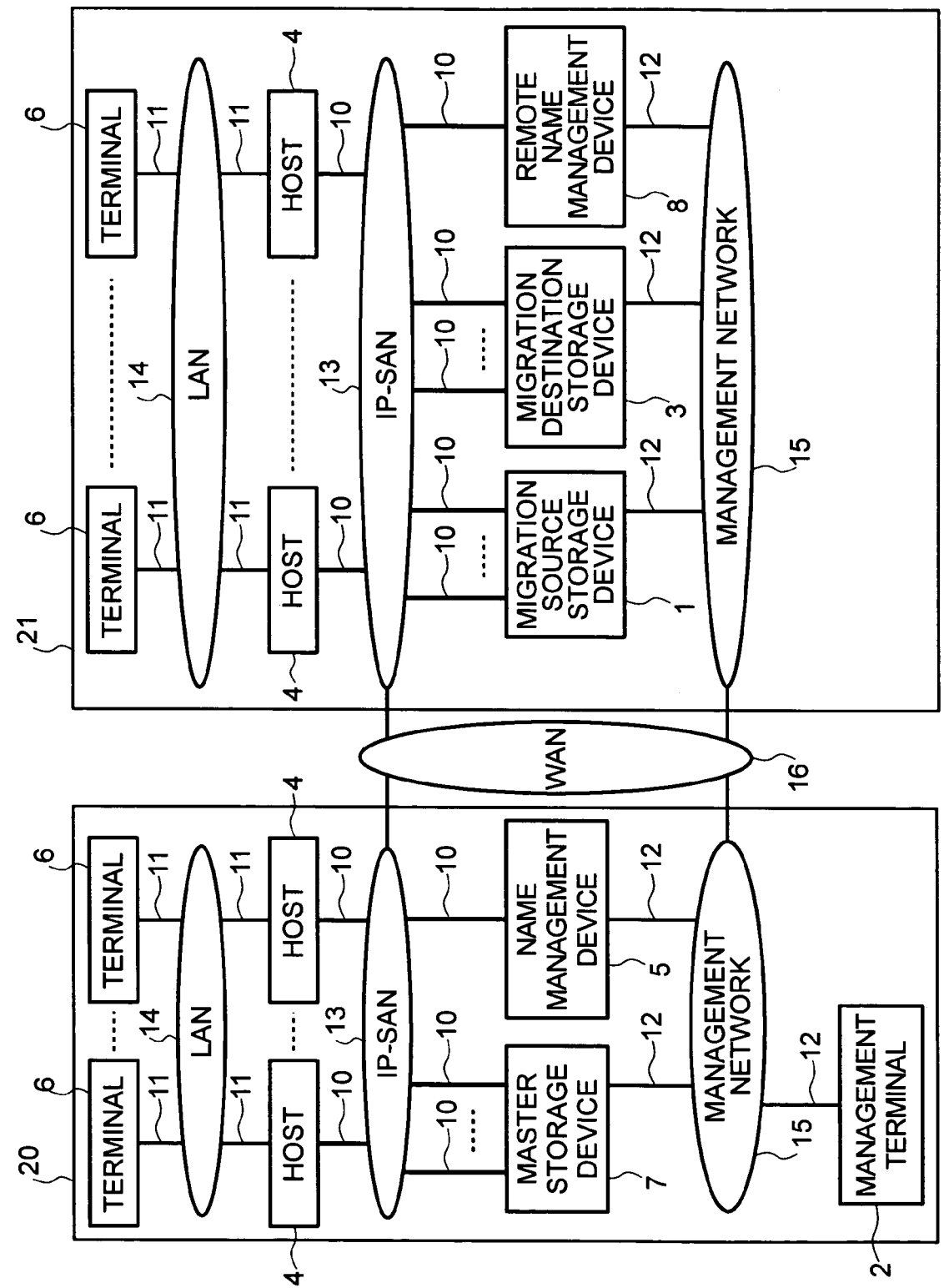
FIG. 22 is a diagram which shows an example of the system configuration of a third embodiment of the present invention.

FIG. 22 illustrates an example of the system configuration of the present embodiment. The system of the present embodiment has a master site 20 wherein a master storage device 7 is disposed, a remote site 21 where a migration source storage device 1 and a migration destination storage device 3 are disposed, and a WAN (Wide Area Network) 16, which is a network connecting the master site 20 with the remote site 21. In the present embodiment, the master site 20 and the remote site 21 are assumed to be at a certain distance from each other (for example, in Tokyo, Japan, on the one hand and in Osaka, Japan on the other hand).

Further, the master storage device 7, a management terminal 2, a host 4, a terminal 6, a name management device 5, an IP-SAN 13, a LAN 14, and a management network 15 are disposed in the master site 20.

On the other hand, the migration source storage device 1, the migration destination storage device 3, a host 4, a terminal 6, a remote name management device 8 for unified management of combinations of an iSCSI name, an IP address, and a TCP port number of the migration source storage device 1 and the migration destination storage device 3 and replication of parts of those combinations to the name management device 5 via the WAN 16, an IP-SAN 13, a LAN 14, and a management network 15 are disposed in the remote site 21.

The remote name management device 8 is connected to the IP-SAN 13 and the management network 15 with a communication line 10 and a communication line 12, respectively.

Figures 23, 24:
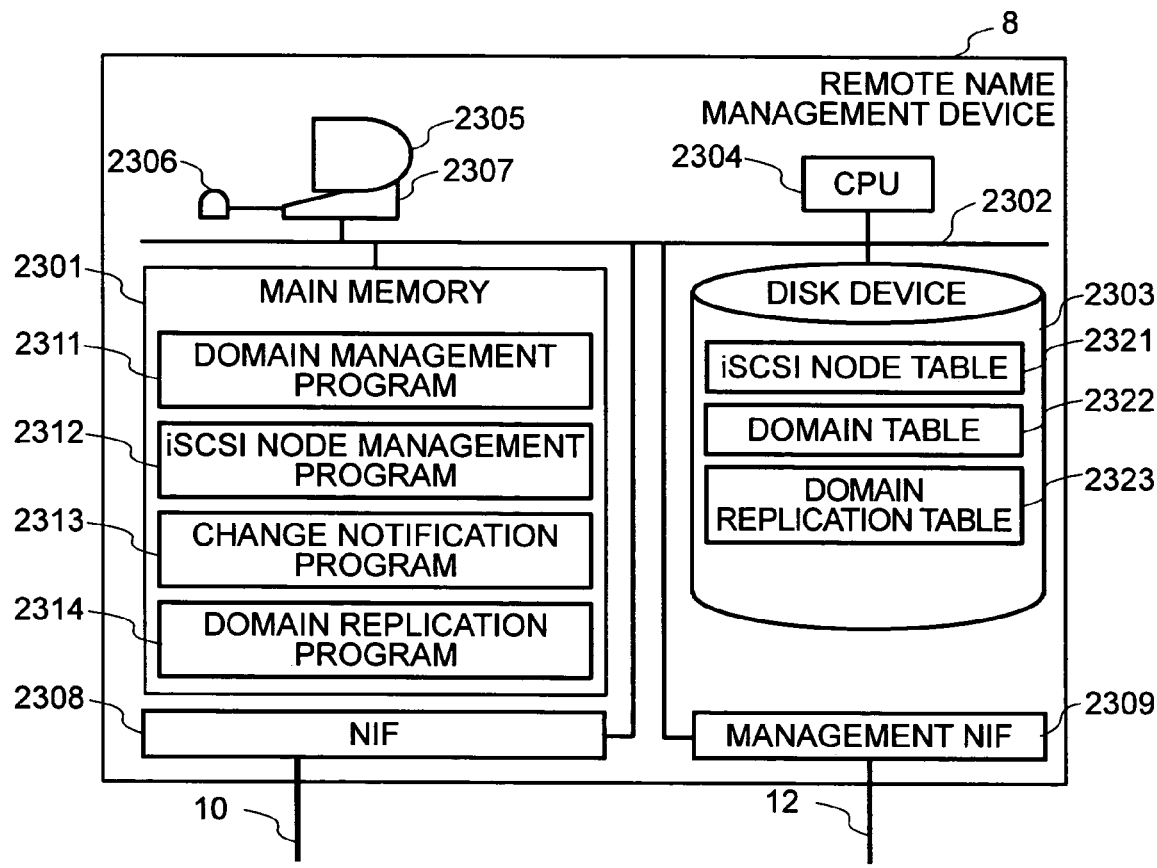
FIG. 23 is a diagram which shows an example of a remote name management device.
FIG. 24 is a diagram which shows an example of the data structure of a domain replication table.

FIG. 23 shows an example of the configuration of the remote name management device 8. The remote name management device 8 is a computer comprising a main memory 2301, a communication line 2302, a disk device 2303, a CPU 2304, a display 2305, a pointing device 2306, a character input device 2307, a NIF 2308, and a management NIF 2309. The main memory 2301 stores a domain management program 2311, an iSCSI node management program 2312, a change notification program 2313, and a domain replication program 2314 that is executed by the CPU 2304 when part of the contents of an iSCSI node table 2321 is replicated to the name management device 5. Furthermore, the main memory 2301 also stores the iSCSI node table 2321, a domain table 2322, and a domain replication table 2323 storing associations of a domain ID of a discovery domain, which is the replication object, and the IP address of the name management device 5, which is the replication destination.

The configuration of the master storage device 7, the migration source storage device 1, the migration destination storage device 3, the management terminal 2, the host 4, the terminal 6, and the name management device 5 is identical to that of the second embodiment.

The data structure of the replication table 2323 stored in the disk device 2303 of the remote name management device 8 will be described below. The domain replication table 2323 has an array structure and can store at least one record. However, the data structure is not limited to an array structure. The data structures of the iSCSI node table 821 and the domain table 2322 are identical to those of the iSCSI node table 521 and the domain table 522 of the second embodiment.

FIG. 24 illustrates an example of the data structure of the domain replication table 2323. The domain replication table 2323 has the same number of records as discovery domains which constitute the objects of replication. Each record of the domain replication table 2323 has an entry 8231 in which a domain ID of a discovery domain is registered, which is the replication object, and an entry 8233 to which the IP address of the name management device 5 is registered, which is the replication destination.

The data structure of each table stored in the main memory of the master storage device 7, the migration source storage device 1, and the migration destination storage device 3 and the data structure of each table stored in the disk device 203 of the management terminal 2 are identical to those of the second embodiment.

The GUI of the present embodiment will be explained below. In the present embodiment, in addition to the GUIs explained in connection with the first and second embodiments, the management terminal 2 provides a domain replication management screen 2500.

Figure 25:
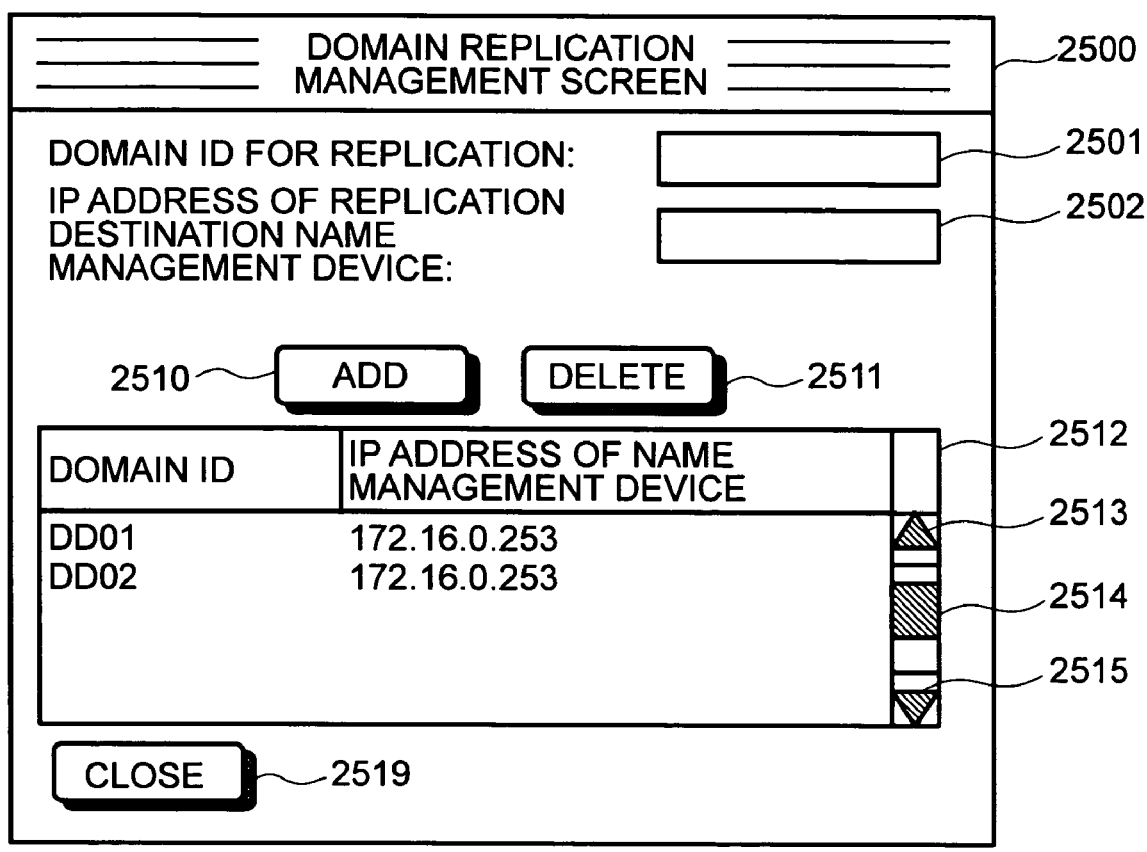
FIG. 25 is a diagram which shows as example of a display of a domain replication management screen.

FIG. 25 shows an example of the domain replication management screen 2500 used by the system administrator or the like for registering a discovery domain, which is the replication object, in the remote name management device 8 and deleting it therefrom. The domain replication management screen 2500 has an area 2501 to which a domain ID of the discovery domain is inputted, which is the replication object; an area 2502 to which an IP address allocated to the NIF 508 of the name management device 5 is inputted, which is the replication destination; a button 2510 that is used when the information inputted into the area 2501 and the area 2502 is registered in the remote name management device 8; a button 2511 that is used when the information of replication specified by using an area 2512 is deleted from the remote name management device 8; the area 2512 for displaying the entire information of replication that has already been registered in the remote name management device 8; a button 2513 and a button 2515 that is used when the display range of the area 2512 is moved up and down, respectively, by one line; a button 2514 that is used when the display range of the area 2512 is moved to any position; and a button 2519 that is used when the domain replication management screen 2500 is closed.

The communication sequence and the operation procedure of the present embodiment will be described below. In the present embodiment, the master storage device 7 replicates the data stored in itself into the first target of the migration source storage device 1 via the WAN 16. Then, the first target of the migration source storage device 1 is migrated to the migration destination storage device 3, and the master storage device 7 continues the replication of the data into the migration destination storage device 3.

First, the system administrator or the like, similar to the second embodiment, designates the management terminal 2 to conduct the table initialization processing and then registers the device ID, the IP address, and the management IP address of the remote name management device 8 and the device ID, and the management IP address of the migration source storage device 1 in the management terminal 2. The communication sequence and the operation procedure of this registration work are identical to those of operations 1201 through 1211 shown in FIG. 12, except that the name management device 5 is replaced with the remote name management device 8 and the management IP address of the name management device 5 contained in the initialization request is replaced with the management IP address of the remote name management device 8.

Then, the system administrator or the like registers the device ID, the IP address, and the management IP address of the name management device 5 and the device ID and the management IP address of the master storage device 7 in the management terminal 2. The communication sequence and the operation procedure of this registration work are identical to those of the operations 1202 through 1211 shown in FIG. 12.

Then, the system administrator or the like uses the character input device 207 and the pointing device 206 and designates display of the domain replication management screen 2500 to the management terminal 2. The CPU 204 of the management terminal 2, which has received the designation, executes the GUI control program 211 and conducts the domain replication management screen display processing. In the target replication management screen display processing, first, the CPU 204 of the management terminal 2 displays the target replication management screen 2100 on the display 205. Then, the system administrator or the like inputs the domain ID of the discovery domain, which is the object of replication, and the IP address of the name management device 5, which is the replication destination, in the area 2501 and the area 2502, respectively, of the domain replication management screen 2500.

In the present embodiment, "DD01", to which the third initiator and the first target belong, and "172. 16. 0. 253", which is the IP address allocated to the NIF 508 of the name management device 5, are inputted into the area 2501 and the area 2502, respectively.

If the system administrator or the like then specifies the button 2510, the CPU 204 of the management terminal 2 composes a domain replication start request, including the contents of the area 2501 and the contents of the area 2502, and sends the request to the remote name management device 8 via the management NIF 209. If the replication start request is received, the CPU 2304 of the remote name management device 8 executes the domain replication program 2314 and conducts the following processing.

First, the CPU 2304 of the remote name management device 8 fetches the contents of the area 2501 and the contents of the area 2502 from the received domain replication start request. Then, the CPU 2304 of the remote name management device 8 adds a record to the domain replication table 2323. Here, the contents of the area 2501 and the contents of the area 2502 are respectively registered in the entry 8231 (domain ID) and the entry 8232 (IP address) of the record which is being added.

After the above-described record addition operation has been completed, the CPU 2304 of the remote name management device 8 composes a domain replication start response showing that the domain replication start processing was completed successfully and sends the response to the management terminal 2 via the management NIF 2309. Then, each time a data change is generated, for example, when the iSCSI node is added to the discovery domain, which is the replication object, or is deleted therefrom, and the information of the iSCSI node belonging to this discovery domain is changed, the CPU 804 of the remote name management device 8 executes the domain replication program 2314, conducts a similar data change in the name management device 5, which is the replication destination, and maintains the consistency of the data managed by the remote name management device 8 and the data managed by the name management device 5.

If the management terminal 2 receives the aforementioned domain replication start response, the system administrator or the like, similar to the second embodiment, registers the information of the discovery domain "DD01", to which the third initiator and the first target belong, in the remote name management device 8 and registers the information relating to the physical ports and targets of the migration source storage device 1 in the migration source storage device 1. The communication sequence and the operation procedure of this registration work are identical to those shown in FIG. 13, except that the name management device 5 is replaced with the remote name management device 8 and that the identical data change is conducted in the name management device 5 after the remote name management device 8 has executed the domain change processing or name registration processing.

Then, the system administrator or the like, similar to the second embodiment, registers in the name management device 5 the information of the discovery domain "DD02", to which the first initiator and the fourth target belong, and registers in the master storage device 7 the information relating to the physical ports and targets of the master storage device 7. The communication sequence and the operation procedure of this registration work are identical to those shown in FIG. 13, except that the migration source storage device 1 is replaced with the master storage device 7. Further, the first initiator and the fourth target do not conduct iSCSI communication with the initiators and the targets in the remote site 21. Therefore, the information of the discovery domain "DD02" is not required to be registered in the remote name management device 8.

Then, the system administrator or the like, similar to the second embodiment, uses the target replication management screen 2100 and designates to the master storage device 7 the start of replication from the fourth target to the first target. The communication sequence and the operation procedure of this replication start operation are identical to those of operations 1401 through 1412 shown in FIG. 14, except that the host 4 is replaced with the master storage device 7 and the first initiator is replaced with the third initiator.

Then, the system administrator or the like, similar to the second embodiment, activates the first initiator in the host 4 of the master site 20. The communication sequence and the operation procedure at the time of this initiator start are identical to those of operations 1401 through 1412 shown in FIG. 14, except that the migration source storage device 1 is replaced with the master storage device 7, the first target is replaced with the fourth target, the first LU is replaced with the fifth LU, and the processing of the steps 1404 through 1406 is not carried out.

Then, the system administrator or the like registers the device ID and the management IP address of the migration destination storage device 3 in the management terminal 2 and then registers the information relating to the physical ports of the migration destination storage device 3 in the migration destination storage device 3. The communication sequence and the operation procedure of this registration procedure are identical to those shown in FIG. 15, except that the management IP address of the name management device 5 contained in the initialization request is replaced with the management IP address of the remote name management device 8.

Then, the system administrator or the like, as described with reference to FIG. 16, designates the start of the migration processing of the first target to the migration storage device 1. The communication sequence and the operation procedure of a subsequent migration procedure are identical to those shown in FIG. 16 through FIG. 18, except that the host 4 is replaced with the master storage device 7, the first initiator is replaced with the third initiator, the device with which the migration destination storage device 3 exchanges the name registration request and the name registration response is the remote name management device 8, the device with which the migration source storage device 1 exchanges the name deregistration request and the name deregistration response is the remote name management device 8, and that the remote name management device 8 executes the name registration processing or the name deregistration processing, then conducts the identical data change to the name management device 5, and the name management device 5, which has received the change conducts the change notification destination search processing and sends the change notification.

The third embodiment has been explained hereinabove. According to the third embodiment, even when the master storage device 7 where the original data is stored and the storage device where a replica of the data is stored are disposed in separate sites, the migration of the storage device where the replica of the data is stored is possible without changing the configuration of the master storage device 7.

As for the fourth embodiment, only the portion thereof which differs from the first embodiment will be explained. In the fourth embodiment, the LU that is the access object for the host 4 is changed from the first LU to the second LU of the LU managed by the storage device.

Figure 26:
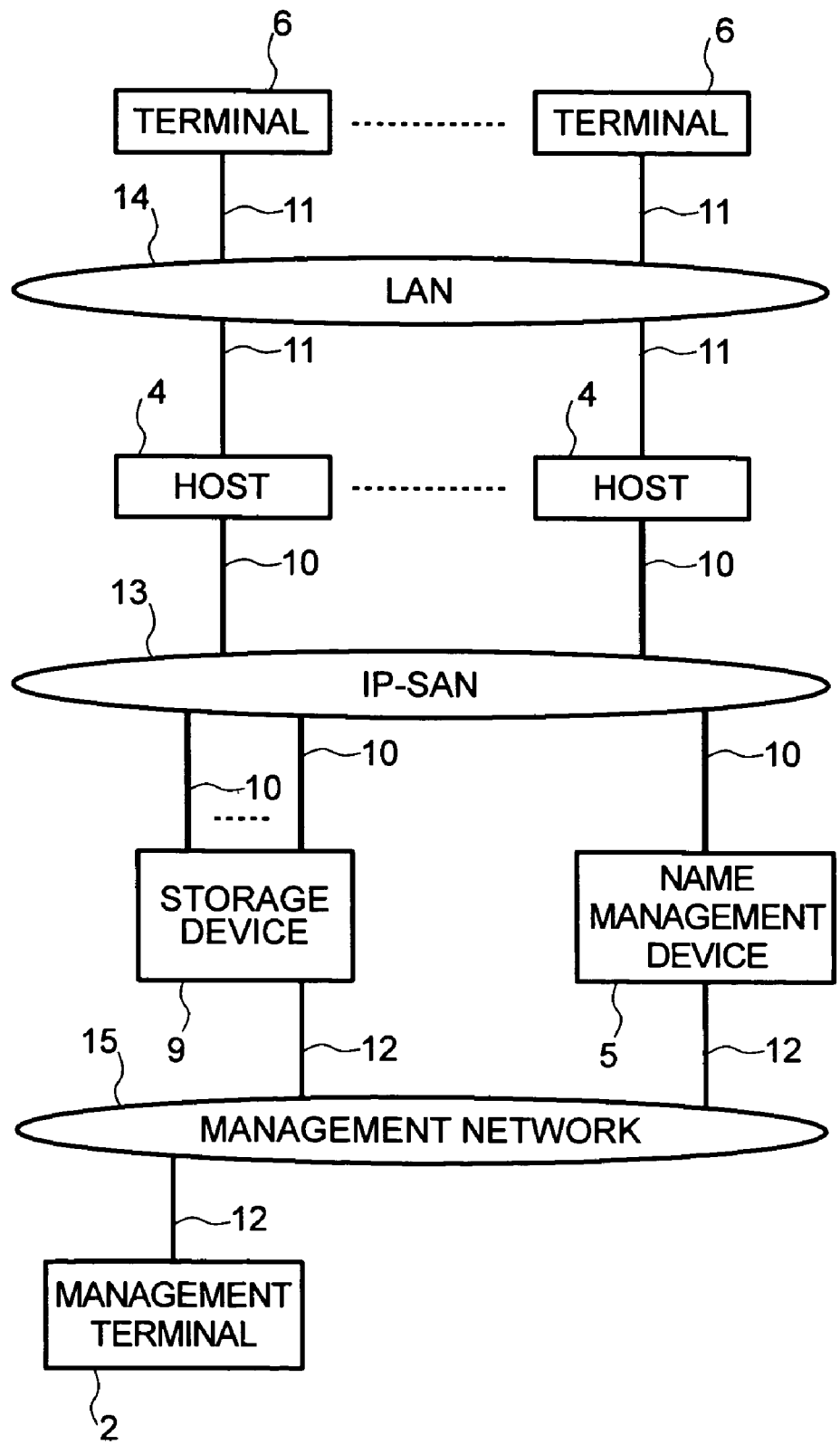
FIG. 26 is a diagram which shows an example of the system configuration of a fourth embodiment of the present invention.

FIG. 26 shows an example of the system configuration of the present embodiment. The system of the present embodiment has a configuration obtained by removing the migration destination storage device 3 from the configuration of the first embodiment.

Figure 27:
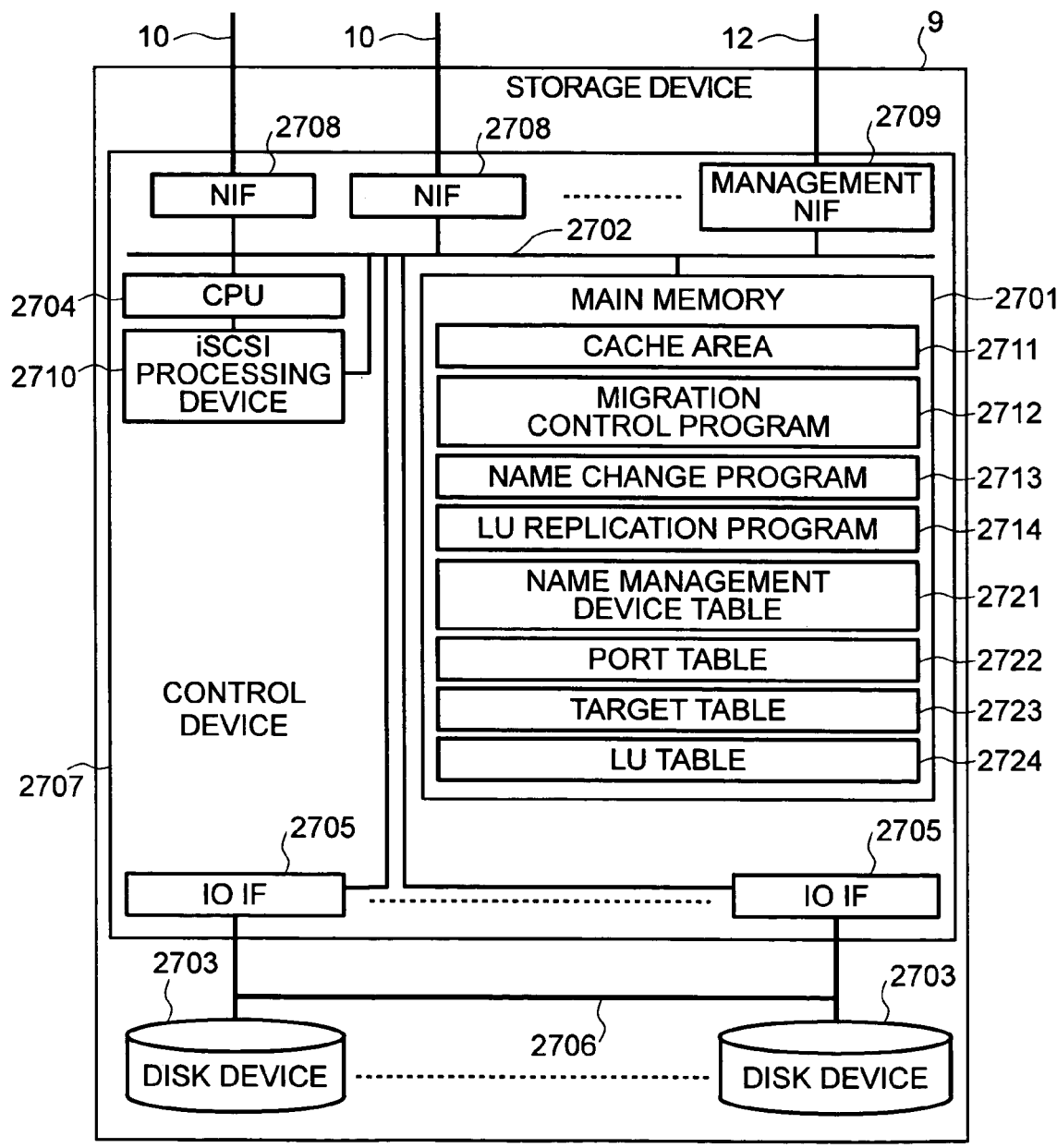
FIG. 27 is a diagram which shows an example of a storage device.

FIG. 27 shows an example of the configuration of a storage device 9. The storage device 9, similar to the migration source storage device 1, has a disk device 2703, a control device 2707, and a communication line 2706. Furthermore, the control device 2707, similar to the control device 107 of the migration source storage device 1, has a main memory 2701, a communication line 2702, a CPU 2704, an IO IF 2705, a NIF 2708, a management NIF 2709, and an iSCSI processing device 2710. The NIF 2708 and the management NIF 2709 have one or more physical ports.

The main memory 2701 has a cache area 2711 for storing data read out from the disk device 2703 or data received from the host 4 or the like, a migration control program 2712 that is executed by the CPU 2704 when an LU accessed by the host 4 is changed; a name change program 2713 that is executed by the CPU 2704 when an iSCSI name, an IP address, and a TCP port number of a target are registered in the name management device 5 or deregistered therefrom; and an LU replication program 2714 that is executed by the CPU 2704 when the data stored in the LU are replicated to another LU.

Further, the main memory 2701, similar to the main memory 101 of the migration source storage device 1, stores a name management device table 2721, a port table 2722, a target table 2723, and a LU table 2724.

The configuration of the management terminal 2, the host 4, the terminal 6, and the name management device 5 is identical to that of the first embodiment.

The data structures of the name management device table 2721, the port table 2722, the target table 2723, and the LU table 2724 stored in the main memory 2701 of the storage device 9 are identical to those of the name management device table 121, the port table 122, the target table 123, and the LU table 124, respectively, of the first embodiment. On the other hand, the data structure of each table stored in the disk device 203 of the management terminal 2 is identical to that of the first embodiment.

The GUI in the present embodiment will be described below.

FIG. 28(a) shows an example of an LU replication management screen 2800 used by the system administrator or the like to designate the start of LU replication to the storage device 9. The LU replication management screen 2800 has a button 2802 that is used when the device ID of the storage device 9 is selected from a list; an area 2801 for displaying the device ID selected by using the button 2802; an area 2803 to which an LUN of an LU, where original data is stored, is inputted; an area 2804 to which an LUN of an LU, where a replica of the original data is stored, is inputted; a button 2818 that is used when the storage device 9 having the device ID selected by using the button 2802 is designated to start the replication processing according to the information inputted into the area 2803 and the area 2804; and a button 2819 that is used when the replication processing is canceled.

FIG. 28(b) shows a display example of an inside-storage migration management screen 2820 used by the system administrator or the like to designate a change of an LU accessed by the host 4 to the storage device 9. The inside-storage migration management screen 2820 has a button 2822 that is used when the device ID of the storage device 9 is selected from a list; an area 2821 for displaying the device ID selected by using the button 2822; an area 2823 to which an iSCSI name of a target is inputted, to which an LU prior to change was allocated; an area 2824 to which a port ID of a physical port is inputted, which is allocated to the target after the LU accessed by the host 4 was changed; an area 2825 to which a TCP port number used by the target is inputted; an area 2826 to which an LUN of an LU after the change is inputted; a button 2838 that is used when the storage device 9, having the device ID selected by using the button 2822, is instructed to start the replication processing according to the information inputted the areas from the area 2823 to the area 2826; and a button 2839 that is used when the replication processing is canceled. Other GUIs in the present embodiment are identical to those of the first embodiment.

The communication sequence and the operation procedure in the present embodiment will be described below. In the present embodiment, the storage device 9 copies the data stored in the first LU to the second LU. In this case, the LU allocated to the first target of the storage device 9 is assumed to be changed from the first LU into the second LU. Further, in the present embodiment, the device ID and management IP address of the stored device 9 are assumed to be "STR01" and "192. 168. 0. 1", respectively, similar to the migration source storage device 1 of the first embodiment, to have the first and second physical ports and the first and second LU, and to manage the first target having the first physical port and LU allocated thereto.

First, the system administrator or the like designates the table initialization processing to the management terminal 2 and then registers the device ID, the IP address and the management IP address of the name management device 5 and the device ID and the management IP address of the storage device 9 in the management terminal 2. The communication sequence and the operation procedure of this registration work are identical to those shown in FIG. 12, except that the migration source storage device 1 is replaced with the storage device 9.

Then, the system administrator or the like registers in the name management device 5 the information of the discovery domain "DD01" to which the first initiator and the first target belong, and registers in the storage device 9 the information relating to the physical ports and the targets of the storage device 9. The communication sequence and the operation procedure of this registration work are identical to those shown in FIG. 13, except that the migration source storage device 1 is replaced with the storage device 9 and the system administrator or the like does not register the information relating to the second target.

Then, the system administrator or the like uses the pointing device 206 or the character input device 207 and designates display of the LU replication management screen 2800 to the management terminal 2. The CPU 204 of the management terminal 2, which has received the designation, executes the GUI control program 211 and conducts the LU replication management screen display processing. In the LU replication management screen display processing, first, the CPU 204 of the management terminal 2 displays the LU replication management screen on the display 205. Further, the CPU 204 of the management terminal 2 reads the entries 2211 (device ID) of all of the records of the storage device table 221 and creates a list of device IDs of the storage devices according to the results, and makes it possible to display the list of device IDs of storage devices when the button 2802 is specified by the system administrator or the like. Duplication of a device ID in the list of device IDs of the storage devices is avoided.

Then, the system administrator or the like selects the device ID of the storage device 9 by activating the button 2802 of the LU replication management screen 2800 and inputs the LUN of the LU where the original data is stored and the LUN of the LU where a replica of the original data is stored into the area 2803 and the area 2804, respectively. In the present embodiment, "STR01", which is the device ID of the storage device 9, is selected by using the button 2802 and "0", which is the LUN of the first LU, and "1", which is the LUN of the second LU, are inputted into the area 2803 and the area 2804, respectively.

If the system administrator or the like then specifies the button 2828, the CPU 204 of the management terminal 2 searches the storage device table 221 on condition that the device ID selected by using the button 2802 matches the contents of the entry 221 (device ID) and fetches the contents of the entry 221 (management IP address) of the record that agrees with this condition.

Then, the CPU 204 of the management terminal 2 composes a LU replication start request, including the contents of the area 2803 and the contents of the area 2804, and sends this request via the management NIF 209 to the storage device 9 holding the device ID selected by using the button 2802. The destination IP address of this LU replication start request is assumed to be the contents of the aforementioned entry 221 (management IP address).

If the LU replication start request is received, the CPU 904 of the storage device 9 executes the LU replication program 914 and starts the replication of the LU. First, the CPU 904 of the storage device 9 fetches the contents of the area 2803 and the contents of the area 2804 from the received LU replication start request. Then, the CPU 2704 of the storage device 9 conducts initial copy of the data stored in the LU whose LUN is identical to the contents of the area 2803 into the LU whose LUN is identical to the contents of the area 2804. After the initial copy has been completed, the CPU 2704 of the storage device 9, for each change in the data of the LU whose LUN is identical to the contents of the area 2803, executes the change identical thereto with respect to the LU whose LUN is identical to the contents of the area 2804. As a result, the consistency of the data of the two LUs is maintained. In the present embodiment, after the data stored in the first LU is initially copied into the second LU, the consistency between the data of the first LU and the data of the second LU is maintained.

Then, the system administrator or the like carries out the configuration relating to the first target as the access destination target in the host 4 and then activates the first initiator. The communication sequence and the operation procedure of this initiator activation are identical to those shown in FIG. 14, except that the migration source storage device 1 is replaced with the storage device 9.

Then, the system administrator or the like designates, to the storage device 9, the start of a processing changing the LU accessed by the host 4. In the present embodiment, the system administrator or the like is assumed to change the access destination of the host 4 from the first LU to the second LU. First, the system administrator or the like uses the pointing device 206 or the character input device 207 and designates display of the inside-storage migration management screen 2820 to the management terminal 2.

The CPU 204 of the management terminal 2, which has received the designation, executes the GUI control program 211 and conducts the inside-storage migration management screen display processing. In the inside-storage migration management screen display processing, first, the CPU 204 of the management terminal 2 displays the inside-storage migration management screen 2820 on the display 205. Then, the CPU 204 of the management terminal 2 reads the entries 2211 (device ID) of all of the records of the storage device table 221, creates a list of device IDs of the storage devices according to the results, and makes it possible to display the list of device IDs of the storage devices when the button 2822 is specified by the system administrator or the like. Duplication of a device ID in the list of device IDs of the storage devices is avoided.

Then, the system administrator or the like selects the device ID of the storage device 9 by using the button 2822 of the inside-storage migration management screen 2820 and inputs the iSCSI name of the target to which the LU prior to change was allocated, the port ID of the physical port that will be allocated to the target after the LU change, and TCP port number that will be used by the target after the LU change, and the LUN of the LU after the change. In the present embodiment, "STR01", which is the device ID of the storage device 9, is selected by using the button 2822, and "iqn. 2004-06. com. hitachi: tar01", which is the iSCSI name of the first target, "2", which is the port ID of the second physical port, "3260", which is the well-known port, and "1", which is the LUN of the second LU, are inputted into the area 2823, the area 2824, the area 2825, and the area 2826, respectively.

If the system administrator or the like then specifies the button 2838, the CPU 204 of the management terminal 2 searches the storage device table 221 on condition that the device ID selected by using the button 2822 matches the contents of the entry 2211 (device ID) and fetches the contents of the entry 2212 (management IP address) of the record that agrees with this condition. Then, the CPU 204 of the management terminal 2 composes a migration start request, including the contents of the areas from the area 2823 to the area 2826, and sends the request via the management NIF 209 to the storage device 9 holding the device ID selected by using the button 2822. The destination IP address of the migration start request is the contents of the entry 2212 (management IP address).

The communication sequence and the operation procedure relating to the subsequent migration processing are identical to those shown in FIG. 16 through FIG. 18, except that the migration source storage device 1 and the migration destination storage device 3 are replaced with the storage device 9, the contents of the area 1105, the area 1115, the area 1116, and the area 1117 are replaced with the contents of the area 2823, the area 2824, the area 2825, and the area 2826, respectively, the migration source storage device control program 112 and the migration destination storage device control program 312 are replaced with the migration control program 2712, the communication processing between the migration source storage device 1 and the migration destination storage device 3 is not required, the processing from 1606 to 1611 in FIG. 16 is not required, the third physical port is replaced with the second physical port, and the third LU is replaced with the second LU.

Further, in the present embodiment, a case was explained where the physical port used by the first target was changed following the changes in the LU accessed by the host 4. However, it is also possible to change the LU accessed by the host 4, without changing the physical port used by the first target. In this case, the system administrator or the like inputs the port ID of the physical port used by the first target and the TCP port number other than the TCP port number used by the first target into the area 2824 and the area 2825 of the inside-storage migration management screen 2820. For example, the system administrator or the like inputs "1", which is the port ID of the first physical port, and "10000", which is the TCP port number other than the well-known port, into the area 2824 and the area 2825, respectively.

The fourth embodiment has been explained hereinabove. With the fourth embodiment, the LU accessed by the host 4 can be changed, without terminating applications running in the host 4.

In accordance with the present invention, the migration of the storage device accessed by a host or change of the LU accessed by the host are possible without terminating applications running in the host. Further, the migration of the storage device where a replica of data is stored is possible without changing the configuration of the storage device where the original data is stored.

What is claimed is:

1. A system comprising:
a first device;
a second device;
a third device; and
a network for mutually connecting said first, second, and third devices, wherein
said first device designates to said second device creation of a storage area having an identifier identical to an identifier assigned to a storage area that is owned by the first device itself and accessed by said third device,
said second device creates a storage area having said identifier based on the designation from said first device; and
said third device accesses the storage area owned by said second device by using said identifier;
wherein said first device and second device are storage devices, and said third device is a computer;
wherein each of said first and second devices has one or more ports, and said identifier is associated with the combination of one of said ports and said storage area;
wherein said third device
establishes a first communication path with a first port corresponding to said identifier of said first device;
establishes a second communication path with a second port corresponding to said identifier of said second device after the storage area having said identifier has been created in said second device; and
disconnects said first communication path based on the designation of said first device and then conducts communication with said second device by using said second communication path;
the system further comprising a name management device connected to said network, wherein
said second device sends to said name management device information of said second port together with information of said identifier after the creation of the storage area having said identifier;
said name management device notifies said third device that there are changes in information of the storage area corresponding to said identifier based on the information sent from said second device; and
said third device establishes said second communication path with said second port based on the notification from said name management device.

2. The system according to claim 1, wherein
said first device requests said name management device to delete information of association of said first port and said identifier after the storage area having said identifier has been created in said second device.

3. The system according to claim 2, wherein said first device, said second device, and said third device communicate by using the iSCSI protocol.

4. The system according to claim 3, wherein said name management device communicate with said first device, said second device, and said third device by using iSNSP.

* * * * *